US010176305B2

(12) United States Patent
Sitrick et al.

(10) Patent No.: US 10,176,305 B2
(45) Date of Patent: Jan. 8, 2019

(54) METHOD AND SYSTEM FOR SECURE DISTRIBUTION OF SELECTED CONTENT TO BE PROTECTED

(71) Applicant: OL SECURITY LIMITED LIABILITY COMPANY, Dover, DE (US)

(72) Inventors: David H. Sitrick, Pacific Palisades, CA (US); Russell T. Fling, Naperville, IL (US)

(73) Assignee: OL Security Limited Liability Company, Dover, DE (US)

( * ) Notice: Subject to any disclaimer, the term of this patent is extended or adjusted under 35 U.S.C. 154(b) by 0 days.

(21) Appl. No.: 15/619,369

(22) Filed: Jun. 9, 2017

(65) Prior Publication Data

US 2018/0129788 A1    May 10, 2018

Related U.S. Application Data

(63) Continuation of application No. 15/130,905, filed on Apr. 15, 2016, now Pat. No. 9,679,118, which is a
(Continued)

(51) Int. Cl.
*G06F 21/10*        (2013.01)
*H04N 21/2347*      (2011.01)
(Continued)

(52) U.S. Cl.
CPC ............ *G06F 21/10* (2013.01); *G06F 21/602* (2013.01); *H04L 9/0863* (2013.01);
(Continued)

(58) Field of Classification Search
CPC ....................................................... G06F 21/10
See application file for complete search history.

(56) References Cited

U.S. PATENT DOCUMENTS 5,029,207 A    7/1991  Gammie
5,406,626 A    4/1995  Ryan et al.
(Continued)

FOREIGN PATENT DOCUMENTS

WO    2002056528    7/2002

OTHER PUBLICATIONS

Liu et al.; Digital rights management for content distribution; Published in: Proceeding ACSW Frontiers '03 Proceedings of the Australasian information security workshop conference on ACSW frontiers 2003—vol. 21; pp. 49-58; ACM Digital Library Year: 2003).*
(Continued)

*Primary Examiner* — Bradley Holder
(74) *Attorney, Agent, or Firm* — Perkins Coie, LLP

(57) ABSTRACT

The present invention relates to data rights management and more particularly to a secured system and methodology and production system and methodology related thereto and to apparatus and methodology for production side systems and are consumer side systems for securely utilizing protected electronic data files of content (protected content), and further relates to controlled distribution, and regulating usage of the respective content on a recipient device (computing system) to be limited strictly to defined permitted uses, in accordance with usage rights (associated with the respective content to control usage of that respective content), on specifically restricted to a specific one particular recipient device (for a plurality of specific particular recipient devices), or usage on some or any authorized recipient device without restriction to any one in specific, to control use of the respective content as an application software program, exporting, modifying, executing as an application program, viewing, and/or printing of electronic data files.

18 Claims, 31 Drawing Sheets

Related U.S. Application Data continuation of application No. 11/545,889, filed on Oct. 11, 2006.

(51) Int. Cl.

| | |
|---|---|
| *H04N 21/235* | (2011.01) |
| *H04N 21/433* | (2011.01) |
| *H04N 21/435* | (2011.01) |
| *H04N 21/4405* | (2011.01) |
| *H04N 21/4623* | (2011.01) |
| *H04N 21/4627* | (2011.01) |
| *H04N 21/6334* | (2011.01) |
| *H04N 21/8355* | (2011.01) |
| *H04L 9/08* | (2006.01) |
| *G06F 21/60* | (2013.01) |
| *H04N 21/254* | (2011.01) |
| *H04N 21/266* | (2011.01) |
| *H04L 29/06* | (2006.01) |

(52) U.S. Cl.
CPC ......... *H04L 9/0866* (2013.01); *H04N 21/235* (2013.01); *H04N 21/2347* (2013.01); *H04N 21/2541* (2013.01); *H04N 21/26613* (2013.01); *H04N 21/435* (2013.01); *H04N 21/4334* (2013.01); *H04N 21/4405* (2013.01); *H04N 21/4623* (2013.01); *H04N 21/4627* (2013.01); *H04N 21/63345* (2013.01); *H04N 21/8355* (2013.01); *H04L 63/0435* (2013.01); *H04L 63/062* (2013.01); *H04L 2209/60* (2013.01); *H04L 2463/101* (2013.01)

(56) References Cited

U.S. PATENT DOCUMENTS

| | | | |
|---|---|---|---|
| 5,870,474 A | | 2/1999 | Wasilewski et al. |
| 6,026,366 A | | 2/2000 | Grube et al. |
| 6,226,618 B1 * | | 5/2001 | Downs .................. G06F 21/10 380/279 |
| 6,792,113 B1 | | 9/2004 | Ansell et al. |
| 6,947,910 B2 | | 9/2005 | Hsu et al. |
| 6,976,210 B1 | | 12/2005 | Silva et al. |
| 7,062,045 B2 | | 6/2006 | Riddick et al. |
| 7,095,854 B1 | | 8/2006 | Ginter et al. |
| 7,353,388 B1 | | 4/2008 | Gilman et al. |
| 7,594,274 B2 | | 9/2009 | Kim et al. |
| 7,647,646 B2 | | 1/2010 | Nakano et al. |
| 7,930,553 B2 | | 4/2011 | Satarasinghe et al. |
| 8,311,946 B1 | | 11/2012 | Warnock et al. |
| 8,619,982 B2 | | 12/2013 | Sitrick |
| 8,719,954 B2 | | 5/2014 | Sitrick |
| 8,995,661 B2 | | 3/2015 | Kurihara |
| 9,384,333 B2 | | 7/2016 | Sitrick et al. |
| 9,679,118 B2 | | 6/2017 | Sitrick et al. |
| 2001/0032312 A1 * | | 10/2001 | Runje .................. G06F 21/10 713/172 |
| 2001/0051996 A1 | | 12/2001 | Cooper et al. |
| 2002/0023217 A1 | | 2/2002 | Wheeler et al. |
| 2002/0061185 A1 | | 5/2002 | Hirabayashi et al. |
| 2002/0095582 A1 * | | 7/2002 | Peled .................. G06F 21/10 713/180 |
| 2002/0099947 A1 | | 7/2002 | Evans |
| 2002/0106081 A1 | | 8/2002 | Yang |
| 2002/0107806 A1 | | 8/2002 | Higashi et al. |
| 2002/0146122 A1 | | 10/2002 | Vestergaard et al. |
| 2002/0166056 A1 | | 11/2002 | Johnson et al. |
| 2002/0198846 A1 | | 12/2002 | Lao |
| 2003/0084332 A1 | | 5/2003 | Krasinski et al. |
| 2003/0123665 A1 * | | 7/2003 | Dunstan .................. G06F 21/10 380/255 |
| 2003/0194092 A1 * | | 10/2003 | Parks .................. G06F 21/10 380/281 |
| 2003/0195855 A1 * | | 10/2003 | Parks .................. G06F 21/10 705/51 |
| 2003/0204738 A1 * | | 10/2003 | Morgan .............. H04L 63/0464 713/194 |
| 2004/0034637 A1 | | 2/2004 | Riche et al. |
| 2004/0054891 A1 | | 3/2004 | Hengeveld et al. |
| 2004/0064416 A1 * | | 4/2004 | Peled .................. G06F 17/3089 705/51 |
| 2004/0068659 A1 * | | 4/2004 | Diehl .................. H04N 7/1675 713/182 |
| 2004/0088541 A1 | | 5/2004 | Messerges et al. |
| 2004/0093273 A1 * | | 5/2004 | Laurent .................. G06F 21/10 705/26.1 |
| 2004/0133785 A1 | | 7/2004 | Kugai |
| 2004/0193364 A1 | | 9/2004 | Chojnacki |
| 2004/0210762 A1 | | 10/2004 | Kawamoto |
| 2004/0254886 A1 | | 12/2004 | Siepen et al. |
| 2005/0033994 A1 | | 2/2005 | Suzuki |
| 2005/0071272 A1 | | 3/2005 | Yoshioka et al. |
| 2005/0091164 A1 * | | 4/2005 | Varble .................. G06F 21/10 705/52 |
| 2006/0048232 A1 | | 3/2006 | Jung et al. |
| 2006/0063138 A1 | | 3/2006 | Loff et al. |
| 2006/0080545 A1 | | 4/2006 | Bagley |
| 2006/0161502 A1 | | 7/2006 | Cerruti et al. |
| 2006/0168580 A1 | | 7/2006 | Harada et al. |
| 2006/0179489 A1 | | 8/2006 | Mas Ribes |
| 2006/0242069 A1 | | 10/2006 | Peterka et al. |
| 2007/0033154 A1 | | 2/2007 | Trainum et al. |
| 2007/0239883 A1 | | 10/2007 | Glenn |
| 2007/0248231 A1 | | 10/2007 | Kasahara et al. |
| 2007/0294181 A1 | | 12/2007 | Chheda et al. |
| 2008/0092239 A1 | | 4/2008 | Sitrick et al. |
| 2008/0134346 A1 | | 6/2008 | Cho et al. |
| 2008/0275977 A1 | | 11/2008 | Schmidt et al. |
| 2014/0289507 A1 | | 9/2014 | Sitrick et al. |
| 2017/0155509 A1 | | 6/2017 | Sitrick et al. |

OTHER PUBLICATIONS

Nair et al.; Enabling DRM-preserving digital content redistribution; Published in: E-Commerce Technology, 2005. CEC 2005. Seventh IEEE International Conference on; IEEE Xplore (Year: 2005).*
United States Patent and Trademark Office, Non-Final Office Action, U.S. Appl. No. 15/202,532, dated Jan. 17, 2018, 31 pages.
United States Patent and Trademark Office, Final Office Action, U.S. Appl. No. 15/202,532, dated Jul. 20, 2018, 25 pages.
Konheim, Alan G., "Cryptography, A Primer," 1981, 441 pgs., John Wiley Sons, U.S.A.
Schneier, Bruce, "Applied Cryptography Second Edition: protocols, algorithms, and source code in C." 1996, 756 pages., John Wiley & Sons, U.S.A.
Schneier, Bruce. "Applied Cryptography," 1996, Wiley and Sons, Second Edition, Chapter 8 Key Management pp. 169-177.
United States Patent and Trademark Office, Advisory Action, U.S. Appl. No. 11/545,889, dated Sep. 16, 2010, 3 pages.
United States Patent and Trademark Office, Examiner's Answer, U.S. Appl. No. 11/545,889, dated Jan. 14, 2014, 9 pages.
United States Patent and Trademark Office, Final Office Action, U.S. Appl. No. 11/545,889, dated Apr. 29, 2013, 38 pages.
United States Patent and Trademark Office, Final Office Action, U.S. Appl. No. 11/545,889, dated Apr. 13, 2012, 35 pages.
United States Patent and Trademark Office, Final Office Action, U.S. Appl. No. 11/545,889, dated Apr. 23, 2010, 39 pages.
United States Patent and Trademark Office, Final Office Action, U.S. Appl. No. 11/545,889, dated Mar. 31, 2011, 35 pages.
United States Patent and Trademark Office, Non-Final Office Action, U.S. Appl. No. 11/545,889, dated Nov. 17, 2011, 35 pages.
United States Patent and Trademark Office, Non-Final Office Action, U.S. Appl. No. 11/545,889, dated Nov. 6, 2012, 36 pages.
United States Patent and Trademark Office, Non-Final Office Action, U.S. Appl. No. 11/545,889, dated Oct. 28, 2010, 38 pages.
United States Patent and Trademark Office, Non-Final Office Action, U.S. Appl. No. 11/545,889, dated Sep. 29, 2009, 39 pages.
United States Patent and Trademark Office, Advisory Action, U.S.

(56) References Cited

OTHER PUBLICATIONS

Appl. No. 11/546,106, dated Aug. 4, 2010, 3 pages.
United States Patent and Trademark Office, Final Office Action, U.S. Appl. No. 11/545,925, dated Apr. 13, 2011, 37 pages.
United States Patent and Trademark Office, Final Office Action, U.S. Appl. No. 11/545,925, dated Dec. 9, 2011, 38 pages.
United States Patent and Trademark Office, Final Office Action, U.S. Appl. No. 11/545,925, dated Mar. 29, 2010, 54 pages.
United States Patent and Trademark Office, Final Office Action, U.S. Appl. No. 11/546,106, dated May 11, 2011, 44 pages.
United States Patent and Trademark Office, Final Office Action, U.S. Appl. No. 11/546,106, dated May 7, 2010, 26 pages.
United States Patent and Trademark Office, Final Office Action, U.S. Appl. No. 11/546,106, dated Nov. 16, 2012, 46 pages.
United States Patent and Trademark Office, Non-Final Office Action, U.S. Appl. No. 11/545,925, dated Jul. 11, 2011, 27 pages.
United States Patent and Trademark Office, Non-Final Office Action, U.S. Appl. No. 11/545,925, dated Mar. 15, 2012, 18 pages.
United States Patent and Trademark Office, Non-Final Office Action, U.S. Appl. No. 11/545,925, dated Oct. 29, 2010, 39 pages.
United States Patent and Trademark Office, Non-Final Office Action, U.S. Appl. No. 11/545,925, dated Sep. 29, 2009, 38 pages.
United States Patent and Trademark Office, Non-Final Office Action, U.S. Appl. No. 11/546,106, dated Apr. 23, 2013, 46 pages.
United States Patent and Trademark Office, Non-Final Office Action, U.S. Appl. No. 11/546,106, dated Jun. 19, 2012, 45 pages.
United States Patent and Trademark Office, Non-Final Office Action, U.S. Appl. No. 11/546,106, dated Nov. 24, 2010, 43 pages.
United States Patent and Trademark Office, Non-Final Office Action, U.S. Appl. No. 11/546,106, dated Oct. 14, 2011, 43 pages.
United States Patent and Trademark Office, Non-Final Office Action, U.S. Appl. No. 11/546,106, dated Oct. 2, 2009, 32 pages.
United States Patent and Trademark Office, Non-Final Office Action, U.S. Appl. No. 14/217,116, dated Sep. 10, 2015, 28 pages.
United States Patent and Trademark Office, Notice of Allowance, U.S. Appl. No. 11/545,925, dated May 20, 2013, 27 pages.
United States Patent and Trademark Office, Notice of Allowance, U.S. Appl. No. 11/546,106, dated Sep. 27, 2013, 26 pages.
United States Patent and Trademark Office, Notice of Allowance, U.S. Appl. No. 14/217,116, dated Apr. 25, 2016, 18 pages.
United States Patent and Trademark Office, Notice of Allowance, U.S. Appl. No. 15/130,905, dated Feb. 10, 2017, 34 pages.
United States Patent and Trademark Office, Restriction Requirement, U.S. Appl. No. 15/202,532, dated May 24, 2017, 7 pages.
Fujiyoshi, et al., "Hierarchical Encryption of Multimedia Contents for Access Control", IEEE 2006, pp. 1977-1980.
Rosset, et al., "A DRM Architecture to Distribute and Protect Digital Contents Using Digital Licenses", IEEE 2005, Proceedings of the Advanced Industrial Conference on Telecommunications, 6 pages.
Liu et al. "Digital Rights Management for Content Distribution." Proceedings of the Australasian Information Security Workshop 2003, Australian Computer Society Inc. vol. 21, pp. 49-58.
Nair et al. "Enabling DRM-preserving Digital Content Redistribution." Proceedings of the Seventh IEEE International Conference on E-Commerce Technology 2005, 8 pages.

\* cited by examiner

METHOD AND SYSTEM FOR SECURE DISTRIBUTION OF SELECTED CONTENT TO BE PROTECTED

CROSS-REFERENCE TO RELATED APPLICATIONS

This application is a continuation of Ser. No. 15/130,905, filed Apr. 15, 2016 (U.S. Pat. No. 9,679,118), which is a continuation of U.S. patent application Ser. No. 11/545,889, filed Oct. 11, 2006. All of the applications listed above are hereby incorporated by reference in their entireties.

FEDERALLY SPONSORED RESEARCH OR DEVELOPMENT

Not applicable.

FIELD OF THE INVENTION

The present invention relates to data rights management and more particularly to a secured system and methodology and production system and methodology related thereto and to apparatus and methodology for production side systems and are consumer side systems for securely utilizing protected electronic data files of content (protected content), and further relates to controlled distribution, and regulating usage of the respective content on a recipient device (computing system) to be limited strictly to defined permitted uses, in accordance with usage rights (associated with the respective content to control usage of that respective content), on specifically restricted to a specific one particular recipient device (for a plurality of specific particular recipient devices), or usage on some or any authorized recipient device without restriction to any one in specific, to control use of the respective content as an application software program, exporting, modifying, executing as an application program, viewing, and/or printing of electronic data files. These electronic data files can be any type of content, such as for word processing, or image files (such as for audio, visual and audiovisual components), for movies, or still photo visual image files, or audio only files, or any type of stored data content, or content which when authorized is an executable application software program, etc. The present invention applies and works equally well with any of these forms of digital electronic data files.

BACKGROUND OF THE INVENTION

There is a need to have controlled distribution of digital files in order to protect the proprietary ownership rights as well as non-copyrighted works and other rights including trade secret and business proprietary.

Heretofore, the provision of secured communication (or other distribution) of data files to be protected, has been provided utilizing a variety of techniques, all of which are complex and confusing to the users of the product. Furthermore, the so-called electronic data files, lack in actual security offered, and often fail in being utilized in the areas where it is needed.

In the case of distribution of data files of content comprising text, images, and electronic sheet music, a number of formats have been derived to securely transmit and restrict and selectively provide for either viewing and/or printing of electronic data files. Proprietary systems are available from the music composition software companies of Sibelius (providing a "Scorch" product), and a Finale/Make Music, Inc., which provides its own tools. Additionally, numerous encryption schemes have been derived for transfer of audio music files. These include those provided at the iTunes' website by Apple Computer, Inc., and analogous schemes from others. Additionally, the company POP, Inc. (Pretty Good Privacy, Inc.), provides both free and purchasable commercial grade products implementing data encryption techniques to permit RSA encryption implementation on files representing data content or application files. Furthermore, many Adobe Acrobat, "PDF" data files are in use, but with minimal or no protection. Additionally, Windows XP, by Microsoft, Inc., offers options for encryption of files.

Secure distribution usually involves encryption or proprietary conversion of some kind. There are many well-known options for this. Encryption, hash functions, other one-way functions, and symmetric and asymmetric encryption are well known to those skilled in the art. (To generally educate oneself, see Applied Cryptography, by Bruce Schneier, Chapter 2, Protocol Building Blocks; also see Section 2.3 on One-Way Functions). The present invention is not restricted to any specific type of encryption, and is compatible with any that otherwise fits specific design needs of an embodiment.

Usage of specific terminology defined within this patent specification shall have the specific meaning ascribed it therein.

The notion of a one-way function is central to public-key cryptography. While not protocols in themselves, one-way functions are a fundamental building block.

One-way functions are relatively easy to compute, but significantly harder to reverse. That is, given x it is easy to compute f(x), but given f(x) it is hard to compute x.

A trap-door one-way function is a special type of one-way function, one with a secret trapdoor. It is easy to compute in one direction and hard to compute in the other direction. But, if one knows the secret, one can easily compute the function in the other direction. That is, it is easy to compute f(x) given x, and hard to compute x given f(x). However, there is some secret information, y, such that given f(x) and y it is easy to compute x.

A one-way hash function can be implemented in many ways and has many names such as compression function, contraction function, message digest, fingerprint, cryptographic checksum, message integrity check (MIC), and manipulation detection code (MDC). One-way hash functions are central to modern cryptography, and are another building block for many protocols.

Hash functions have been used in computer science for a long time. A hash function is a function, mathematical or otherwise, that takes a variable-length input string (called a pre-image) and converts it to a fixed-length (generally smaller) output string (called a hash value).

The point here is to produce a value that indicates whether a candidate pre-image is likely to be the same as the real pre-image. Because hash functions are typically many-to-one, you cannot use them to determine with certainty that the two strings are equal, but you can use them to get a reasonable assurance of accuracy.

A one-way hash function is a hash function that works in one direction: It is easy to compute a hash value from pre-image, but it is hard to generate a pre-image that hashes to a particular value. A good one-way hash function is also collision-free: It is hard to generate two pre-images with the same hash value.

The hash function can be public; there's no need for secrecy to the process. The security of a one-way hash function is its one-wayness. The output is not dependent on the input in any discernible way. A single bit change in the pre-image changes, on the average, half of the bits in the hash value. Given a hash value, it is computationally unfeasible to find a pre-image that hashes to that value.

A hash function can be thought of as a way of fingerprinting files. Thus, to verify that someone has a particular file (that you also have), then ask him for the hash value. If he sends you the correct hash value, then it is almost certain that he has that file. Normally, a one-way hash function is used without a key, so that anyone can verify the hash. If one wants only the recipient to be able to verify the hash, then one can use Message Authentication Codes.

A Message Authentication Code (MAC), also known as a data authentication code (DAC), is a one-way hash function with the addition of a secret key. The hash value is a function of both the pre-image and the key. The theory is exactly the same as hash functions, except only someone with the key can verify the hash value. A MAC can be created out of a hash function or a block encryption algorithm; there are also dedicated MACs.

Public-key cryptography, as described in 1976 by Whitefield Diffie and Martin Hellman, uses two different keys— one public and the other private. It is computationally hard to deduce the private key from the public key. Anyone with the public key can encrypt a message but only the person with the private key can decrypt the message.

Mathematically, the process is based on the trap-door one-way functions. Encryption is the easy direction. Instructions for encryption are the public key; anyone can encrypt a message. Decryption is the hard direction. In the best case, it is made hard enough that people with super computers and years couldn't decrypt the message without the secret. The secret, or trap-door, is the private key. With that secret, decryption is as easy as encryption.

To send a message using public-key cryptography:
(1) Both parties agree on a public-key cryptosystem.
(2) Party 1 sends Party 2 a public key.
(3) Party 2 encrypts a message using Party 1's public key and sends it to party 1.
(4) Party 1 decrypts Party 2's message using Party 1's private key.

Commonly, a network of users agrees on a public-key cryptosystem. Every user has his or her own public key and private key, and the public keys are all published in a database somewhere.

With asymmetric key encryption, one key is public (e.g., to encrypt or to decrypt), and the other key is private (e.g., to decrypt or to encrypt, respectively).

In the real world, public-key algorithms are not a substitute for symmetric algorithms. They are not used to encrypt messages; they are used to encrypt keys. The reasons for this are that public-key algorithms are slow and that public-key cryptosystems are vulnerable to chosen-plaintext attacks.

In most practical implementations public-key cryptography is used to secure and distribute session keys; those session keys are used with symmetric algorithms to secure message traffic. This is sometimes called a hybrid cryptosystem.

Using public-key cryptography for key distribution solves a very important key-management problem. With symmetric cryptography, the data encryption key sits around until it is used. If anyone ever gets their hands on it, they can decrypt messages encrypted with it. With the hybrid cryptosystem, the session key is created when it is needed to encrypt communications and destroyed when it is no longer needed. This drastically reduces the risk of compromising the session key. Of course, the private key is vulnerable to compromise, but it is at less risk because it is only used once per communication to encrypt a session key.

Public-key Cryptography or Public Key Cryptography refers to a form of cryptography in which each user has a public key and a private key. Messages are sent encrypted with the receiver's public key; the receiver decrypts them using the private key. Using this method, the private key never has to be revealed to anyone other than the user.

Private Key Encryption refers to a form of cryptography in which sender and receiver have the same key or similar keys.

Private Key Cryptography refers to a form of cryptography in which the encryptor and decryptor use the same key, which must be kept secret. This methodology is usually only used by a small group.

Secret Key Encryption refers to a form of cryptography in which sender and receiver share a secret key.

As discussed above, hash functions are one-way functions.

Hashing is one-way function. It cannot be reversed.
   From the hash, you cannot compute the original message.

Hashing is repeatable.
   If two parties apply the same hashing method to the same bit string, they
   will get the same hash.

Standard hash functions include:
1. SHA-1—Secure Hash Algorithm (vers. 2)
   MST standard 1995
   160-bit message digest, input processed 512-bit blocks
2. MD5 Message Digest 5
   RFC 1321
   128-bit message digest Prior applications of hash functions include:
   A. Storing passwords on disk (Unix, Windows, Macintosh, Linux)
   B. Creating a digest of a message (a fingerprint) later to be signed
   C. Authentication: send Hash (random_value+key)

Encryption is different than Hashing.
encryption uses a key as an input to an encryption method, the output is similar in length to input; and
is reversible (ciphertext can be decrypted back to plaintext).

With Hashing,
a key is usually added to text; the two are combined, and the combination is hashed;
the output is of a fixed short length, regardless of input; and
it is a one-way function (hash cannot be "de-hashed" back to the original string).

Most encrypted content today is encrypted with an encryption key and then a decryption key is used to decrypt the data. The encryption/decryption key pair are sometimes identical (the same) or a matched pair (but different). Either way, the decryption key must be supplied to decrypt the content. If a new decryption key is desired, the content must be re-encrypted. Further, as long as one has the decryption key and the encrypted content, it can be decrypted anywhere and once decrypted, the data can be copied as desired.

A need, therefore, exists for encrypted content to be encrypted only once and yet can be distributed widely. A need exists for the distributed encrypted content to only be available for use on certain specific authorized computers, for usage in accordance with defined usage rights (that can be fixed or have varying rights. A need exists to minimize the computational power required to distribute content to a plurality of users (e.g., up to thousands or even to millions of customers) and a need exists to allow such content to be distributed on media such as mass produced CD-ROMs.

Server-based authentication, while possible, is limited in utility by requiring connection to a server for authentication in order for an appliance to use a file.

It is, therefore, an object of the present invention to provide a methodology and system to provide for the selectively controllable distribution of data files (content) to be protected, and selectively controllable computer appliance specific based usage options such as viewing and printing of electronic data files (or exporting of files, or running of an application software program). It is a further object to make the use of the methodology and system easy and straight forward for the provider of encryption services and for the consumer of decryption services.

SUMMARY OF THE INVENTION

In accordance with those and other objectives, the present invention provides in one embodiment, a system and methodology for uniquely encrypting the content for a specific remote appliance's specific usage so that content may be encrypted utilizing an Appliance Identification generated internally within the remote appliance and may also be selectively permitted to view and/or export and/or print and/or execute as an application, the electronic data file. This Appliance Identification is utilized both in the encryption by the provider and is utilized in the recipient device as a part of decrypting in the recipient device (at the consumer level) so as to provide for appliance specific control of utilization of the encrypted content, wherein the control is provided responsive to generation of an appliance identification of a recipient device, such as provided by a query to hardware or installed software in the respective recipient device.

In accordance with one aspect of the present invention, a system and methodology are set forth, providing a structure system architecture for production systems and for recipient systems. Usually, the production systems are run by-or-for the owners (e.g., publishers or copyright owners) or distributors of content to be protected and distributed for restricted regulated controlled usage only on authorized recipient systems. In a preferred embodiment, the usage can further be made specific to a particular recipient device system (e.g., the user's appliance). Overall, the trusted provider's production system provides the production subsystem that works with the recipient subsystem comprised of the recipient system (e.g., recipient device).

In accordance with another aspect of the present invention, protected content is made to be appliance specific. Consumers are supplied only a partial decryption key, wherein a respective utilized production key is encrypted utilizing the generated Appliance ID to provide an encrypted production key. This partial encryption key is useless until the Appliance ID is internally generated and provided by the recipient device appliance, to allow the decryption and generation at the recipient device of a production key copy, which is the key necessary to decrypt the protected content locally at the recipient device of the consumer. The consumer never is allowed to see the production key copy and cannot alter the Appliance ID because it is generated from fixed computer identification parameters.

The distribution of documents, whether they take the form of musical scores, pictures, movies or audio or executable software application programs, remained relatively secure when the distribution medium was a physical paper, tape, film or CD-ROM, respectively. The cost of duplication was typically much more than the cost of the legitimate item. However, with the advent of digital content this distribution cost drops significantly and is a concern for the owners of content (such as documents). For example, this problem exists in the distribution of electronic music.

In accordance with a further aspect of the present invention, Data Rights Management (DRM) is implemented by applying a single encryption to selected files of content for a specific distribution.

In accordance with still another embodiment, to further encrypt for a specific recipient device (such as a particular computer running respective application software), an Appliance ID provided by that specific recipient device (running the application software) is used by the trusted provider (production system) to encrypt the respective associated production key that was utilized for encrypting of respective associated selected files of original content (and associated ticket, where present) as used to generate the respective encrypted content (and where present, the respective associated encrypted ticket). This allows distribution of protected content via Internet download, email, or CD-ROM, etc.

Note, the distributor (trusted provider) can also choose to encrypt the same original file of selected content multiple times, each time differently for different distributions. In this case, the user recipient device is given a key (password) to unlock and deliver usage rights and selectively control and allow access to the content. This key is valid only for the respective content and is valid only on a particular computer. As discussed herein, each computer also has its own identifier, which is generated by respective application software on the recipient device as an Appliance ID. The Appliance ID is generated from specific data within the recipient device, and it is not editable by the user of the recipient device.

In one preferred embodiment, there are tickets (or associated control data) [defining rights], associated with, or included with, or integrated within the original (and encrypted) content. The tickets specify the usage rights for respective associated content that a particular computer recipient device is granted. Once the particular computer has the key(s), the respective associated ticket(s) and the respective associated encrypted content, the particular recipient device provides for selective access to the protected (encrypted) content that is available locally at that particular recipient device computer (without requiring any access or connection to a central server).

At the production subsystem where the content is encrypted initially, the original (selected) content is encrypted responsive to an associated production key to generate respective associated encrypted content. The encrypted content is made selectively available and only utilizable on the recipient device utilizing the respective application software program running on the respective particular computer. In this case, the encrypted content is selectively usable only by the specific particular computer that generated the Appliance ID that was provided to the production subsystem, and that was utilized by the production subsystem to encrypt the respective production key, to provide as an encrypted production key, which is thereafter provided to the particular computer recipient device which utilizes the Appliance ID to decrypt the encrypted production key to generate a decrypted production key which is used to decrypt the encrypted content, and where appropriate, to decrypt the associated encrypted ticket to define usage rights for the associated encrypted content. The production key is encrypted responsive to an Appliance ID (such as generated at the specific computer), to generate an encrypted production key that is provided to and can only be decrypted by the specific particular computer that provided the respective Appliance ID. The integrity of the distribution and controlled usage process is thus maintained.

In accordance with the production aspects of the present invention, encryption tools are used to convert original content into an encrypted form of encrypted content and to create production keys (used by the production subsystem). These tools can be implemented in multiple, alternative forms, such as stand-alone programs, ActiveX servers, etc. The encrypted content can only be used with particular associated (and preferably authorized and validated) application software running on a computer system. The associated authorized application software can be a stand-alone product, a plug-in, or can be included within another specific respective application software. In any case, the associated application software provides for one or more of regulated selective viewing, annotating, collaborative networking, selective printing, selective exporting, and selective active execution of content representing executable application software. Optionally, for another level of appliance specific protection, in addition to the above, a user must obtain an appliance specific key (e.g., a password, a hardware component or otherwise) for use in their particular computer in order to access the protected content. The production key is combined in a secure way with or generated from the Appliance ID to generate an appliance specific key only usable for a particular specific computer recipient device. Tickets defining usage rights can be generated and included with, or separately associated with, or integrated into, the respective associated content (as encrypted) for granting rights to the respective encrypted content on the user's particular specific recipient device computer running the respective associated application software. Authorization can be implemented, controlled and distributed, via a host web site(s) production subsystem, with delivery of the encrypted production key, and optionally the encrypted ticket and/or encrypted content provided to a user by direct download, email, regular postal mail, other electronic delivery or raw text, etc.

A particular specific computer (recipient device) running the respective application software or integrating in the associated application software into other software (also referred to as a client application), provides for control of the access to and usage of the encrypted content on the recipient device, and can also provide other functions. Additionally, other client application software (having the associated application software integrated therein) can be created to provide data rights management (DRM) functionality for other uses. These client applications can even be embedded into specific appliances, into specific other applications, or into computer operating systems. Alternatively, various subprograms that can be integrated into an associated application software's functionality, can provide either or both of stand-alone or integrated modules into other software, to provide therefor, respective DRM compatible application software.

BRIEF DESCRIPTION OF THE DRAWINGS

These and other aspects of the present invention will become clearer by reference to the accompanying drawings and detailed description of the drawings, wherein:

FIGS. 5-8 illustrate more detailed block diagrams of the provider encryption services block 104 of FIG. 1A; wherein FIG. 5 illustrates a block diagram and state flow diagram for generation of an encrypted content output and an encrypted production key output;

FIG. 6 illustrates a detailed block diagram of the production key block 140, illustrating the generation of the encrypted production key from the production key and an Appliance ID (preferably a jumbled Appliance ID, and securely communicated) coming from either the appliance (e.g., recipient device) or a storage means (e.g., history file for customer on a host server) storing the Appliance ID from the appliance.

FIG. 7 illustrates a detailed block of the content encryption block 102, utilizing the production key and original encrypted content to generate the encrypted (original) content output;

FIG. 8 illustrates a more detailed diagram of the production key generation subsystem 101, which provides for generation of a production key from either a saved key or by generation of a new key;

FIGS. 9-12 provide further details of the consumer decryption services subsystem 204 of FIGS. 1-4 (such as on one or more recipient systems running associated application software); wherein FIG. 9 illustrates the block diagram and data flow related to the utilization of the communicated encrypted content, jumbled encrypted production key, and utilizing an internally generated Appliance ID to decrypt the production key to generate a production key copy, and for utilizing the production key copy to decrypt the encrypted content copy to provide (preferably-temporary) unencrypted content out;

FIG. 10 illustrates the subsystem 204 for generating the Appliance ID (and jumbled Appliance ID where utilized), for provision respectively within the consumer decryption services subsystem 204 and to the producer subsystem 104;

FIG. 11 illustrates the production key decryption subsystem providing for decryption of the encrypted production key utilizing the internally generated Appliance ID to generate an appliance key utilized to decrypt the encrypted production to provide a production key copy output to the consumer decryption subsystem 204;

FIG. 12 is a more detailed block diagram and state flow drawing of the decryption of content subsystem 202 of the consumer decryption subsystem 204 providing for decryption of the encrypted content copy utilizing the production key copy to generate the unencrypted content (preferably only temporarily storing the unencrypted content during its usage), for use by the consumer decryption subsystem 204;

FIGS. 13-15 illustrate various aspects of usage rights ticket generation, encryption, decoding, and utilization of a rights ticket of FIGS. 3-4; wherein FIG. 13 illustrates the encrypted ticket generator 401 of FIGS. 3-4 for providing an encrypted ticket output providing for associated defined rights, allowed usages, and Ticket IDs, wherein the encrypted ticket output is associated with production key and encrypted content;

FIG. 14 illustrates ticket decoding at the consumer decryption subsystem 204 and more specifically the utilization in the subsystem 430 of the encrypted ticket output of the encrypted ticket generator 401 wherein the encrypted ticket copy and production key copy are utilized by a decryption engine to generate a ticket copy which is utilized via ticket decode logic to determine rights and allowed usages and Ticket ID verification;

FIG. 15 illustrates the overall system operation for the encrypted ticket generator 401 and the resulting ticket decoding 430, providing an overall production and consumer system block diagram and state and data flow diagram;

FIG. 16B illustrates the system of 16A where the encrypted content (and where applicable, the associated encrypted ticket) and the associated encrypted production key are combined into a single file output which is thereafter provided to the consumer subsystem (e.g., the recipient device), wherein FIG. 16B is analogous to FIG. 16A, except for the addition of combining logic and separating logic as present in FIG. 16B and not in FIG. 16A, wherein FIG. 16B relates to FIGS. 2, 4, 5-15, and 16-33;

DETAILED DESCRIPTION OF THE ILLUSTRATED EMBODIMENTS

Figure 1:
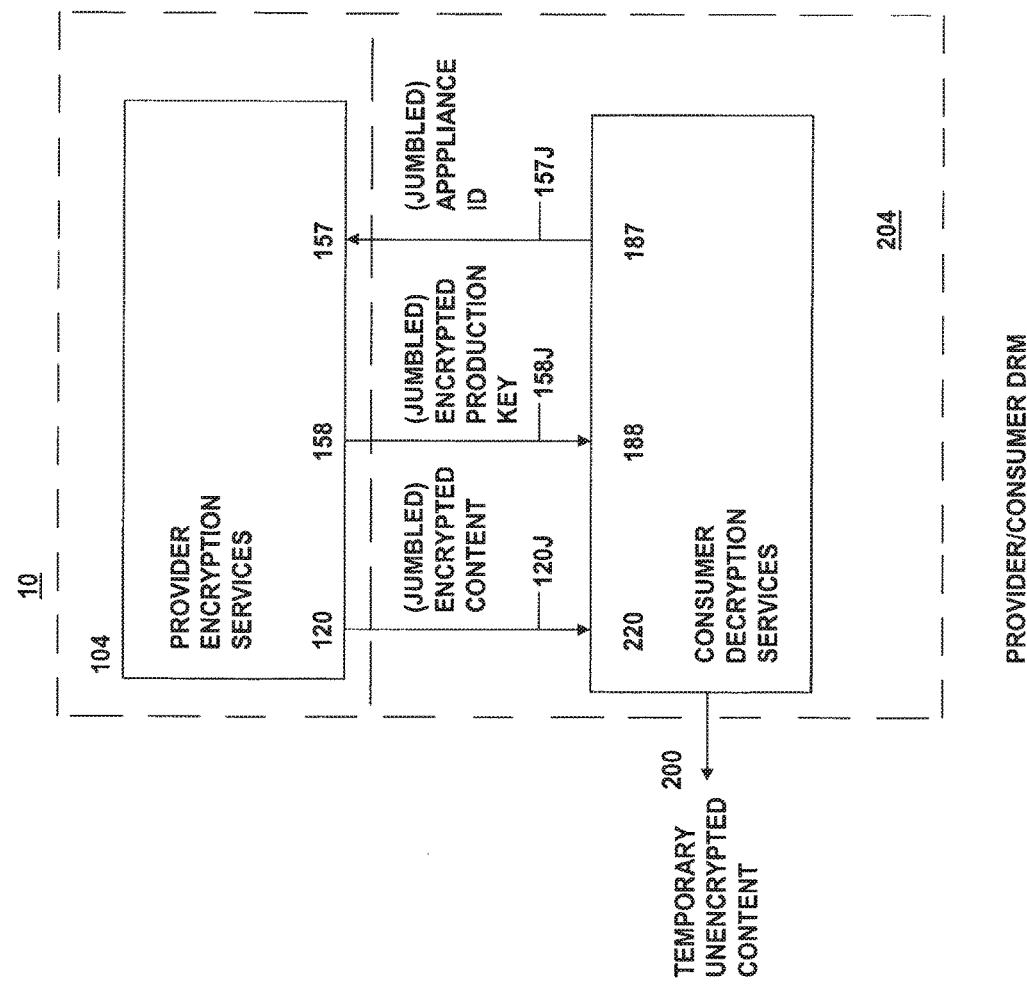
FIG. 1 is a block diagram at a system level showing the provider and consumer sides, and a data rights management overview, illustrating provider level encryption services and consumer decryption services.

The ease of transmitting electronic data from one medium to another has necessitated advances in encryption to secure distribution to protect copyright and trade secrets. The security system and methodology of the present invention provided herein provide for secure distribution and regulated control of usage for protected content provided to recipient device-based products. This mitigates concerns of publishers and editors who want to ensure their works are protected while preserving the ability for others to legally use a copy of the original content unencumbered. Protected works of original content are encrypted for security prior to transmission.

In accordance with the present invention, original content (e.g., information) that is selected to be protected is encrypted and is stored in a proprietary, encrypted format by a trusted provider production system that only valid recipient device appliance software can read or use. Therefore, protected works stay protected no matter where they are, whether on one or more computers, CDs, or via the Internet. In accordance with the present invention, only designated specific recipient devices and authorized trusted providers are able to decrypt this protected data. An encrypted content file, in accordance with one aspect of the present invention, is completely unreadable and unusable on any system except the intended specific authorized recipient device (or devices). The protected content is not usable or readable on any other recipient device, or any other computer that is not authorized, or on any other system, or on CD-ROMS, on a PC, on the Internet, or anywhere else. Each recipient device appliance has a unique identifier associated with it, that is used, in a preferred embodiment, during the encryption process to ensure that protected content is appliance specific and can only be viewed and/or otherwise usable on the recipient device (or devices) that is was intended for. In one preferred embodiment, where copyright or trade secret protection is applicable, all protected content is also protected by affixing or displaying an appropriate copyright notice (or trade secret or other notice) that is not removable.

In another preferred embodiment, a production system generates a specific particular production (encryption) key as associated with the respective selected content. The particular production key is used in encrypting said selected content. A ticket (or other associated data) is generated to define permitted usage rights for the respective selected content, (either based on default criteria (e.g., no use, some uses, and full use) or based upon specific defined usage permission criteria. The production system preferably uses RSA to encrypt its data, RSA is an industry standard encryption used by thousands of companies around the world, including Citibank, Microsoft, Oracle, and Wells Fargo. It has resisted attempts to crack it for over four decades, and is a very powerful encryption solution more than suitable for protecting original content. However, any other encryption technology can also be utilized with the present invention. The choice is one of design consideration.

In a preferred embodiment, several functions that the recipient device would otherwise be able to perform can be selectively disabled (or enhanced) for respective particular encrypted content responsive to respective associated usage rights permissions. In one embodiment, default usage rights permit each authorized recipient device to be allowed to always be able to view encrypted original content that was intended for it.

Examples of functions that be selectively enabled (or disabled) include:
  Permitting modification of original content on the recipient device that allows users to add their own custom markings (such as text, lines, graphics, or such as bowings, fingerings, and slurs, to sheet music) to the video display of the decrypted content on the specific recipient device. This feature can be selectively enabled or disabled for each respective file of particular original content, Sharing of original content (as encrypted), allows for users to share data for the selected original content and the respective associated annotations (if any) to other specifically authorized recipient devices (or all authorized devices, such as on a network. This feature can be selectively enabled or disabled for each file of specific particular original content.

Exporting of Protected Original Content
  The recipient device selectively allows users to save or export all or part of selected encrypted original content, and/or selectively also respective associated annotations (where applicable), and other respective associated metadata (properties such as the title and author, composer of a composition piece). The export is to another authorized recipient device appliance/computer. This feature can also be selectively enabled or disabled for each file of particular original content. The saving or exporting can be in the same format as the original selected content, or converted and stored in an alternative format (or one of multiple formats (such as a "save-as")). The multiple formats can include additional encryption, different encryption, no encryption, conversion to a different file format, etc.

Printing of Protected Original Content
  The recipient device allows users to print out for all or a specified portion of respective protected original content (selectively with and/or without annotations, or of only the annotations) to a selected attached printer. This feature can also be selectively enabled or disabled for particular works. Also, this feature can be set to regulate how many printed copies are to be allowed (e.g., 0, 1, 2, other).

Execution of the decrypted original content (or a part thereof) as an application program running on the recipient device, where there is an associated usage rights ticket, the uses and usage of the application program are regulated and defined as per the permissions of the associated ticket.

The system and methodology of the present invention, provide for a production system and methodology for the production of protected content, production encryption keys, (and where applicable, associated usage rights) and for secure distribution by a trusted provider's production subsystem, to a consumer subsystem with a recipient device appliance running valid authorized respective associated application software. The system and methodology of the present invention provides for secure distribution, transmission and storage for protected content at all times, thereby protecting the rights of the original content holders and owners and, therefore, ensuring that their original content works stay protected. The present invention also provides for simplified user (consumer) interaction, and in an easy to use manner allows people to legitimately use protected content in permitted ways.

In accordance with one aspect of the present invention, a system and methodology for secure distribution and protection of usage of protected content provides an infrastructure supporting one (or more recipient devices) user appliances—each recipient device comprised of a computer subsystem (processor, memory, display, etc.) running an (authorized, validated) executable application software program (herein also referred to as one of a specific (or particular) device (or appliance or recipient device), providing for one or more defined permitted uses of protected content, and optionally, additionally or alternatively, restricting any usage of the respective content to be only usable on a specific particular appliance. In other words, the protected content is made appliance specific (only usable on a specific defined appliance).

This system and methodology also allows users of the recipient device to efficiently interact with and use the protected content information. The protected content can be of their own creation, or licensed from one or more multiple third parties of original content.

This system and methodology of the present invention also provides controls to be utilized by and for the benefit of owners, producers, distributors, and publishers, to utilize to limit the use of their protected content to (1) any authorized recipient device appliance (a computing system running an authorized copy of the associated application software (that is compatible with the methodology and structure and outputs used by the respective production subsystem to generate the protected (encrypted) content, etc.). (2) Additionally, control of usage can be further restricted to limit usage to only a specific appliance (or specific appliances) that are licensed, by making the protected content only usable on a specific particular designated one (or more) of the specific appliance recipient devices.

In a preferred alternate embodiment, the trusted provider's production system selects the level of security to be associated with protected content. The options for security levels are completely flexible and variable, and can be set to be any of a plurality of levels over a range from limiting to only certain usage of the protected content on specific particular ones of recipient device/appliances, and ranging to permitting all uses of the protected content on any authorized recipient device (appliance), any usages desired to be regulated, including all permitations and combinations of the above. For maximum enhanced security, usage is controlled to only be usable only on a specific designated one or ones of the recipient device(s).

In accordance with another aspect of the present invention, the system and methodology provide for associated identification data of related information (such as the origination, date of creation, alternate titles, etc.) of the protected content information. The association of the associated identification can be either physically associated with or logically mapped or indexed to the respective associated data file(s) (content, key, and ticket). This related associated identification information can be either stored within (as a part of) the protected encrypted content, or provided as additional data stored separately from (but associated with) the respective protected encrypted content.

A data file of selected content is first converted and encrypted (and stored) in a proprietary file format by a trusted provider (with a production system) to provide for protection of the protected content information. The proprietary encrypted security format (referred to alternatively as ESF format or protected content format or encrypted content) provides a file protection methodology, infrastructure and architecture. This file structure can contain one or multiple named objects that each may mutually exclusively be encrypted (or not).

In a preferred embodiment, only a licensed user or a recipient device, one using a computing system running authorized licensed application software, can utilize the protected content in the proprietary file format. In one embodiment, usage of the respective content on the recipient device can be even further restricted in accordance with associated usage rights or permissions associated with each respective file of encrypted content [that is, either embedded or as a separate rights data file component of the respective encrypted content or as a separate associated data file (e.g., a ticket)], when that security level is enabled during production.

During the production of the protected content in the proprietary file format, the production system (also referred to as production subsystem) sets the permission (usage rights) level for each file that is selected (the selected file), the selected file is encrypted, to create a file of protected (encrypted) content. Alternatively, multiple files can be encrypted as a group, at a selected set level of permission usage rights. Protected content can be converted (and stored) at multiple usage levels.

Examples of levels of usage rights permission that can be set for a protected file (or group of files) include:
Basic Level—Predefined permissions only [e.g., (view only, no export, no print), (view and print once), (limited import), etc.], no additional usage restriction.
Standard Level—Permissions limited to usage restrictions such as view only, or view or print once, only, etc.
Enhanced Level—Permissions can be set to any one of a plurality of options for usage restriction of content, and further with unique appliance specific usage encryption.

There are many in-between, and additional other, usage levels, providing for setting of a level for one of various combinations of permitted usages, including types of encryption, etc., that can be defined and implemented, in accordance with use requirements and design choices.

In one embodiment, the only level of usage restriction that the user of the recipient device can set is for content of the user of the recipient device, and only at the Basic Level. Alternatively, either Basic and Standard level encryptions can be performed for content of the recipient device. The provider/producer of protected content can set any level of usage restrictions and encryption. After distribution, the user of a recipient device cannot alter usage restrictions unless permitted by the usage rights permissions, and then, preferably, only more restrictively than the original (to maintain security).

Enhanced usage level encryption of content can only be encrypted by a trusted provider of the content that has production encryption application software to provide for content encryption, and setting of usage right permissions (restrictions), etc. The Enhanced usage restriction level in addition to content usage restrictions, as described above, provide for restricted access to the decrypted information, solely restricted to a particular specific one (or more) authorized remote device appliance(s). This is distinguished from the illustrated Basic and Standard Levels, where any licensed recipient device appliance can decrypt the Basic or Standard level encrypted content.

In accordance with a preferred embodiment of the present invention, usage rights permissions are associated with a specific encrypted content file by the provider/producer [such as by an indexed mapping using an ID for mapping the usage rights to the respective file (or files)], and are further utilized by the associated authorized application software on one or more authorized recipient devices, for controlling usage on a respective recipient device for respective associated protected encrypted content.

The various security levels of encryption can be applied to any type of content and/or object, and multiple encryption levels can be used within a given file or files or set of information.

Additionally, all encryption levels can optionally provide for notices (such as copyright notices), warning of the restricting of the use of the protected content as only for authorized licensed users.

An Enhanced Level Encryption option is preferable for maximum protection of content.

With the Enhanced level of encryption level security, the data to be protected is encrypted using a private key (an encryption key) (such as of a RSA public/private data key pair). This private key is provided by (generated or recalled from storage or otherwise provided) and kept by the trusted provider (or providers) only. Trusted providers should, preferably, be a very limited group of entities, trustworthy to maintain confidentiality as to the keys, the process and all related aspects.

The encryption of the selected content by the private data key allows the selected content data to (1) be verified as legitimate data and, (2) not be altered by another third party, other than the intended recipient device, since none of them have, or can generate this key. This encrypted protected data is unintelligible on any computer, CD-ROM or across any public network, without the public data key. The public data key (also referred to as encryption key, or production key, or production encryption key, or authorization key) is never shared beyond the trusted provider without the public data key itself first being encrypted. Only a recipient device computing system capable of decrypting the public data key is able to use the information.

The public data key is encrypted (such as by using a RSA symmetric authorization key, or other means) responsive to a unique identification. Preferably, the unique identification is at least in part generated responsive to unique identifying information generated from within a specific recipient device. Alternatively, the public data key can be provided by a particular recipient device (specific appliance).

For example, the unique ID can also be provided by generation of a unique ED via software in the recipient device (either via a pool of pre-assigned numbers, via a random number type generator combined with other data (such as time of day, date, etc.) The authorization key is confidential, and is maintained as a trade secret combination of a unique ID (also alternatively referred to as Appliance ID) generated by a particular recipient device appliance (such as generated based upon the unique network card MAC address, and/or other information). The recipient device software application obfuscates the process (such as in the binary code) and uses the unique identification (ID) to decrypt the respective public data key that was encrypted at the trusted provider for the respective content. For optimum security, the recipient device application software never reveals authorization keys to any user, and never stores (as decrypted) authorization keys in a file (except in an encrypted form), and minimizes the presence of any decrypted authorization key in RAM to a temporary transient presence. This provides security at multiple levels, (1) since the protected (encrypted) content cannot generally be used by just any computer to utilize protected content, (2) since knowledge is needed of the specifics and the methodology, (3) since the computing system must be running the proper application software and (4) since the computing system must be comprised of components to enable the application software generates the unique ID and other information utilized by the application software to generate and Appliance ID that is used to decrypt the encrypted public data key (that cannot otherwise be determined and thus, the protected (encrypted) data cannot be used).

In accordance with one aspect of the present invention, a system and methodology is provided for generating, or otherwise providing production encryption keys, and storing, and selectively re-utilizing the keys. In a preferred embodiment, a new encrypted production key public data key is created for every recipient device appliance (each with its own unique ID) within which the protected content data is to be selectively authorized for usage.

This allows great versatility, such as permitting mass production and distribution of selected protected content, such as by placing the encrypted (protected content) data to be placed on a CD-ROM or via Internet. Thereafter, the production key can be encrypted using a respective unique ID from a particular recipient device, and then, the relatively small encrypted public data keys (encrypted production keys) can be sent to the selected ones of the recipient devices. The encrypted production keys can only he used by the respective particular recipient device (specific recipient device that generated the respective unique ID utilized to encrypt the production encryption key), to authorize and be decrypted by the specific particular recipient device in providing for the permitted use of respective protected (encrypted) content on a selective basis.

In one embodiment, a selected file (or files) of content data is encrypted only once with a single production encryption (public data) key. This allows one encrypted public data key to always be utilized to generate a respective encrypted production key (such as utilizing a particular unique ID to generate an appliance key) for that respective composition. This simplifies the process, and is useful in many applications, such as providing server-based on-line distribution of protected content.

For maximum security, encrypted data is not stored in an unencrypted form on any hard disk file on any recipient device appliance. However, if desired (for a special situation, for example), special usage permissions can be set by an authorized trusted provider to permit this operation.

In a preferred embodiment, with regulated usage rights, there are two (2) interrelated portions of selected content data that are encrypted for each file, portion of file, or group of files. First, there is a first portion that is the actual original content data information (such as text, graphics, performance notation such as sheet music, data representative of a still or motion video or an audio image, an executable program file, or other data file) that is encrypted. The second portion of selected content data is associated with a respective first portion. The second portion defines permissions for the use of the respective associated first portion (the original content), (such as a permissions for viewing or printing viewable information). The first portion (original content) and the associated second portion (usage rights such as a ticket) can each be separately encrypted as two separate files, or encrypted together as one file. In either case, the encryption is done using the same production key. Then, at the recipient device appliance, both the first portion and the second portion must be decrypted using the same public data key (encrypted production key), (which is decrypted by the respective recipient device).

Only a trusted provider, (e.g., distributor/publisher) of the content can determine and set the usage rights permissions for associated encrypted (protected) content. Usage rights can be set according to multiple options. There can be a preset minimum usage (e.g., a default level of none to little rights, hanging up to an unrestricted level of all rights), selectively set based upon criteria or related to a specific transaction [such as transaction data (e.g., a credit card related transaction to purchase usage rights).

User level authorization of appliances (such as hierarchical-based levels), (e.g., multiple levels, ranging from maximum usage rights to minimum (or more restricted (relatively)) usage rights can be set to be based upon relative rank or importance of respective appliances and their respective users). For example, a conductor is least restricted (having the most permissions), with each subsequent user group at a lesser usage rights level vis-à-vis the previous (higher) user. After conductor, the next level for a symphony would be concertmaster; then, principals for each instrument, and the next level would be lateral players (e.g., all violins, all cellos, etc.). This hierarchical rights levels also apply to other types of user groups (e.g., a school, class).

Permissions for usage rights can be (1) regulated either by type of usage for any authorized recipient device appliance, or (2) regulated so as to only work on a particular specific appliance (or multiple particular specific appliances), and then further regulated to selectively control type of usage on a respective specific recipient device. There are many alternative options for usage permissions.

Examples include:
e Permissions by appliance (specific appliance (also called appliance specific) usage).
Permissions can be regulated by usage option type, such as:
Annotation (modifications allowed, or not, and to what degree),
Export ESF [encrypted content (optionally with associated usage rights)].
Export components of selected protected original content
   individual pages exported to industry standard formats
   annotations
   other metadata
Print (zero, one copy, defined number of copies).
Execute as an application program at specified level of functionality and/or for specified number of uses.

Permissions can also include other associated data, such as creator of the permissions, password, and modification of the permissions rights.

Permissions can also be set to limit usage to a defined number of times. Many options exist. For example, in one embodiment, during production of the encrypted content and associated usage rights permission, usage rights are set in the most restrictive state, in the absence of any explicit permissions. Many other options also can be selected, based upon design criteria and requirements of the trusted provider.

In a preferred embodiment, permissions data in the Enhanced level encryption model are encrypted twice, first, with the private data key, and then with the authorization key. Only the trusted provider/producer of the encrypted content is capable of performing the encryption of the production key (only it has the private data key). By encrypting the production key utilizing a unique Appliance ID generated at a particular specific recipient device appliance, only that particular specific recipient device appliance can decrypt or use the encrypted content, or encrypted permission associated with and related to the protected content. The Enhanced security level permissions cannot be changed by the user.

Permissions can be provided to the user in one complete package (integrated or otherwise combined as a single file or group of files) or in multiple packages (that is, the encrypted content file is separate from the associated encrypted usage rights file, and the encrypted content file is provided separately from the encrypted permission). Where encrypted content and associated encrypted usage rights permissions are provided as separate files, there are multiple options that can be selected. The encrypted content can be (1) unusable on a recipient device without the associated separate encrypted permission file, or (2) usable in a recipient device in a minimal manner of usage without the associated usage rights file, or (3) usable to a predefined level of usage (from minimal to all options enable) on a recipient device without (unless it is present) the associated encrypted permission file, or (4) usable at whatever level of usage the respective associated encrypted usage rights permission file (or ticket) provides for, but only as per that level. (Many other options can be chosen. Again, the choice is again one of design options.) The various individual permissions can be established and set by a trusted provider, at any time concurrent with or subsequent to the encryption of the respective protected (encrypted) content. However, preferably, only a trusted provider can generate related associated additional files (or tickets or packages) of permissions granting a broadening of usage rights for a previously encrypted content.

In accordance with a defined process/methodology for secure distribution, the recipient device user provides the provider subsystem with the recipient device's unique ID (and optionally other information) such as by providing appliance data (or other methods such as when unique ID changes have been made in the field). The trusted provider then generates the encrypted public data keys (e.g., encrypted production key) and encrypted permission packages (e.g., encrypted ticket) for a user. These can be sent to the recipient device with increased security, since a third party's use of this encrypted information requires a licensed application software program executing on a recipient device, and must be compatible with the trusted provider technology. And in the "specific appliance only" embodiment, the decryption process further requires specific hardware (e.g. a particular specific recipient device) to generate the particular recipient device's unique ID.

The encrypted public data key is intended solely for a respective particular specific recipient device appliance, and is not usable on any other appliance. This provides for flexibility with security. For example, the encrypted public key may be stored on (but is unusable on) a separate appliance for backup or an intermediate device used in the transmission of the key to the intended particular specific appliance. When a single file (or files) of encrypted content is authorized for separate permitted usage on multiple recipient device appliances, each appliance's key (for all of the multiple recipient devices) is stored together as one file of all the keys, as associated with the respective encrypted content file. Even though only one of those keys is valid for usage on each of the respective ones of the particular specific recipient device appliance, without compromising the security of the keys for the other appliances. Thus, only one of those specific multiple recipient devices (that can decrypt one of the keys) can utilize that one respective encrypted content file, but not any other recipient device. Further, each recipient device can only utilize the encrypted production keys explicitly created specifically for it.

Key refers to a symbol or sequence of symbols or a data file, (or electrical or mathematical or mechanical or numerical correlates of symbols) (or mathematical data processing of data files) such as utilized by an encryption engine or other keyed conversion logic [and the corresponding decryption engine] in order to encrypt or decrypt any other data files (such as text).

Appliance is a term used as an alternative term for a computer system running application software that comprises a recipient device.

Recipient Device refers to any computer system executing (or running) application software (or otherwise), for getting appliance data from within the computer system for generating an Appliance ID for the recipient device, which is provided and used for encrypting a production key that was utilized for encrypting respective encrypted content, to provide an encrypted production key. Only the recipient device generating the Appliance ID can thereafter, decrypt the encrypted production key to utilize the respective decrypted content locally at a recipient device. In accordance with one aspect of the present invention, multiple encrypted production keys can be associated with encrypted content to permit usage of that content by a plurality of authorized recipient devices. Alternatively, a fixed encrypted production key can be used to permit all recipient devices running the correct application software, to use the encrypted content in a preferred embodiment usage is as per defined usage rights (whether Read-Only, Read/Annotate, Network, or other) for regulating use of encrypted content.

Master Production Key refers to a master key that allows a document to be encrypted (or decrypted) regardless of what appliance is trying to open the document. This is useful for a production system to test, modify or re-authorize rights for encrypted content. Only a few production utilities are provided that can open a document with this key. The master production keys are never distributed to a consumer.

Document Production (Encryption) Key (or Appliance Key) is a key that is utilized to provide for encryption (and decryption) by a specific recipient device appliance, and provides control for regulating usage of respective associated content [such as to open a particular (or group of) documents]. A group of documents can share the same document production key when designated for the same recipient device (or devices).

Appliance Authorization refers to a set of information utilized to provide for a unique identification and authorization, such as an appliance key such as generated from fixed data identifying the appliance (and preferably with an added password level of protection for use of the application software), and/or a program level for the respective application software program (feature set levels (e.g., Reader Only; Read-Annotate; Print; Export), and preferably also serial number (user identification) that authorizes the program to run at no more than a specified feature set (and preferably only on a specified appliance). Alternatively, some are provided as a non-variable stand-alone product and is not capable of running all the features authorized. For example, a reduced feature reader product, such as Acrobat Reader from Adobe Inc., or the eSReader from e-Stand, Inc., has very limited capabilities and doesn't include the fullest feature set but will only run with the limited feature set as fixed to be allowed.

Original content refers to any one or more of
 a) textual data;
 b) image data;
 c) audio waveform data;
 d) MIDI data;
 e) video data;
 f) game data;
 g) business data;
 h) application program code;
 i) textual data having a respective associated ticket for regulating usage rights defining permitted uses for the respective textual data;
 j) image data having a respective associated ticket for regulating usage rights defining permitted uses for the respective image data;

k) audio waveform data having a respective associated ticket for regulating usage rights defining permitted uses for the respective audio waveform data;
l) MIDI data having a respective associated ticket for regulating usage rights defining permitted uses for the respective MIDI data;
m) video data having a respective associated ticket for regulating usage rights defining permitted uses for the respective video data;
n) game data having a respective associated ticket for regulating usage rights defining permitted uses for the respective game data;
o) business data having a respective associated ticket for regulating usage rights defining permitted uses for the respective business data;
p) application program code having a respective associated ticket for regulating usage rights defining (1) permitted uses for the respective application program code, and, optionally, (2) authorized functions and feature level for operation of the respective application code; and
q) a ticket for regulating usage rights defining permitted uses for an associated respective data file.

Key Production, usage, and retention strategy can be varied. For example keys can be time-stamped or otherwise designated with a limited life. Alternatively, all keys can be generally valid indefinitely (forever); however, in this case, the Appliance Authorization can be limited to a specific date as specified by the computer's system clock.

Appliance ID refers to a unique identifier associated with, and preferably generated by, a specific appliance. This unique identifier is preferably calculated on-the-fly [in the specific appliance (recipient device) executing respective authorized application software thereupon], based on unique features of the specific appliance.

A Ticket ID refers to a unique identifier associated with a specific ticket. This identifier is created when the ticket is generated, and is utilized in identifying and locating the respective specific ticket (e.g., for indexing, mapping, cataloging, and/or providing linking ID to associate the respective ticket with other components or content or files).

In a preferred embodiment, Document Keys are generated from the Production Keys and Appliance ID. For example, the respective production (encryption) key utilized for respective encrypted content is encrypted utilizing the Appliance ID as a key input to the encryption logic, (needed for both the encryption and the subsequent associated decryption) to generate a Document Key [comprised of the production key encrypted using the specific Appliance ID as an input]. For example, document keys are generated upon the sale of a document to a customer, who either supplies their Appliance ID or which is a previously stored Appliance ID (historically by customer ID on file), such as a result of a previous authorization or previous document (of selected encrypted content) purchase. The Document Key is required to unlock [using the respective application software within the recipient device to generate a generated Appliance ID (such as by access to the recipient device computing hardware and software)]. The application software applies the decrypted production key which is utilized thereafter in decrypting the encrypted content within the specific respective recipient device appliance and for controlled regulated use of the encrypted content in a decrypted (unencrypted content) form, by the specific respective recipient device.

As illustrated in FIG. 1, data rights management system (10) is comprised of a provider encryption services subsystem (104) providing outputs of encrypted content (120), and encrypted production key (158). The recipient device has control decryption logic (executed in the application software) generates an Appliance ID, and preferably jumbles the Appliance ID (such as utilizing a defined hash) to output a jumbled Appliance ID (157) production subsystem 104.

The production system utilizes the Appliance ID (if necessary after first un-jumbling the jumbled Appliance ID) and encrypts the production encryption key responsive to the Appliance ID to generate an encrypted production encryption key (also called an encrypted production key).

Jumbling refers to processing of content to be communicated in a secure method. Jumbling can be accomplished in numerous alternative ways, such as use of secure socket layer (SSL), or hashing, encryption, etc. (For additional background, also see Applied Cryptography by Bruce Schneier; or other texts).

A jumble operation refers to a form of encryption used to transmit data between systems. This may be an encryption method using a predefined key on original transmitted data and outputs to encrypted transmitted data. It could also be an encryption method using a negotiated temporary key between the jumble and unjumble operations.

An unjumble operation is a decryption method that inputs encrypted transmitted data and outputs a copy of original transmitted data. The decryption method and key is selected to be complimentary to the encryption method used in the jumble operation.

For additional security, the outputs are each jumbled and are unjumbled by an authorized recipient device. The jumbling (and respective un-jumbling) is optional, and while adding another level of security, is not a requirement of (or necessary to use of) the present invention. As illustrated in FIG. 1, the encrypted content and encrypted production encryption key are jumbled to provide jumbled outputs of a jumbled encrypted content (120J) and a jumbled encrypted production key (158T). These jumbled outputs (120J and 158T) are coupled to a recipient device. The jumbled outputs are coupled to respective inputs 220 and 188 of the consumer decryption services subsystem 204 [such as a user's computer appliance (recipient device). The provider subsystem 104 provides a host computing subsystem comprising a processor, storage, and running respective production application software to provide for operation of the provider subsystem 104. In a preferred embodiment, the provider subsystem 104 and consumer subsystem 204 are each further comprised of a communications interface for coupling communications therebetween. The consumer decryption services subsystem 204 (e.g., a recipient device) provides a computing subsystem running compatible application software to provide for selective viewing, annotating, networking, exporting, running as an executable application program, and saving, in accordance with respective associated defined usage rights. The consumer subsystem 204 provides an output of the Appliance ID (187) [e.g., preferably in one embodiment jumbled such as by utilizing an encryption to jumble the internally generated Appliance ID]. The consumer can call (phone), FAX, email, or directly couple via computer, to provide an output of the Appliance ID (187) to the input (157) of the provider encryption services subsystem (104). The provider encryption services subsystem (104) utilizes the Appliance ID input (157) to encrypt the production encryption key which was utilized to encrypt respective associated content (if appropriate, first un jumbling the jumbled Appliance ID), and the encrypted production key is coupled for output from the provider subsystem 104 (preferably jumbled for transmission) [illustrated as coupled to input 188 of the consumer services subsystem 204]. The encrypted content output (120) is jumbled and provided as jumbled encrypted content output (120J), and is provided from the provider subsystem (104) and is coupled to an input (220) of the consumer decryption services subsystem (204). The consumer decryption services subsystem (204) utilizes a jumble decryption to un jumble the jumbled encrypted production key and to generate an encrypted production key copy, and then utilizes its internally generated Appliance ID to decrypt the encrypted production key copy, and then utilizes the decrypted production key to decrypt the associated respective encrypted content, to generate an output (200) of unencrypted content that is stored in the recipient device in its unencrypted form for usage by the application software of the recipient device in accordance with the respective associated defined usage rights. Preferably, storage of the unencrypted content in the memory of the recipient device of the consumer subsystem is only temporarily stored as unencrypted, responsive to the application software, so as to maximize security.

Figure 2:
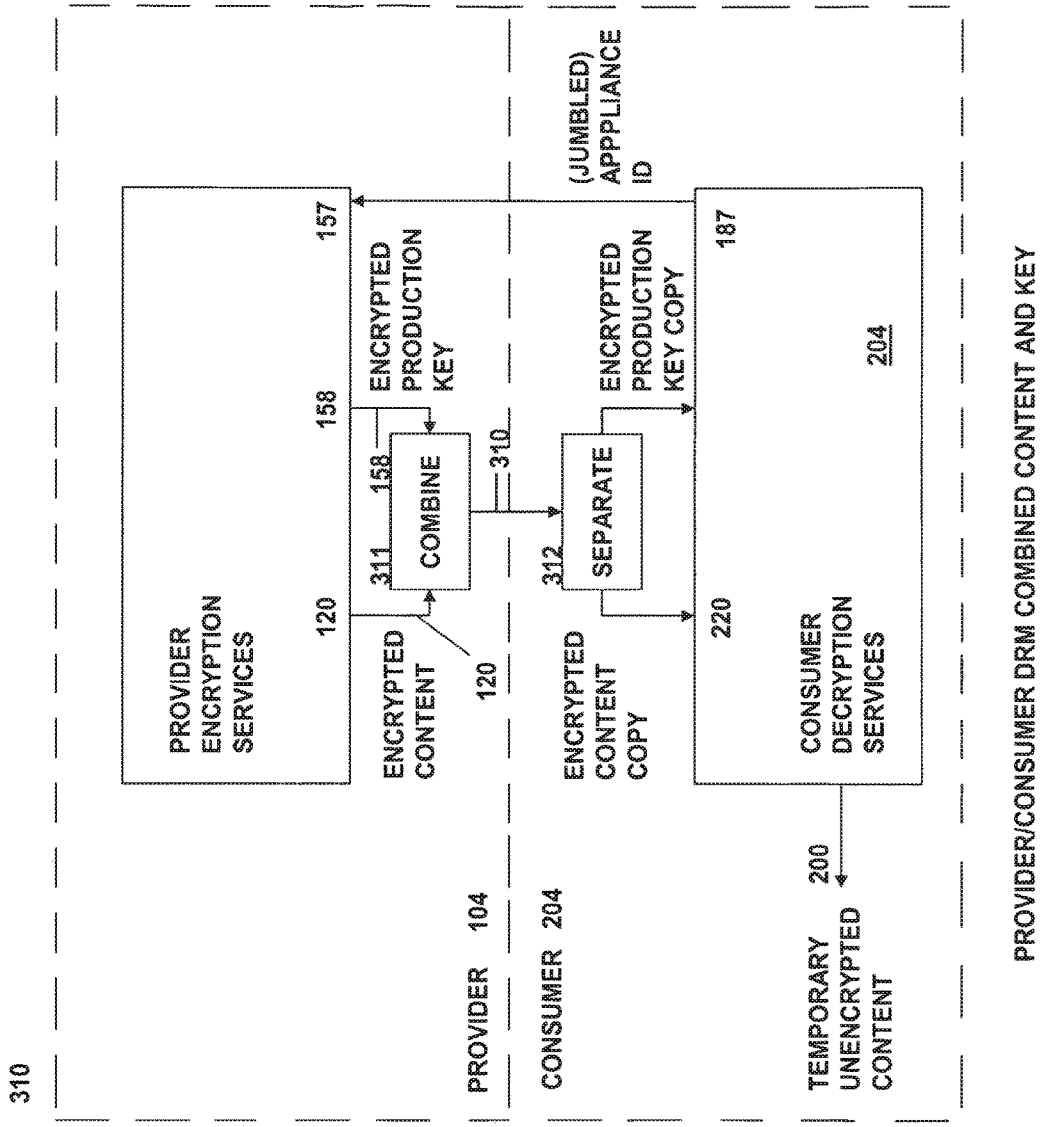
FIG. 2 is a block diagram illustrating an alternative embodiment of FIG. 1, where the provider side of the provider and consumer data rights management system provides a combined output of both the encrypted content and the encrypted production key as a single communication to the consumer side recipient device, illustrating both the state flow and system architecture associated therewith.

Referring to FIG. 2, an alternative embodiment to that of FIG. 1 is illustrated, showing the encrypted content and the encrypted production key being combined by the production system (104) as a single combined output, prior to communications to an external system, or otherwise coupled to a respective consumer subsystem (204) (recipient device). As illustrated in FIG. 2, all communications between the provider subsystem (104) and consumer subsystem (204) is jumbled, to add an extra level of security. This is optional; it is a design option [to add jumbling (or not)], As illustrated in FIG. 2, the provider encryption services subsystem (104) receives the (jumbled) Appliance ID (187) from the recipient device (204), coupled to production subsystem (104) as an input (157) and the jumbled Appliance ID is dejumbled in the recipient device and is utilized to generate an Appliance ID (also referred to as an Appliance ID copy). The production system (104) utilizes the Appliance ID copy to encrypt the respective associated production key that was utilized to encrypt the selected original content to create the respective encrypted content, responsive to the Appliance ID copy. The provider encryption services subsystem (104) then provides an output of the encrypted production key (158) which is combined with the encrypted content output (120) utilizing combining logic 311 to provide a combined output (310) of the encrypted content 120 with the encrypted production key (158). This combined output (310) is preferably jumbled prior to output from the production subsystem (104) to any external system. The combined output (310) is then coupled as an input to separation logic (312) of the consumer decryption services subsystem (recipient device) (204).

The subsystem (204) provides a computing subsystem with a processor, memory, and display, and runs (executes) respective application software, to provide a recipient device appliance for a consumer to use to permit allowed usage of encrypted content. The consumer subsystem (204) provides separation logic (312) for separating the encrypted content and the encrypted production key from the combined output (311). (If necessary, the jumbled combined input is first unjumbled.) The consumer decryption services subsystem (204) then utilizes the internally generated Appliance ID to decrypt the (unjumbled) encrypted production key to generate a decrypted production key that is utilized to decrypt the encrypted content to provide an output of unencrypted content (200). The unencrypted content (200) is stored locally in the recipient device (preferably, temporarily) only during and as needed for authorized usage (e.g., viewing, annotating, networking, saving, exporting) of the decrypted content in accordance with associated usage rights (if any) for the respective selected content.

In one embodiment, for greater security, communications between the production subsystem (104) and consumer subsystem (204) are jumbled, (and then unjumbled by the respective other one of the consumer subsystem (204) and production subsystem (104), respectively), (such as Appliance ID, encrypted production key, etc.). In an alternative embodiment, where circumstances are correct, no jumbling may be needed, so it is not provided, and the present invention works equally well. The jumbling (and unjumbling) adds another layer of security and its use is one of design choice.

Furthermore, encrypted content and Document IDs can be hosted on a host system (or saved as "groupings" or "sets" on CD ROMs) to be provided to one or more consumer subsystems (204). In both these scenarios, a consumer can simply provide the Appliance ID and Document IDs for the desired selected encrypted content, and the host system can locate the selected content, and the associated respective production key used to encrypt the respective content as per the Document IDs, and encrypts the respective production key responsive to the provided Appliance ID and Document IDs received from the consumer, to generate and provide a document key that is provided to the consumer subsystem (204). The consumer system (204) then generates an Appliance ID locally and uses it to decrypt the document key to get to the decrypted production key needed to decrypt the selected content (and, if appropriate, the respective associated encrypted ticket.).

The discussion of the illustrated embodiments discussed so far herein have been directed to communications of single files and single keys.

In accordance with another illustrated embodiment of the present invention, in addition to communication and usage of single files and single keys, or multiple files encrypted with a same single key, alternatively, multiple ones of unencrypted initial content files can each be encrypted with a different production key. The encrypted production keys and encrypted content can be sent separately and individually, or combined and together.

The same production key can be used for all of the multiple unencrypted initial content files, or there can be multiple production keys used for encryption, and with some of the keys used on more than one unencrypted initial content file.

In accordance with another aspect of the present invention, a production ID is associated with every production key. This production ID should be relatively unique and the only relationship to production key is that there is a one-to-one relationship. The production ID can be, for example, a random number, current time, random sequence of characters or a sequentially generated number that increases every time a new production key is generated, or other items, or a combination of these. The production ID can be used as an index to find a production key for a respective file of associated encrypted content. In this case, the production ID is transmitted along with the encrypted initial content to the recipient device (and also subsequently with the encrypted production key). Thereafter, the recipient device can be sent a respective production ID to a host [e.g., production subsystem (104)], and the production subsystem (104) locates the associated respective production key for the respective production ID, and encrypts the respective production key and sends the encrypted production key to the respective recipient device (e.g., such as encrypted to be appliance specific responsive to the respective Appliance ID).

In accordance with one embodiment, the production ID associated with encrypted initial content is verified prior to use, and is compared to the respective production ID associated with an encrypted production key. If the production ID's match, then the respective encrypted production key can be used with the respective encrypted initial content to obtain the unencrypted initial content on the client machine (recipient device).

Additionally, or alternatively, to the production ID, the Appliance ID may also be associated with the encrypted production key. This allows the client (e.g., the recipient device or system) to effectively ignore encrypted production keys that are not meant for that client recipient device, by comparing the client's Appliance ID with the respective Appliance ID associated with each of the respective ones of encrypted production keys.

In one embodiment, the encrypted production keys are transmitted separately from the encrypted content. In an alternate embodiment, the production key and encrypted initial content are transmitted together from server production subsystem (104) to client [recipient device (consumer subsystem (204)]. In either case, there is a chance that the production ID or Appliance ID is not associated with the encrypted production key or the production ID is not associated with the encrypted initial content. The client recipient device (204) does not always know which encrypted production key goes with which encrypted initial content on which client. In this case, the client system (204) can still create the unencrypted initial content but the process will take longer.

There are many alternative ways to find the correct production key. For example, the client system (204) can try using every encrypted production key that it has available to decrypt the encrypted initial content. When the client determines the encrypted initial content is correct, it stops looking.

Alternatively, there may be times when the client recipient device system (204) does not keep track of which document key is to be used for a particular document on a particular appliance. In this case, the client system (204) needs to check all the keys on the recipient device (204) for location of the correct particular document key. In this case, the client recipient device (204) finds the correct document key by decrypting the respective encrypted content with each respective production key, to attempt to generate the correct decrypted content for a selection, and then check the respective unencrypted initial content for correctness.

The recipient device (204) (client's) check for correctness of the respective unencrypted initial content requires that the client (204) has some knowledge of some aspect of the correct decrypted content. This could be a number of things. For example, the first part of the decrypted content can have a fixed set of initial characters (or a checksum on the content) or that the decrypted content follows respective specific rules. For example, most image files have a fixed string at the beginning. HTML and XML follow specific rules in their formation that can be checked.

In accordance with still another aspect of the present invention, a system and method is provided for securely communicating content for use on a remote appliance without requiring server authentication. The method is comprised of providing an unencrypted initial content; providing a production key; encrypting the unencrypted initial content responsive to the production key to generate encrypted content; providing an appliance identification (ID) initially generated at the remote appliance (and identifying the specific appliance); and encrypting the production key responsive to the Appliance ID, to generate an encrypted production key for the remote appliance (recipient device), to use which permits decryption only on the respective remote appliance (recipient device) and responsive to that respective remote appliance (recipient device) generating a respective Appliance ID [which is the same Appliance ID as was utilized for the encrypting of the respective production key by the production subsystem (104).

The unencrypted initial content can be provided by any source. Often, it is proprietary and copyrighted content that needs to have controlled access. The initial (original) content can be comprised of text, images, application program code, audio, video, still video, or other data. The production key can be any of a variety of data word sizes, types [such as binary data, generic character strings, alphanumeric character strings, and numeric character strings, etc.], and can be generated in many ways, ranging from defined algorithms for generating pools of IDs; to seeds for generating keys, to utilizing saved (previously generated) values, etc. Production key generation is also discussed further herein. The production key size is determined by the requirements of the content encryption algorithm's key, and considerations of level of desired security.

Some of the types of content encryption (and corresponding decryption) that can be utilized [one or more, alone or in combination] are:
a) Data Encryption Standard (DES);
b) RC2;
c) RC4;
d) Message Digest 5 (MD5);
e) Rijndael;
f) Triple DES;
g) Digital Signature Algorithm (DSA); and
h) RSA.

These are examples. However, any type of encryption can be used, and is compatible with the present invention.

In each of the above situations, a key length that can be selected based on design tradeoffs and choices (e.g., legal, practical and security tradeoffs).

The generation of the Appliance ID is based on unique characteristics of the appliance, such as based on the types of hardware options installed on the recipient device appliance, serial numbers, software options installed, or other data stored on the appliance.

The encrypted content is transmitted or otherwise provided to the recipient device to the remote appliance from the production subsystem (104). The production key used to encrypt the encrypted content is encrypted responsive to the Appliance ID generated at the remote appliance. The encrypted production key is transmitted or otherwise provided to the respective remote appliance generating the respective Appliance ID utilized to encrypt the respective production key. Then, the recipient device remote appliance uses the generated Appliance ID within the remote appliance (recipient device) as a key to unlock (decrypt) the encrypted production key. The decrypted production key is utilized by the recipient device to decrypt the encrypted content, to generate the unencrypted content for use only on the respective recipient device remote appliance.

The distribution of the encrypted content can be electronically transmitted (e.g., download, email), stored on non-volatile storage (e.g., such as CDs or DVDs), etc. The distribution of the encrypted production key can also be transmitted electronically (e.g., download, email), via CD or DVD, via regular mail, or FAX communication, etc. The distribution of the encrypted content and respective associated encrypted production key can be provided independently and separately, or simultaneously and concurrently.

In one illustrated embodiment, an appliance key is generated by hashing the Appliance ID generated within the recipient device in combination with a fixed password. A decrypted production key is created from the encrypted production key, that is decrypted from the respective encrypted production key responsive to the respective appliance key. The unencrypted content is decrypted from the encrypted content responsive to the production key generated responsive to the appliance key.

The appliance key is an alternative that offers an additional level of password security to the use of a generated Appliance if, without further encryption, via use of a password. Again, the decision of Appliance ID versus Appliance Key is purely a design choice of level of desired security and other design/cost/use considerations, and either choice works equally well with the present invention.

In one preferred embodiment, the recipient device further selectively provides a display presentation on the respective remote appliance in accordance with respective usage rights (if any) for the respective decrypted (unencrypted) content, responsive to the unencrypted content.

The display presentation can be provided on one or more of an LCD, CRT, printer, where audio via audio speakers or audio headphones, radio transmitters, network transmitters, television monitors, POTS (plain old telephone service) phone, cell phone, or pagers. The display presentation is selectively generated responsive to the unencrypted content and the usage rights for the respective unencrypted content.

As discussed herein, in alternate embodiments, the encrypted content can be provided to the remote appliance independently of (or simultaneously with) providing the encrypted production key to the remote appliance.

For example, in one embodiment, the production subsystem (104) first receives the Appliance ID (or appliance key) from a recipient device, and then, the production subsystem (104) generates a respective encrypted production key for respective associated selected encrypted content, using the Appliance ID, and then, provides for combining the encrypted content and encrypted production key to generate a combined encrypted output of respective content and respective production key, the production subsystem (104) then provides for coupling the combined encrypted respective content and respective encrypted production key, to the recipient device (204) remote appliance. In this embodiment, the method provides for utilizing the respective combined encrypted recipient device (204) content and respective encrypted production key within the remote appliance to automatically decrypt the encrypted production key to provide decrypted production key that is utilized by the recipient device to generate the unencrypted initial content.

There are many alternative ways for generating the Appliance ID to uniquely identify a recipient device appliance. For example, the Appliance ID can be generated responsive to one or more of the following:

For example, characteristics of the remote appliance that can be utilized:
  a) Hardware serial number (e.g., this can be obtained by accessing the hardware serial number through special methods on the appliance);
  b) ROM checksum (e.g., this can be obtained by creating the checksum from the contents of a ROM on the appliance);
  c) Password (e.g., this can be obtained by storing the password somewhere on the appliance, or asking for the password from the user);
  d) Installed hardware list (e.g., this can be obtained by checking the hardware that is on the appliance and providing a list of hardware);
  e) Installed software list (e.g., this can be obtained by checking the software on the appliance and providing a list of software);
  f) Location of special files (e.g., this can be obtained by checking the physical location of specific files on the appliance and providing that location);
  g) Contents of special files (e.g., this can be obtained by checking the contents of specific files and providing the contents or a hashed value from the contents);
  h) CPU ID (e.g., this can be obtained by accessing the CPU and providing the CPU ID);
  i) Network addresses (e.g., this can be obtained by checking the network IP or MAC addresses on the network cards);
  j) Hardware key devices (e.g., this can be obtained by accessing the hardware devices and providing the key responsive thereto);
  k) Biometric readers, such as fingerprint and retinal reader (e.g., this can be obtained by accessing biometric readers and providing an identification of a person);
  l) ID card input (e.g., this can be obtained by reading a card reader device and providing a card ID);
  m) Credit card input (e.g., this can be obtained by reading a credit card with a reader and providing identification information from the card); and
  n) Information from outside the appliance (e.g., this can be obtained by sending information to identify the appliance to a remote system that provides authorization information in return. The authorization information can be algorithmically determined, or based on stored data on the remote system or otherwise securely generated).

The encrypting of the production key can be provided for in a number of alternative ways, including, but not limited to, one or more of:
  i) Data Encryption Standard (DES);
  j) RC2;
  k) RC4;
  l) Message Digest 5 (MD5);
  m) Rijndael;
  n) Triple DES;
  o) Digital Signature Algorithm (DSA); and
  p) RSA.

In an alternate embodiment, where one or a plurality of separate files of original content are to be used on a plurality of separate specific recipient devices (204) (appliances), the production subsystem process comprises providing multiple Appliance IDs and providing multiple production keys. Each of the production keys is encrypted to generate a respective encrypted production key, responsive to the respective Appliance IDs. This is done for every combination of the Appliance IDs and the production keys. The production system generates an encrypted production key list, responsive to encrypting the production keys.

This embodiment is useful when the one or multiple separate files of selected initial original content is to be made available to and will be used by, a plurality of appliances. Also, it is useful where it is desirable to selectively make available only certain ones of the selected content files on all of the specific appliances, but only usable on certain ones of the respective ones of the specific appliances. The production keys associated with the respective files of specific initial content are selectively used to generate the respective encrypted production keys, based upon the respective Appliance ID or IDs that are to be allowed to have access to use the specific selected initial content.

The encrypted production key list is thereafter provided to a remote appliance recipient device. The recipient device processes the encrypted production key list. First, a single encrypted production key is selected from the encrypted production key list. The recipient device provides for validating as known good content an attempted decryption of the respective selected content, responsive to at least a portion of the respective associated unencrypted initial content generated by attempting decryption with the presently selected single encrypted key. The process repeats until the correct key is found. If known good content is validated, the correct key has been found. Otherwise, another encrypted production key is selected from the encrypted production key list, responsive to a failed comparison of the unencrypted initial content with the known good content.

The selection, of a single key to try, can be as simple as starting by selecting the first encrypted production key in the list. This selected encrypted production key is decrypted to provide a selected decrypted key, using the appliance's (internally generated) Appliance ID and then attempting to decrypt the respective encrypted original content responsive to the selected decrypted key. The resulting decrypted content is checked to determine whether it is valid. The decrypted respective original content will contain either specific known data or follow a specific format. For example, most image formats such as BMP, TIFF and JPEG begin with known data that can be compared. Likewise HTML and XML contain specific formats that can be verified. If the decrypted content is found to be valid, then, the correct encrypted production key has been found. If the decrypted content is not valid, that respective encrypted production key is for use with another Appliance ID or for different respective associated encrypted original content, in this case, the next encrypted production key in the list is selected, and checked as above. This continues a valid key is found or until the list is exhausted. If the list is exhausted without valid decrypted original content being found, then the encrypted production key for this Appliance ID and the respective associated encrypted original content is not in the respective list.

Additionally, or alternatively, Appliance ID and/or content descriptions and/or Document ID can be included with the list of encrypted production key list. The selection process is essentially the same as above, except that all encrypted production keys that are associated with other appliances' Appliance IDs and/or unwanted content descriptions can be initially rejected based upon checking for a valid appliance or content description or Document ID associated with a respective key, before validating and checking that the respective decrypted original content as decrypted using a respective key, is valid. This process and structure reduces the number of encrypted production keys in the list that are checked.

A production key list search and validation is required if the decrypted original content does not contain any known data or follow a specific format, since there is then no way to determine whether the respective decrypted original content is valid. In this case the decrypted original content is always assumed to be valid and the encrypted production key selected from the list must be correct as determined by other means, such as by use of the associated Appliance ID and/or content descriptions and/or Document ID, or otherwise.

As discussed above, the encrypting of the unencrypted initial content can be provided for in a number of alternative ways, including, but not limited to one or more of a) Data Encryption Standard (DES); b) RC2; c) RC4; d) Message Digest 5 (MD5); e) Rijndael; f) Triple DES; g) Digital Signature Algorithm (DSA); and h) RSA.

Also, as discussed above, the unencrypted initial content can be any one or more of many alternate different types, such as one or more of a) Textual data (a series of characters when displayed in a visual representation provide a human recognizable information); b) image data (data that when displayed in a static visual representation imparts human responses from color and brightness); c) audio waveform data (data that when converted to pressure wave in air impart human responses from sound); d) MIDI data (data that when converted audio waveform data and then to pressure wave in air impart human responses from sound); e) video data (data that when displayed in a time-changing visual representation imparts human responses from color and brightness and optionally having an associated audio component); f) game data (data contains settings, game data and other program setting); g) business data (data that contains information on the operation of the business); h) application program code data for an executable program of any sort, such as from word processor, and image processor to video game and interactive entertainment; and other.

Figure 3:
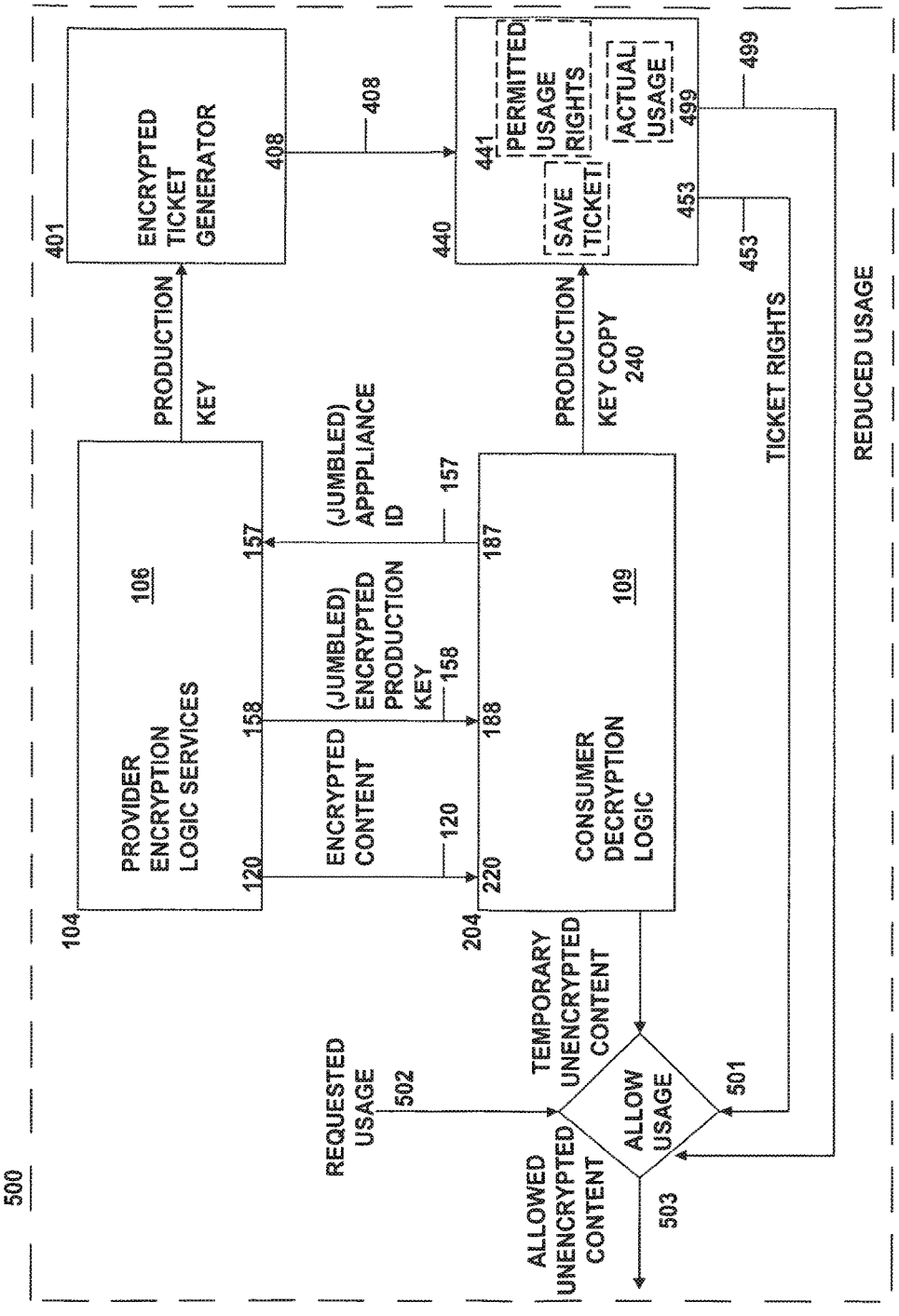
FIG. 3 is a block diagram and state flow diagram illustrating the provider encryption services and consumer decryption services with appliance specific based data rights management system, with associated rights ticket, further expounding on FIG. 1.

Referring to now FIG. 3, an alternate embodiment to that of FIG. 1 is shown, further illustrating the providing for controlled usage rights of respective encrypted content, illustrated as accomplished by use of an encrypted ticket defining usage rights and associated with the respective encrypted content. As illustrated in FIG. 3, the operation of the provider encryption services subsystem 104 relative to the consumer decryption services subsystem 204 is substantially as discussed above with reference to FIG. 1. However, additionally, as illustrated in FIG. 3, an output of the production key 140 (as used to encrypt respective selected original content to produce the respective encrypted content) is provided as an input to an encrypted ticket generator subsystem 401, which utilizing the production key associated with the respective encrypted content as an encryption key, encrypts a respective associated generated ticket (defining usage rights for the respective encrypted content). The generated ticket is encrypted (using the respective associated production key for the respective associated encrypted content) to generate an associated encrypted ticket for the respective encrypted content. [The encrypted ticket is utilized for communication to the consumer subsystem 204.] The encrypted ticket is saved as illustrated, responsive to ticket logic, as a saved ticket. The ticket logic (440) utilizes the decrypted production key copy (240), provided as an output internally within the recipient device (204) responsive to decryption within the consumer decryption services subsystem recipient device (204). The ticket logic 440 decrypts the encrypted ticket utilizing the production key copy, and provides for analysis and derivation of a ticket rights output and a usage rights output [(453) and (499), respectively], providing these outputs as inputs to usage control logic (501). The usage logic (501) also receives as an input the temporary unencrypted content output (200) from the consumer decryption services subsystem recipient device (204). Responsive to a requested usage input (502), indicating a request for usage (such as viewing or printing, or other usage privileges), the usage logic (501) is responsive to the ticket rights output and reduced usage output from the ticket logic (440), and based upon allowed usage rights and stored actual usage data, the recipient device subsystem (204) selectively provides for an output (503) of allowed usages (such as viewing, printing (and how may copies), saving, exporting, allowing execution of an application program, and optionally, selectively at what respective level, etc.).

Granting rights to respective selected original initial content can be done with an item called a ticket. A ticket is comprised of ticket content, that can be comprised of a ticket ID, a used indicator and other ticket components describing the usage rights the ticket is granting. The ticket is encrypted with the same production key as the associated respective selected original initial content to form the encrypted ticket.

As illustrated in FIG. 3, the production system initially provides for granting printing rights to a document. In this example, the other illustrated ticket components are Appliance ID (e.g., which appliance will be able to print), Document ID (e.g., an index identifying which document to allow printing), expiration (e.g., date that rights expire), permissible times/dates for usage, permissible users of the appliance (e.g., which one (or more) recipient device consumer subsystem (204)), and allowable number of copies (number of usages or copies to allow (e.g., to be viewed, printed, saved, executed, etc.). A used indicator is stored (as encrypted) in the recipient device and provides the number of copies that can still be (are allowed to be) printed or otherwise used. When the printed copies (or usage number) are equal to the allowable copies (or usage), no more printing (or usage) is allowed by the recipient device (204), responsive to the ticket components.

Numerous other usage rights and tickets can be utilized in accordance with the teachings of the present invention. For example, usage rights can be set on some tickets so that some tickets never expire and those tickets grant rights forever (until used up, if usage restrictions apply). The recipient device (204) executing associated respective authorized application software provides the necessary logic, also referred to as a client engine. The recipient device (204) must maintain the ticket in confidence to preserve the ticket from being tampered with. Thus, only the encrypted ticket can be allowed to be stored permanently.

Additionally, a used indicator, where present, will need to be updated when a right is used. In this case, the encrypted ticket is retrieved from storage by the recipient device (consumer subsystem) (204), and the application software within the recipient device (204) generates an Appliance ID used to decrypt the encrypted production key, to provide a decrypted production key. Then, the encrypted ticket is unencrypted with the decrypted production key, and the decrypted ticket is checked to see whether it applies to the current situation (to the respective encrypted content). The used indicator is decrypted and checked to determine whether any usage rights are still available for this specific respective appliance recipient device (consumer subsystem) (204). Then, if rights are still available, the decrypted ticket is modified to update the decrypted used indicator, and the updated ticket and updated used indicator are then encrypted with the production key, and then the encrypted (updated) ticket is stored within the recipient device (204) for later use. All tickets should preferably be saved locally on the client recipient device system as associated with the respective application software together, forever, so that the integrity of the used status can be maintained.

The storage structure for encrypted tickets usage can be in many forms. It is important however that usage and rights information be encrypted so it cannot be easily modified by unauthorized entities. If the ticket cannot be decrypted properly then no rights are granted. Even though the rights and usage information may be available in an unencrypted form as well, they cannot be used to grant rights. Without a properly decrypted ticket, the unencrypted rights and usage information can only be used for searching and finding an appropriate ticket. Furthermore, any attempts to modify the rights and usage information are identified, and if the unencrypted rights and usage information are not identical to the encrypted rights and usage information generated by a validated properly decrypted respective encrypted ticket. If tampering with any ticket is found, then that ticket is invalidated (all rights and usage are reset as not allowed).

An example of a storage structure for components of a ticket in accordance with one embodiment of the present invention is shown below using an)(NIL format.
Example Ticket

```
<g    appid="ffgukgfgaw09t"
      docid="htgbuk4t000d9t11"
      tikid="7ggt38sua0p1kw18t8"
      right="print"
      number = "1"
      used="-1"
      ticket=
      "7d2f7725a2327f293eb6c42c136bc688a1e3a8b410b29a8f11df"
      />
```

In this above example, the structure utilized specifies several tags as components. The "appid" tag specifies the respective valid appliance for the respective ticket. The "docid" tag specifies the respective valid Document ID for the respective ticket. The "tikid" tag specifies the ticket ID associated with the respective ticket for associative mapping thereto. The "right" tag specifies the type of right that is being granted. As illustrated, right=print (the right to print). The "used" tag specifies the number of prints that have been used. In this example, the value is "-1" which indicates that all the prints have been used.

The "ticket" tag specifies the encrypted rights and usage information. The value of the ticket tag will contain all the tags above and the maximum number of prints allowed which is part of the rights to be granted. The maximum number of prints allowed are used to determine when the usage tag should be changed to "-1" to indicate that no more prints are granted from this tag.

The ticket tag will look to the casual observer as a series of random characters. However, when decrypted with the same key as the respective Document ID, the respective unencrypted rights and usage information is made available. For clarity of the example, a reduced length of the value of the ticket tag has been shown in this example. Preferably, it would be much longer so that all the appropriate information can be stored in it.

In a preferred embodiment, the storage location for the encrypted tickets can be the local client storage in the recipient device. In this case, redundant storage is desired to minimize the loss of information. If stored redundantly, the tickets should be synchronized frequently, to make sure they are identical. If found to not be identical, then, the recipient device system makes the decision on the usage rights for the recipient device in the direction of reducing the rights to the lowest (least) rights of the multiple redundant tickets. For example, if one of the redundant tickets indicates that one more print is available and another redundant ticket (ticket ID identical) indicates that no prints are available, then, both redundant tickets are conformed (the one is changed) to indicate no prints are available.

The storage location for the redundant encrypted tickets can alternatively or additionally be a host or remote server. The remote server can just provide the storage, or it can also provide some of the processing to determine whether to grant the rights. In the later case, the recipient device client subsystem running the respective application software must send necessary information (e.g., Appliance ID, ticket ID, Document ID, etc., other ticket components) to the server. The server then generates an appropriate ticket after determining on the server the associated respective perspective usage rights, and then the server transmits a respective encrypted ticket back to the client.

In an alternate preferred embodiment, associated control data is provided with the respective unencrypted content. In this embodiment, encrypting the unencrypted content is comprised of encrypting both the selected unencrypted original content together with respective associated control data, responsive to the production key, to provide encrypted content and associated control data (e.g., either as a separately provided associated encrypted ticket or as a combined integrated encrypted file [content and associated control data].

The associated control data defines usage rights for the respective associated content, and is provided at the production subsystem (104) based on the requirements of the initial content provider. For example, in one embodiment, a recipient device appliance can be restricted so as to only permit predefined standard uses of the initial content (such as view only) even though the respective content can be enabled for other usage capabilities (such as annotate, print, save, network, export, save). Alternatively, standard uses can be more fully featured, with the provider making usage restrictions.] The provider [production system (104)] of the initial content can set up rights for exceptions to the standard uses. These exceptions can also be encoded in the associated control data to provide for selective control of usage of the respective associated content by the respective recipient device appliance. This associated control data is encrypted with the same production key as the associated respective initial original content. This encryption can be done for one file (or portion) of selected initial content, or for multiple files of initial content (such as a grouping or collection of files). This encrypted associated control data can be for one file, or for the grouping, or one for each file in a grouping. The encrypted associated control data is coupled (or otherwise provided) to a specific recipient device appliance. The respective production key is encrypted by the production system (104), responsive to an appliance ID generated by the specific appliance. Thereafter, the respective encrypted production key is provided to the respective specific appliance. Thereafter, the respective specific appliance locally generates an Appliance ID that is locally utilized by the specific appliance to decrypt the encrypted production key to generate a decrypted production key that is used to decrypt the encrypted content to generate respective decrypted content. The decrypted production key is also used to decrypt the respective encrypted associated control data to generate decrypted associated control data. The decrypted associated control data is used by the respective specific appliance to selectively control and provide for permitting only the allowed usage rights [as per the exceptions to the standard uses (or defined permitted usages)] of the decrypted initial content.

To provide a higher level of security, usage rights restrictions can be made appliance specific. The selected initial (original) content is encrypted by the production subsystem (104), responsive to an associated production key to create respective encrypted content. The encrypted content is transmitted, [or otherwise provided from the production system (104) (trusted provider)], to the respective specific remote appliance (recipient device). The associated production key is encrypted using an Appliance ID provided from a specific remote appliance. The encrypted production key is also transmitted (or otherwise provided) to the remote appliance. The Appliance ID is then locally generated at the remote appliance and is used as a decryption key to unlock (decrypt) the respective encrypted production key to provide a respective decrypted production key. The decrypted production key is utilized within the recipient device remote appliance, (1) to decrypt the respective encrypted content to provide decrypted content, and (2) to decrypt the respective encrypted associated control data to provide decrypted associated control data. The recipient device selectively permits only permitted usages of the respective decrypted content only on the respective specific recipient device remote appliance, and only in accordance with and responsive to defined usage rights of the respective decrypted associated control data.

Thereafter, a display presentation can be selectively provided for viewing at the respective specific remote appliance responsive to the unencrypted initial content and respective associated control data (usage rights) providing content-view control. The respective specific recipient device system can selectively permit printing of the unencrypted initial content responsive to the usage rights providing for content-print control.

The associated control data is set by the trusted provider (the production subsystem (104) (that is providing the respective associated selected initial content), and can define many alternative usage rights, such as one or more of (a) viewing privileges [selectively allows the initial content to only be viewed at certain times, or only for a certain length of time, or only for a limited number of times] or unlimited; (b) printing privileges [only allows the initial content to be printed at certain times, or for a certain length of time, or only a limited number of times] or unlimited or not at all; (c) exporting privileges [only allows the initial content to be exported at certain times, or for a certain length of time, or in certain file formats, or only a limited number of times] or not at all; (d) partial access privileges [only allows certain parts of the initial content to be available, (for any use, or for specific uses)]; (e) access privileges [only allows certain programs to access the initial content]; (f) running and execution privileges, [only allows certain programs to run on the appliance, or selectively allows the respective decrypted content (e.g., a part or all of the respective selected initial content), to be run on the appliance and executed as a software application program]; and (g) independent access privileges [the initial content provider may restrict operation at the recipient device so as to only allow certain processes to access the initial content].

As an example of operation, suppose that a user of a recipient device (e.g., the client) asks to print two copies of a controlled document of protected content. The recipient device would first check whether it has been granted unlimited printing rights. If those rights are available, the recipient device-client authorizes the printing and proceeds to print the document twice. If unlimited rights are not available, the recipient device-client searches for respective associated tickets that are valid for this specific appliance, and the respective proper Document ID and that the ticket has the right tag defining usage rights equal to "print", and also that the respective ticket has the actual usage tag not equal to "−1" (See discussion elsewhere herein, regarding the example ticket). The recipient device-client will decrypt the ticket tag and check the ticket for validity using the document key for the Document ID. If valid, and sufficient print rights remain, the recipient device-client will be revised to increment the usage tag [or set it to −1, if all the authorized copies have now been used]. The revised ticket is stored. Then, one print of the respective document is performed by the recipient device. The second copy of the print follows the same procedure. The reason for repeating the process is because multiple tickets may be required (or otherwise be used), (each ticket may only allow 1 print) or printing problems could occur that results in rights being used up even though a print command doesn't actually physically print. However, using the print rights up only one at a time, sequentially, allows the print process to be aborted without using further rights. Alternatively, if desired, two print usages can be provided for, and providing the ticket has two print usages left, the print rights changed (appropriately for two print usages) in the ticket in one step.

The associated control data can be utilized to activate one or more of (at least one of): (a) viewing privileges; (b) printing privileges; (c) exporting privileges; (d) partial access privileges; (e) running privileges; and (f) independent access privileges. These privileges are selectively allowed by the respective application software running on the specific appliance (recipient device), responsive to the respective associated control data for associated selected content. The specific appliance is responsive to the associated control data to enable the standard uses of the respective selected initial content [as per the respective initial content and/or as per respective application software operational constraints, operating within the recipient device], and any exceptions to those uses as per the associated control data. In one embodiment of standard uses and exceptions, a specific recipient device appliance cannot share decrypted initial content with any other appliance or for any use on any appliance that is not allowed by these respective defined usage right privileges for the respective content. All other processes (e.g., operations within an appliance) and any appliances that are selectively permitted and allowed access to the respective decrypted initial content must honor and adhere to the privileges (e.g., usage rights) granted to them by the respective associated usage rights.

Thereafter, a display presentation can be selectively provided at the respective remote appliance responsive to the respective unencrypted initial content. Selective printing of the respective unencrypted initial content can also be selectively provided, responsive to respective authorized usage rights of the respective associated control data as to printing privileges.

The number of allowed prints (number of copies that are allowed to be printed of the unencrypted content) is stored in and as a part of the associated control data. A print count is also available to the specific appliance. This print count is either stored on the appliance or on a remote system. The print count is incremented every time a print is made and the new revised value is stored, respectively, on the appliance and/or the remote system. Printing is not allowed of respective selected content, if the print count is equal to or greater than the number of prints allowed as set forth in the respective associated control data.

Thus, the consumer's recipient device (remote appliance) system selectively provides a display presentation (at the remote appliance) responsive to the unencrypted initial content and to the respective associated viewing privileges, (if any), and selectively permits local printing of the unencrypted initial content responsive to the respective associated control data printing privileges.

In an alternate embodiment, the system only selectively permits for viewing of the unencrypted initial content responsive to the presence of associated control data viewing privileges, to selectively provide a display presentation at the remote appliance responsive to the unencrypted initial content.

In another embodiment, the recipient device system provides means to create unencrypted (or encrypted) exported content at the remote appliance responsive to the unencrypted initial content, responsive to the associated control data exporting privileges.

Alternatively, the recipient device system can provide a means to create additional unencrypted partial access content at the remote appliance (such as annotations) responsive to a portion of the unencrypted initial content, responsive to the associated control data partial access privileges. This can be accomplished in several ways. Two alternatives are presented here. First, the associated control data defines partial access privileges and provides for defining the beginning location and end location of the unencrypted initial content that is being granted. The remote appliance begins decrypting the encrypted initial content (as described earlier), but does not store it until the beginning location is reached. The content is then stored until the end location is reached. Then the decrypting stops because no further access rights have been granted as to the respective unencrypted initial content, as to the respective appliance. Second, the unencrypted initial content can be encrypted in blocks of data. Then the associated control data partial access privileges provide for defining the specific block of data (of the respective selected content) for which the appliance is being granted access to. Only this respective block of data is then decrypted for permitting access to that respective block of data of the respective unencrypted initial content by the respective appliance.

In another alternative embodiment, the operation of an independent computing system, or operation of the decrypted content as an executable software program on the specific appliance recipient device, is controlled responsive to the respective associated control data for running privileges for the respective decrypted content. The associated control data contains information on which running privileges are available for the respective associated selected content. The independent system (or recipient device) must check the associated control data before running. If the proper running privileges are not granted for the respective associated selected content, then it will not allow that portion of the program to run.

In one aspect of this alternative embodiment, the associated control data is utilized to provide for operation of an independent system and selectively regulates the independent system to permit access to the respective unencrypted initial content responsive to the respective associated control data independent access privileges.

Tickets can be used in a number of ways to allow the use of protected digital content, also referred to as PDC. The most secure uses of the PDC never allow the digital content to be stored in part or its entirety in an unencrypted form at any location. Practically, this is not possible because no one would have use of it at all, so the owner of the PDC must determine how and how much of the PDC is used where. In order to control "where" the PDC can be used, the recipient devices implementing this invention must be approved or otherwise authorized, and follow the restrictions placed on it by the owner of the PDC. However, this is difficult to 100% control, except in the most stringent security situations. For instance, if the user is allowed to print a portion of the PDC on paper, then there is the exposure and risk that an office copy machine can make uncontrolled copies that portion of that representation of the PDC [notwithstanding copyright or other legal restrictions which might make the activity illegal]. The owner of the PDC must determine if this is an acceptable risk. However, tickets allow this decision and other like to be made appliance specific, on a "where" basis.

For instance, an encrypted document key can be sent to and stored on a specific appliance. Thus, whenever the PDC is needed on that specific appliance, the specific appliance can retrieve the associated respective encrypted document key and use it to selectively decrypt and use the PDC as appropriate. However, the encrypted document key need not be stored on the specific appliance but can be stored in another device that needs to be connected to the specific appliance. Alternatively, the user of the appliance can enter the encrypted document key manually. These provide alternative ways of controlling the where and when the PDC is used.

A ticket can also be supplied to a specific recipient device appliance that allows a specific use of the PDC. Part of the ticket can be a password that the user of the PDC must provide. It may also be required that another specific device be connected to the specific recipient device appliance. It may also be required that multiple PDCs are available on the same specific appliance. For example, suppose a first PDC, PDC-A, contains the social security numbers and associated addresses of every person in the United States. By default, the appliance can have the encrypted document key needed to access this information but no rights to use it. A ticket could be issued to that specific appliance that allows the specific appliance to verify the social security numbers for a person if supplied with a number. The specific appliance would then allow the user of the specific appliance to enter a social security number and a name and verify that this is the person's social security number or not. Now suppose that the specific appliance also has a PDC-B containing the social security benefits for a limited number of people. A ticket could be issued to that specific appliance to allow the PDC-A to provide the address from a social security number if that social security number is also available in PDC-B. The ticket can further be used to regulate and further restrict the use of the protected information content so as to have the user supply a password before being permitted to view the protected content information. In addition, a device identifying the user (such as a smart card) could be specified in the ticket and the information would not be allowed without that device being connected to the respective recipient device appliance.

As shown in the above example, a ticket can also be used to control the operations that are allowed to use data in a PDC. In the previous example, data from two different PDCs (PDC-A and PDC-B) was allowed to be combined when a ticket allowed it. In the general sense, this is a relational database JOIN operation using SQL (ISO/IEC 9075 see http://www.iso.org), using a common field (social security number) to relate information in 2 different tables. this could extend to any number of other database operations using the SELECT, INSERT, SET, DELETE and many other clauses.

Regulated use operations in the examples herein, include printing, (saving/exporting, allowing execution of a program, and viewing. However, there are many more operations that are possible. A custom analysis of the data is possible. Also, the data could be used to control a machine. For instance, a ticket could allow the appliance to move an object via a motor in a certain way this is not allowed otherwise. A ticket could also control if and how much of the associated PDC can be sent to another appliance. For instance, mapping programs allow the user to print out a one-page map but not the entire mapping information (unless the user prints each and every map possible which would be very time consuming). A ticket could also be used to allow the user of an appliance to access certain user operations. For instance, on a recipient device appliance used for wagering, the ticket could allow a user to access certain areas of protected content, or to only perform certain operations, such as for wagering (such as horse racing, and various games of chance) on a per appliance (appliance specific) setting.

Tickets can also be used to control the type of operations that are allowed to run without the need for any PDC. These operations are the same as above, but are not tied to a particular PDC. When the program runs, it checks tickets that give it the right to run. These tickets can be complex, and can depend on when the program is run, how many times it has run, requiring a password, requiring a specific device to be attached, requiring a barcode, fingerprint, retina or other biologically-related scan of a person or object.

The tickets can also determine what functions are available in a program. This allows an application program to be regulated and limited-based on the associated respective tickets that allow certain operations. The respective application program would check for the associated respective tickets to verify and selectively allow a certain function to operate, before permitting the executing of the code for that function.

Many programs also load plug-ins that allow the program to be extended with new functions. Tickets can additionally, or alternatively, be associated with a plug-in. These tickets can control respective associated plug-ins by having the respective associated plug-in check the respective associated ticket every time the respective plug-in is used. The plug-in is not even loaded, if it is not allowed to be run.

Tickets can be utilized to not only to authenticate and regulate usage, but to also set up the level of usage of the selected original content. Where the selected content is an application program, the associated ticket can even be used to regulate and to set up the functionality and the feature set of the application software, variably set to a selected level of feature set comprised of from between minimal functions and features of a minimal feature set (e.g., bare bones), to a maximum functionality and features of a maximum feature set (e.g., fully maxed out). Thus, while selected content can be for one ubiquitous full-featured application program, which during an activation set up (on a recipient device computing system) establishes and sets operability level to set, responsive to the associated usage rights ticket.

Figure 4:
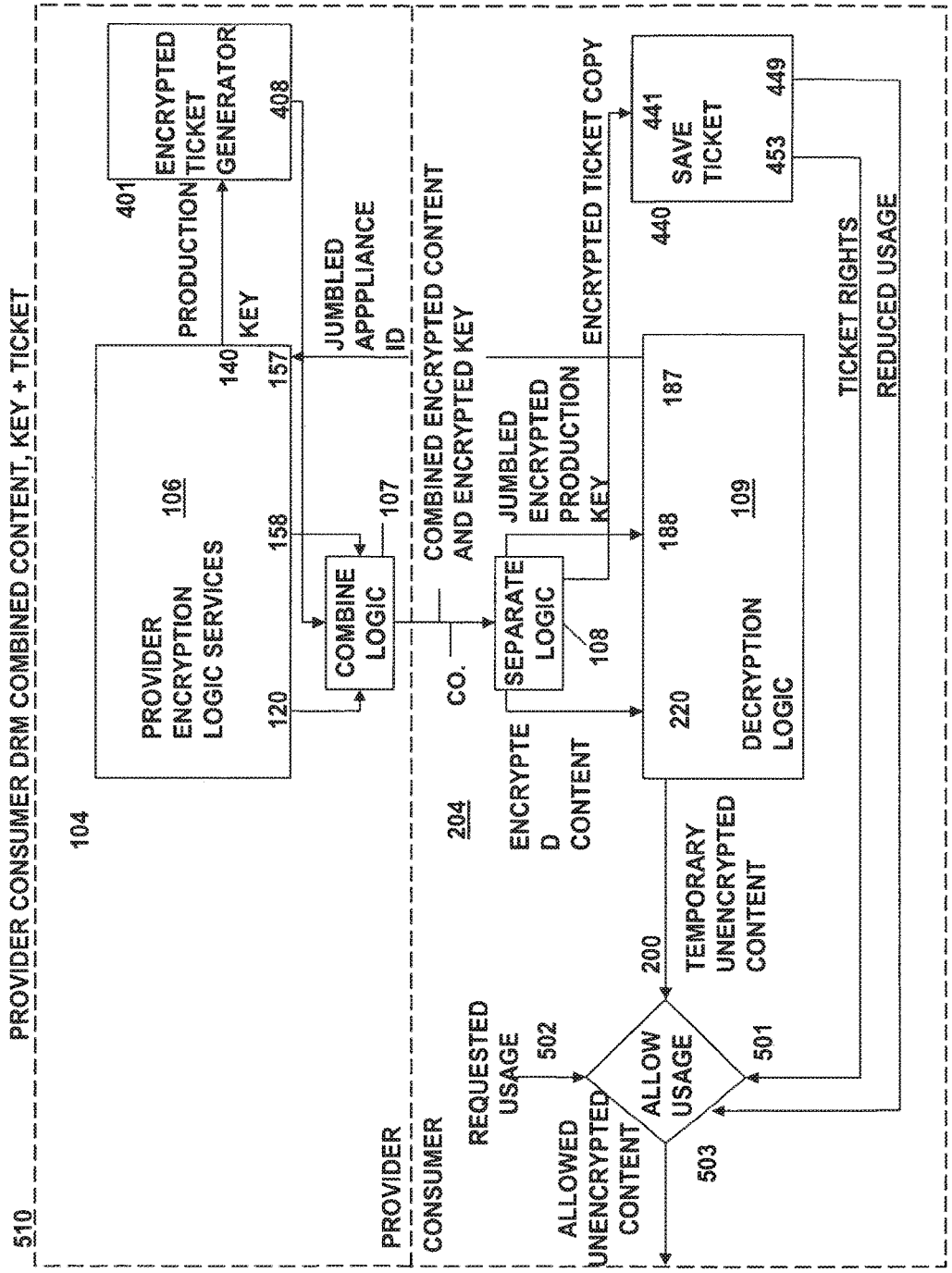
FIG. 4 is a block diagram and state flow diagram, illustrating the combined system of FIG. 3 with the provision of combined content with associated rights ticket.

FIG. 4 illustrates the system of FIG. 3, with the addition of combining logic (107) at the production system (104), and separating logic (108) in the recipient device (204). The provider subsystem (104) provides separate outputs from its encryption logic (106) of encrypted content (120) and an encrypted production key (158) which are combined by the combining logic (107) to provide a single combined output of encrypted content and encrypted production key encryption. As illustrated, the encrypted content is comprised of encrypted content with its respective associated encrypted usage rights ticket. As illustrated, the encrypted content is comprised of a combination of selected encrypted content with its respective associated encrypted usage rights ticket. The recipient device (204) provides separating logic (108) that receives the combined output (CO) as output from the combining logic (107), and separates the combined output into individual separate outputs of encrypted content (with ticket) and associated respective encrypted production key as inputs to the decryption logic (109) of the recipient device (204), and the encrypted ticket is coupled to input (441) of ticket memory and logic (440), and thereafter, operation is as described in FIG. 3.

FIGS. 5-8 illustrate more detailed block diagrams of the provider encryption services subsystem 104 of FIGS. 1-4.

Figure 5:
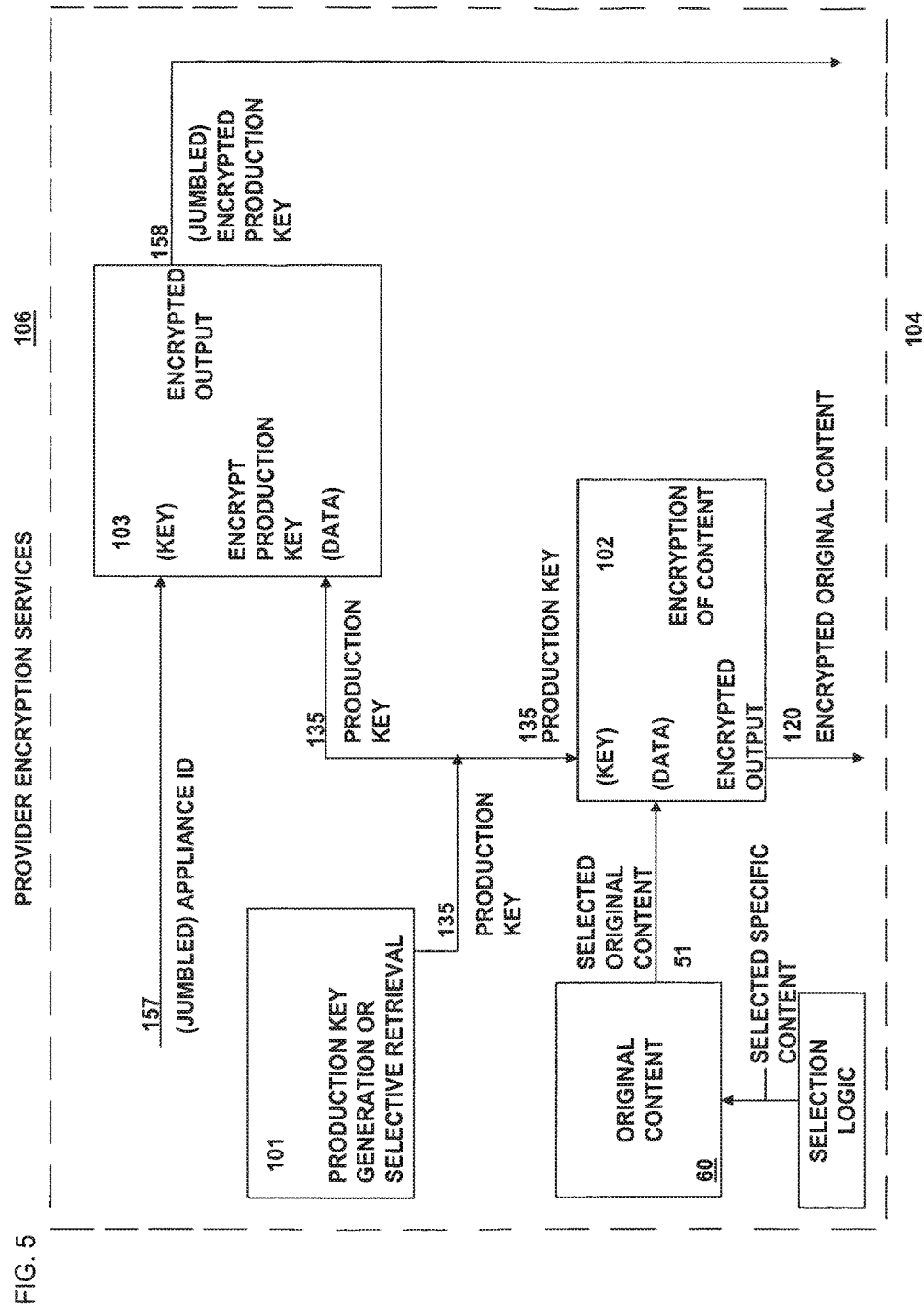

FIG. 5 illustrates a block diagram with associated state flow, illustrating further details of the generation of encrypted production key outputs for use by the production system (104) as an encryption key to use for encryption of respective associated content. The details of a key creation methodology and system are also described with reference to FIGS. 8, 16, and 17.

Referring to FIG. 5, the provider encryption logic (106) of the production system (104) is illustrated in further detail, as to generation and usage of production encryption keys, as used for encrypting of respective associated content, associated control data, and usage rights tickets. An Appliance ID (157) (preferably jumbled), as generated from a specific recipient device (204), is coupled as an input to encryption logic (103) of the production system (104) production key logic (101) that provides for an output of a specific selected production (encryption) key (135). The specific selected production key is either generated (such as by a random number generator of keys, a seeded pool generator of keys, etc.), or selectively chosen from a stored database of keys, etc. The production key (135) is coupled as an input to the data input of the production key encryption logic (103), which encrypts the respective specific selected production key, responsive to the Appliance ID (157), to provide an encrypted output of a respective encrypted production key (158), which is, preferably jumbled first and, provided as an output from the production system (104), for even that input to the respective recipient device (that provided the respective Appliance ID (157) utilized as an encryption key. The production key (135) is also coupled as an input to an encryption key input to content encryption logic 9102). Selection logic (50) in the production system (104) provides for selection of a particular file (or files) of specific particular original content, to provide an output of selected original content (51) coupled as an input to the data input of content encryption logic (102). The content encryption logic (102) encrypts the selected original content (51), responsive to the associated respective specific particular production key (135), to provide an encrypted output of respective encrypted (selected) original content (120).

The selection logic (50) can be responsive to an operator (person) at the production system (104), or responsive to on-line purchase transactions, or a supplied order list, or in accordance with publishers or content owners' instructions, etc.

As illustrated and discussed hereinafter, the generation of the encrypted content and encrypted production key can be accomplished in numerous alternative ways, the choice being one of design tradeoffs.

Figure 6:
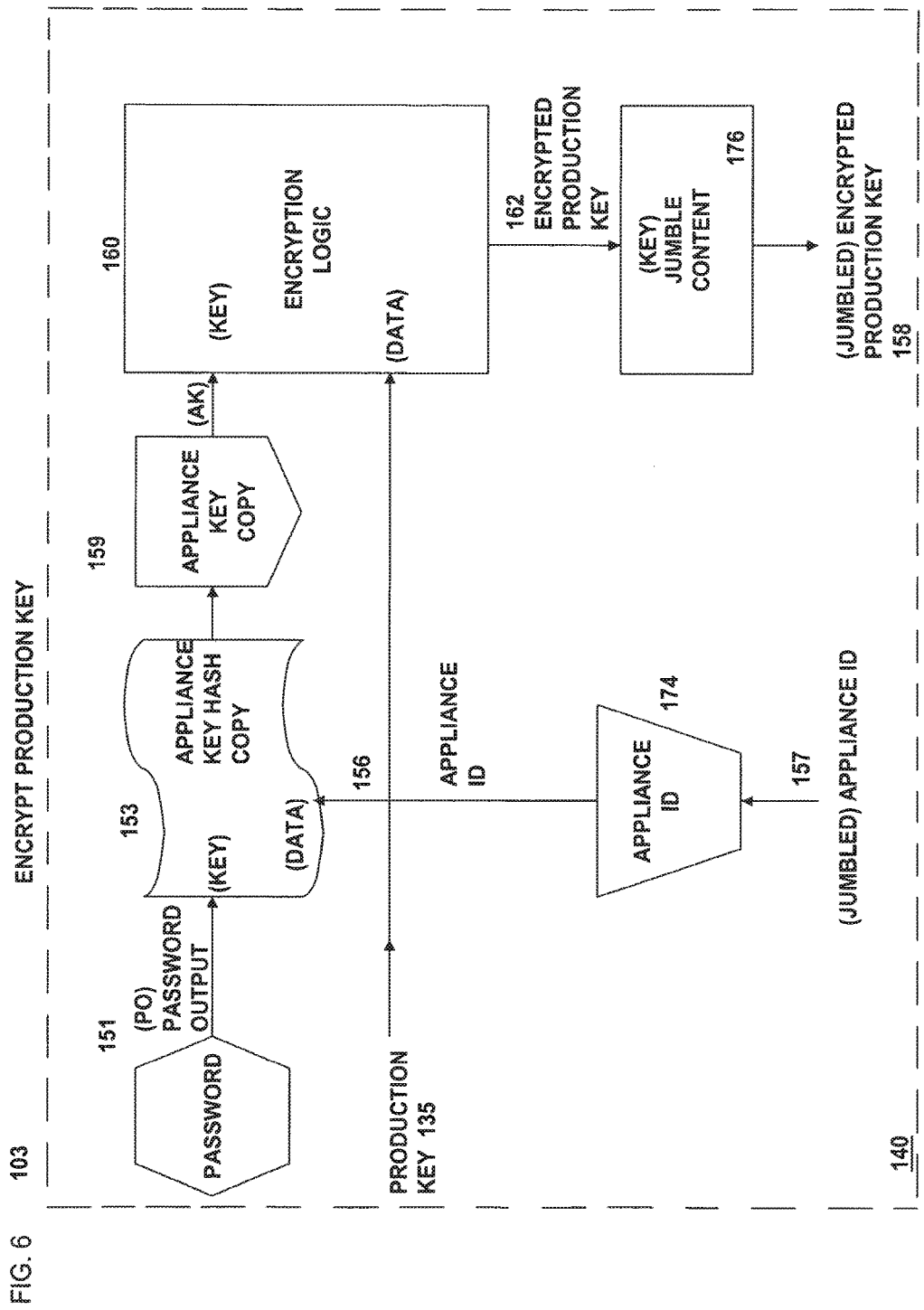

FIG. 6 illustrates a detailed block diagram showing details for the production key encryption subsystem (103), illustrating the generation of the encrypted production key (162) from the respective production key (135), and an Appliance ID (157), (preferably, a jumbled Appliance ID securely communicated), coming from either the recipient device appliance (204), or a storage means (174) within (or external to) the production system for storing the Appliance ID from the respective appliance. The jumbling and unjumbling of encrypted production key output and the Appliance ID output are design choices, not requirements of the present invention, and are factors of the communications environment design choices. The choice of communication between the production system (104) and the consumer system recipient device (204) can alternatively be of jumbled or of non jumbled signals, such as encrypted content, and/or encrypted production key, and/or Appliance ID.

FIG. 6, also illustrates an additional embodiment providing additional security. The Appliance ID (157) received by the production system (104) is, if needed first unjumbled (if it was originally jumbled), and is stored (174) as a stored Appliance ID, which is coupled as an Appliance ID output (156) coupled to the data input of appliance hash logic, which is a copy of (equivalent to) corresponding to hash logic (153) that is used similarly at the recipient device for decrypting the production key therein. A password is provided (151) [such as internally generated (and provided securely to the respective content holding recipient device), or otherwise provided], as an encryption key input to the hash logic (153). The hash logic (153) utilizes the Appliance II) (156) (as originally generated at a specific recipient device), responsive to the password (PO), to generate a hash value (or encrypt with encryption logic to generate an encrypted value) of an associated appliance key [which is a copy of the appliance key (that is, it is the same) that the recipient device generates internally, responsive to being provided the password (PO) (such as via user entry of data into the recipient device, via download, or otherwise), and responsive to the internal generation of the respective Appliance ID].

The appliance key output (AK) is coupled as an input to the (encryption) key input of appliance key encryption logic (160). The respective selected production key (135) is coupled as an input to the data input of encryption logic (160), which encrypts the respective selected production key (135), responsive to the respective appliance key (AK), to provide an output of respective encrypted production key (162). Where jumbling is desired, jumble logic (176) provides a jumbled encrypted production output (158), responsive to jumbling according to defined logic, the encrypted production key (162).

As discussed hereinabove, jumbling refers to processing of content to be communicated in a secure method. Jumbling can be accomplished in numerous alternative ways, such as use of secure socket layer (SSL), encryption, etc.

Figure 7:
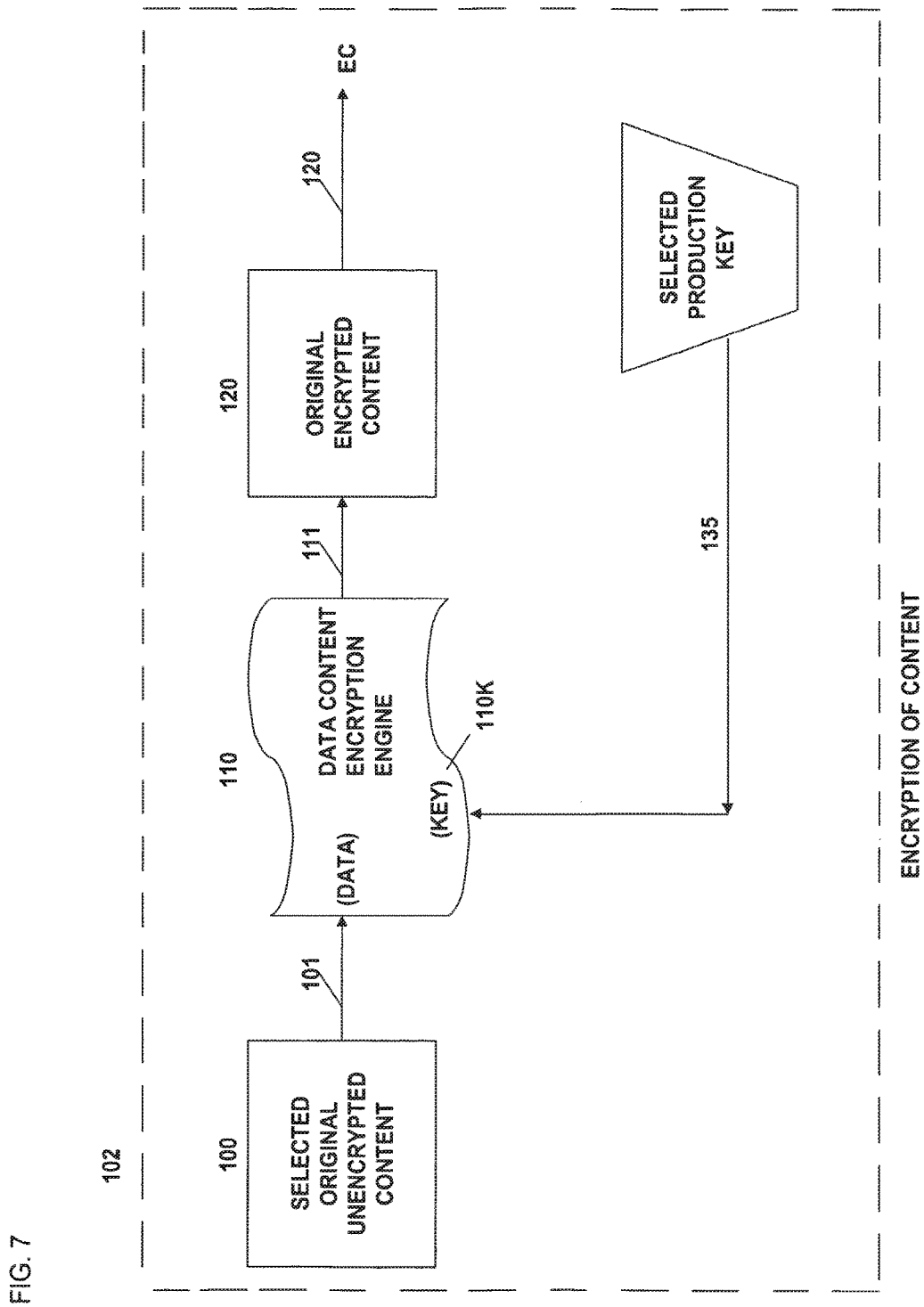

FIG. 7 illustrates a detailed block diagram of the content encryption subsystem 102, utilizing the selected production key (133) and associated selected original unencrypted content (101) to generate a respective encrypted original content output (120). The production key (135) is coupled as an encryption key input (110k) and coupled to a hash (or other one-way encryption function) logic (110). The encryption key input (110k) provides the parameter to encrypt or lock [and decrypt or unlock], to provide for encryption (and later decryption) of the selected original unencrypted content (101) to produce an output of encrypted content (120). As described in detail elsewhere herein, any hashing or alternative encryption logic (and its inverse for decryption) can be used consistent with the present invention for encrypting and decrypting of the original content, the production encryption key, the Appliance ID, the Appliance Key, a Document ID, and the ticket or associated control data.

Figure 8:
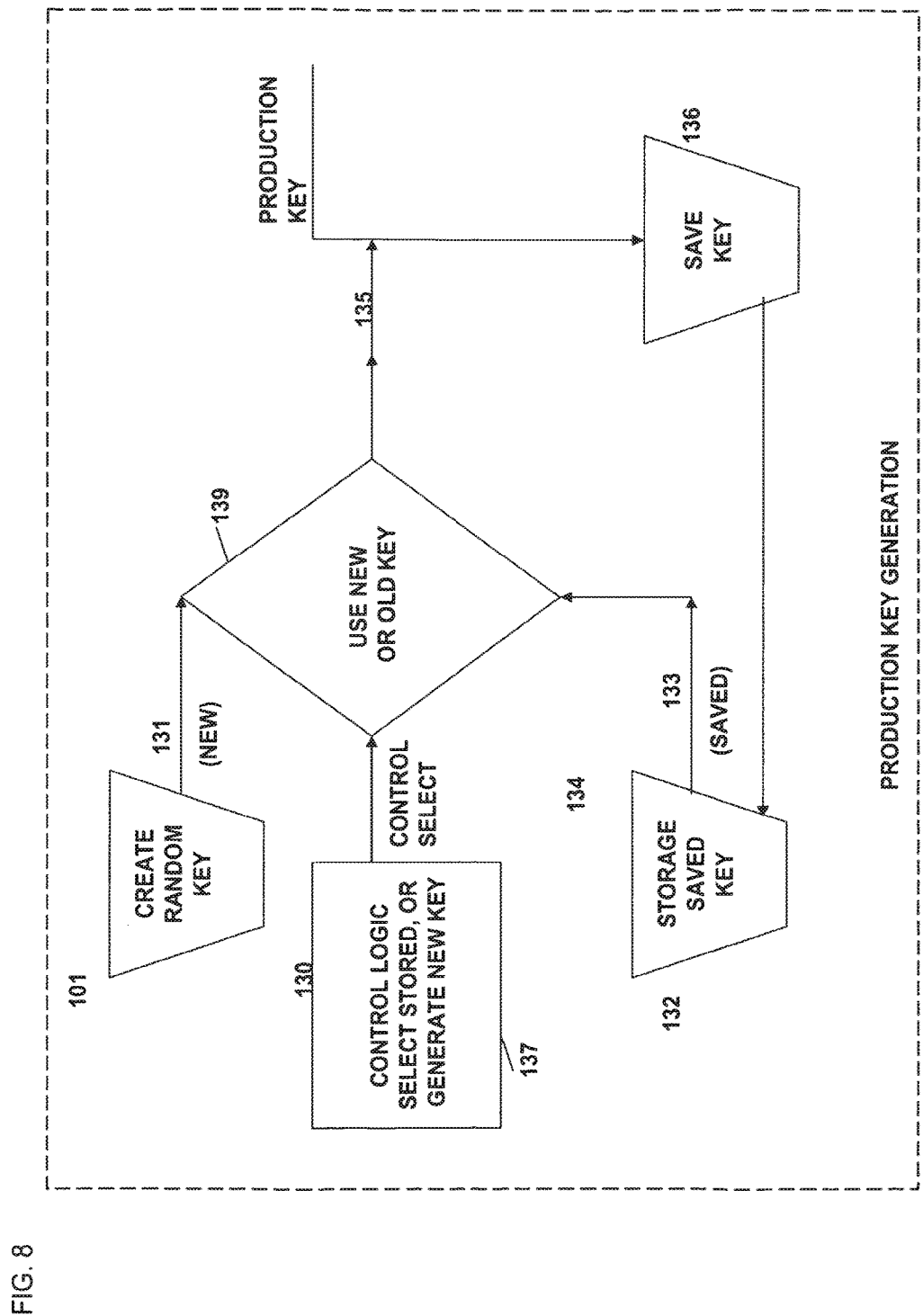

FIG. 8 illustrates a more detailed diagram of the production key generation subsystem 101, which provides for selection (137) of a production key (135) from either a saved key (133) or by generation (by any means that is secure) of a new key (131). Selection logic (137)[such as responsive to a software programmed function, or responsive to a person, or otherwise], provides control for selecting (139) for a new key (131) to be generated (130), or for a stored key (133) to be utilized. The selecting of the production key (139) provides an output of a selected production key (135) for use within the production system (104). When newly generated, the new production key (135) is stored (136) as a saved key (136) for other use, and/or as associated with respective selected content, and is stored as a saved key for use as a production key (132). A production key (135) is used to encrypt associated respective selected content to create encrypted content. The production key (135) is also usable to encrypt associated control data, or a ticket, or a Document ID, etc. Thereafter, the production key is needed to provide the decryption key input to an equivalent hash function (or other encryption/decryption function) to unlock and decrypt the respective encrypted content to produce a copy of the original encrypted content. In a preferred embodiment, an index variable (such as a Document ID) is associated with and stored with the respective encrypted content and the associated respective production key, so as to map the respective production key to its associated respective selected content and other encrypted data, (if any), that was encrypted using that respective production key.

FIGS. 9-12 provide further details of the consumer decryption services subsystem (the user's appliance or recipient device) 204 of FIGS. 1-4.

Figure 9:
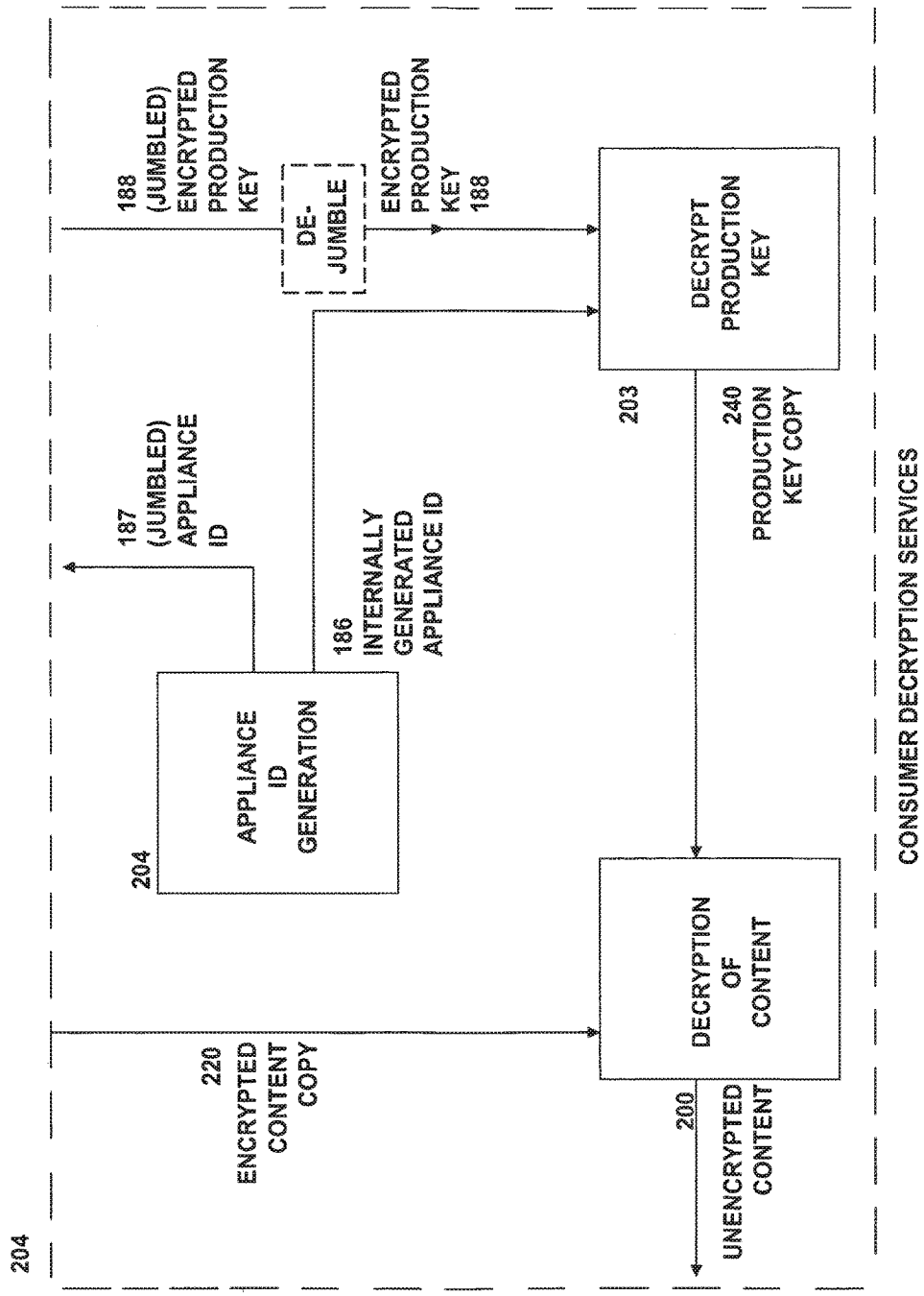

FIG. 9 illustrates the block diagram and data flow, at the recipient device (204), related to the utilization of the communicated encrypted content, and (jumbled) encrypted production key. The recipient device (204) utilizes an internally generated (204) Appliance ID (186) as a decryption key input to production key decryption logic (204), which utilizes the Appliance ID as the decryption key to decrypt the encrypted production key (188) to generate a production key copy (240), and utilizes the production key copy to decrypt an encrypted content copy (220) [as provided from a production system (104)], to provide unencrypted content output (200), that is stored (preferably, only kept temporarily in memory, and only during permitted usages). Furthermore, usage of the decrypted content at the recipient device is selectively provided responsive to and in accordance with the permitted usage rights.

Figure 10:
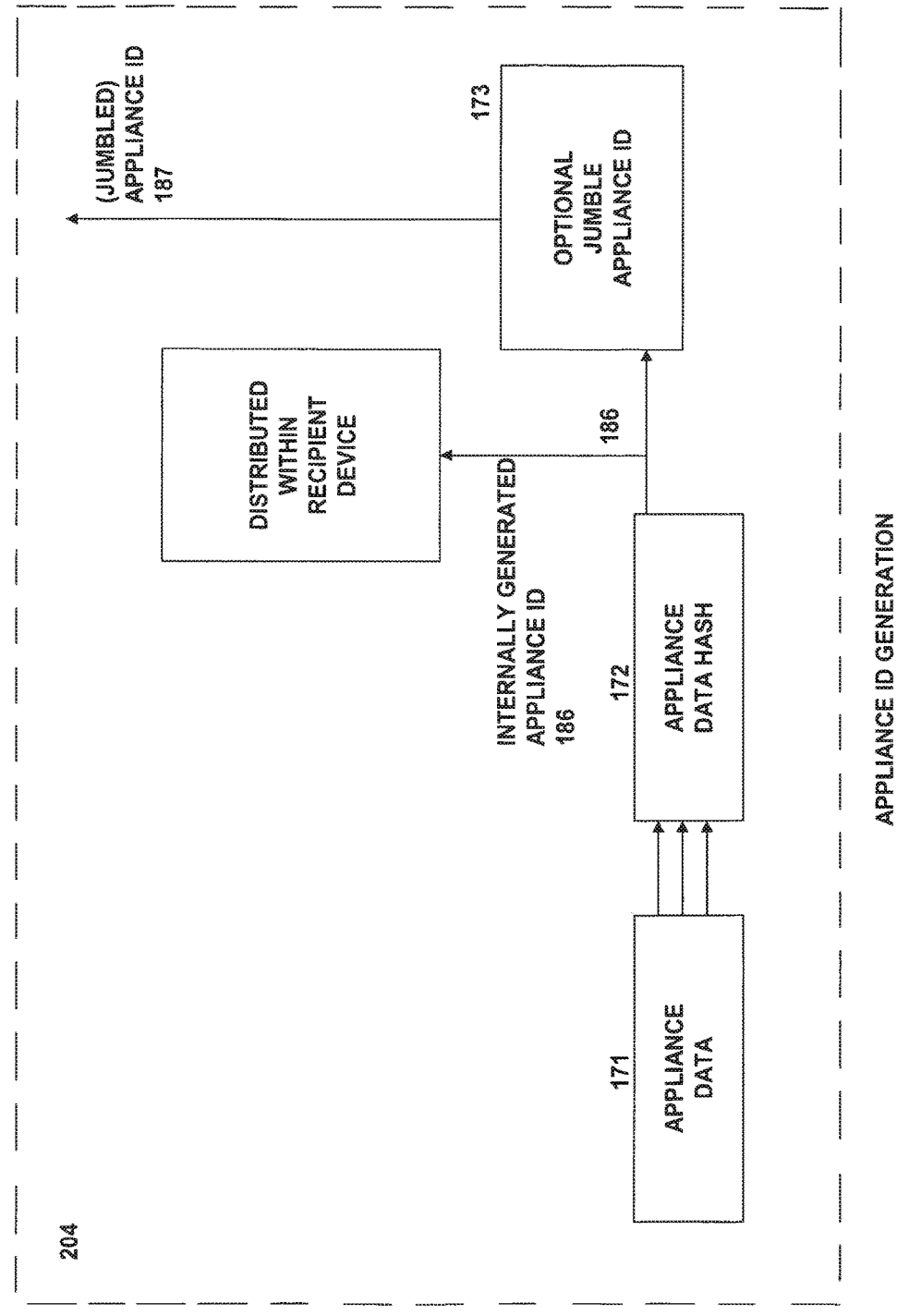

FIG. 10 illustrates in generating of the Appliance ID and jumbled Appliance ID (where utilized) in the subsystem (204) for usage within the consumer decryption services subsystem (204) and provided, preferably in a protected format, to the producer subsystem (104). The recipient device (204) computing system executes an authorized application program, which obtains appliance data (171) from within the hardware and software of the recipient device (204), which appliance data is input to a hash logic (172) (or other obfuscation or encryption means) to internally generate a generated Appliance ID (186), which is (1) provided as an internal Appliance ID signal (186) distributed within the recipient device (204), and, (2) provided as an output for input to the production system (104). As illustrated, the internally generated Appliance ID (186) is input to jumble logic (173) which processes the internally generated Appliance ID (186) to generate a jumbled Appliance ID output (187), for coupling to the production system (104). As discussed elsewhere herein, jumbling (and unjumbling) are design option choices, and the use or nonuse, either is compatible with the present invention.

Figure 11:
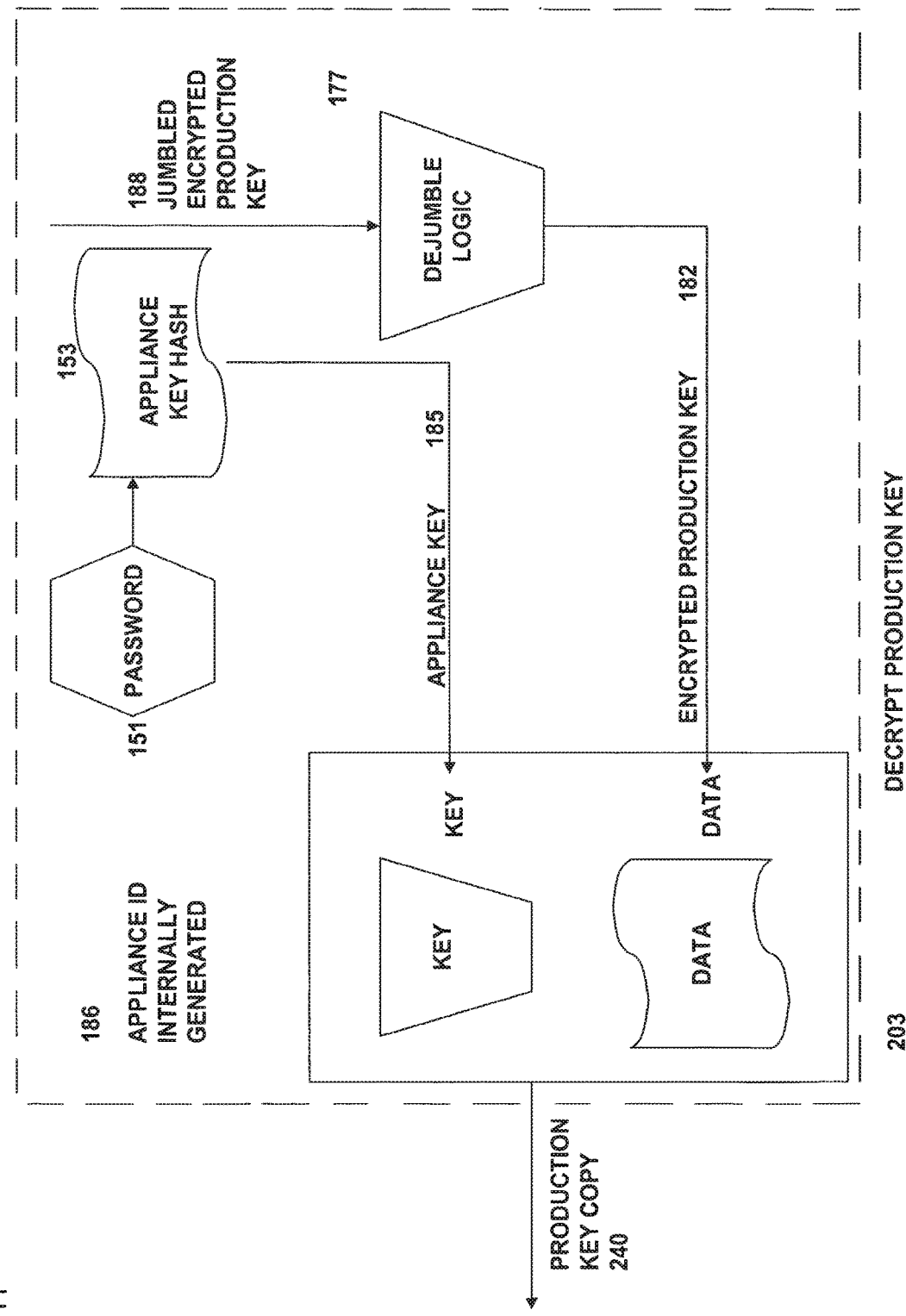

FIG. 11 illustrates the decryption of the production key within the recipient device (201), providing for decryption of the encrypted production key utilizing the internally generated Appliance ID to generate an appliance key utilized to decrypt the encrypted production to provide a production key copy output to the consumer decryption subsystem (204). Where jumbling is utilized, the jumbled signal (such as jumbled encrypted production key) is first dejumbled (such as to create an unjumbled encrypted production key) as a part of the process, as appropriate. As illustrated in FIG. 11, the jumbled encrypted production key (199), as input to the recipient device (204), is coupled as an input to dejumble logic (177), which processes the jumbled encrypted production key to provide an output of an encrypted production key (182) which is coupled as a data input to key decryption logic (26). Additionally, the internally generated Appliance ID (186) is coupled as a data input to appliance key hash logic (153), which (as illustrated) is responsive to a predefined password input (151) providing a key input to the appliance key has logic (153) [or other encryption logic type]. The use of the password is optional, and is utilized for higher security, requiring a password to decode (decrypt/hash) the Appliance ID to generate an appliance key. Alternatively, the use of a password is not required, and the internally generated Appliance ID is used directly (or after some processing), as a decryption key for the production key decryption logic (260). The production key decryption logic (260) decrypts the encrypted production key (182), responsive to the appliance key (as a decryption key), to provide an output of a decrypted production key (copy) (240).

Figure 12:
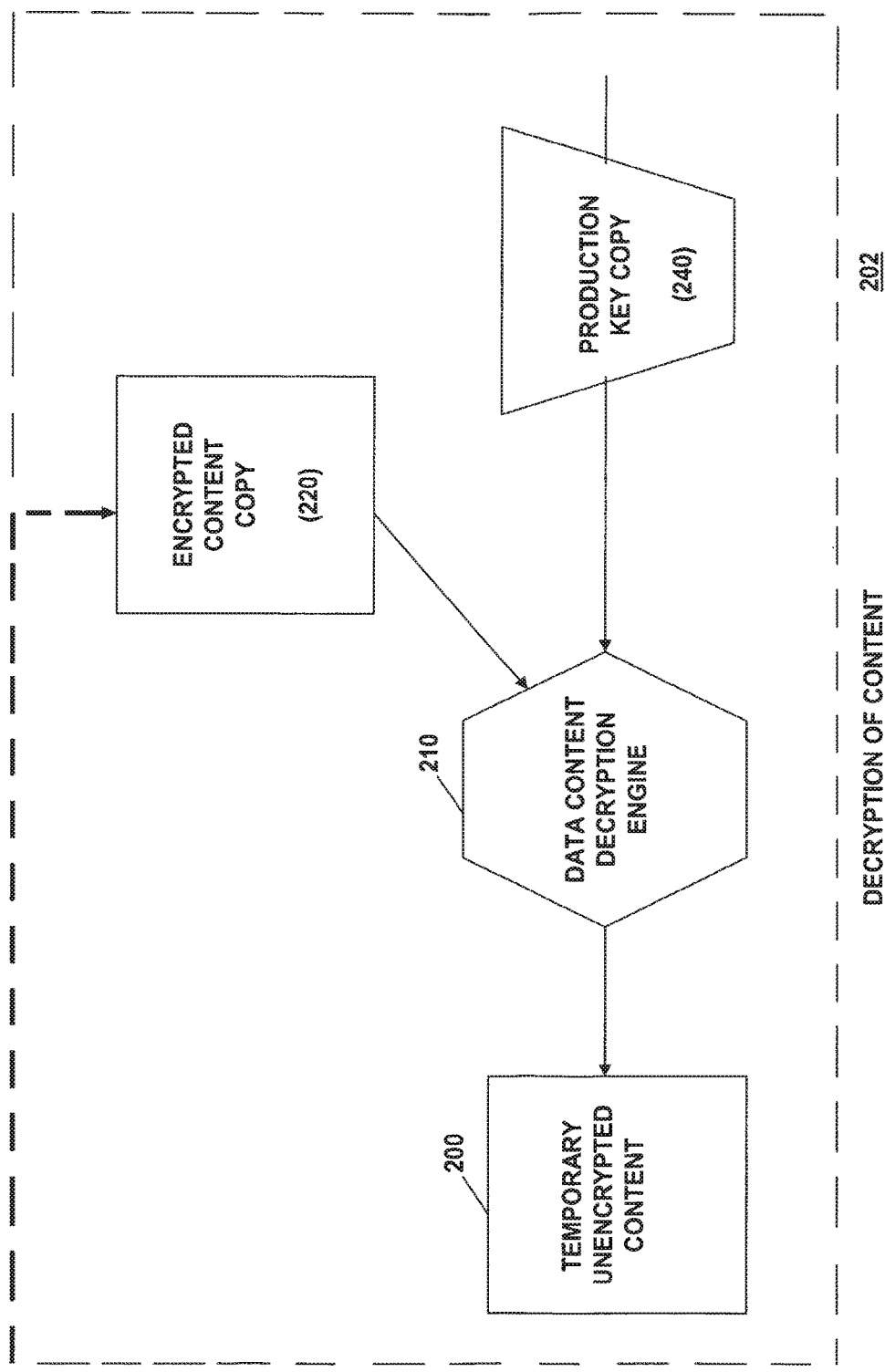

FIG. 12 is a detailed block diagram of the content decryption subsystem (202), of the consumer decryption subsystem (204), providing for decryption by data content decryption logic (210), (220) as coupled to the data input of the data content decryption logic (210), and of the encrypted content copy (240) coupled as a decryption key input to the data content decryption logic (210) utilizing the production key copy wherein the data content decryption logic generates the unencrypted content (200) (preferably stored only temporarily) for use by the consumer decryption subsystem (204).

Figure 13:
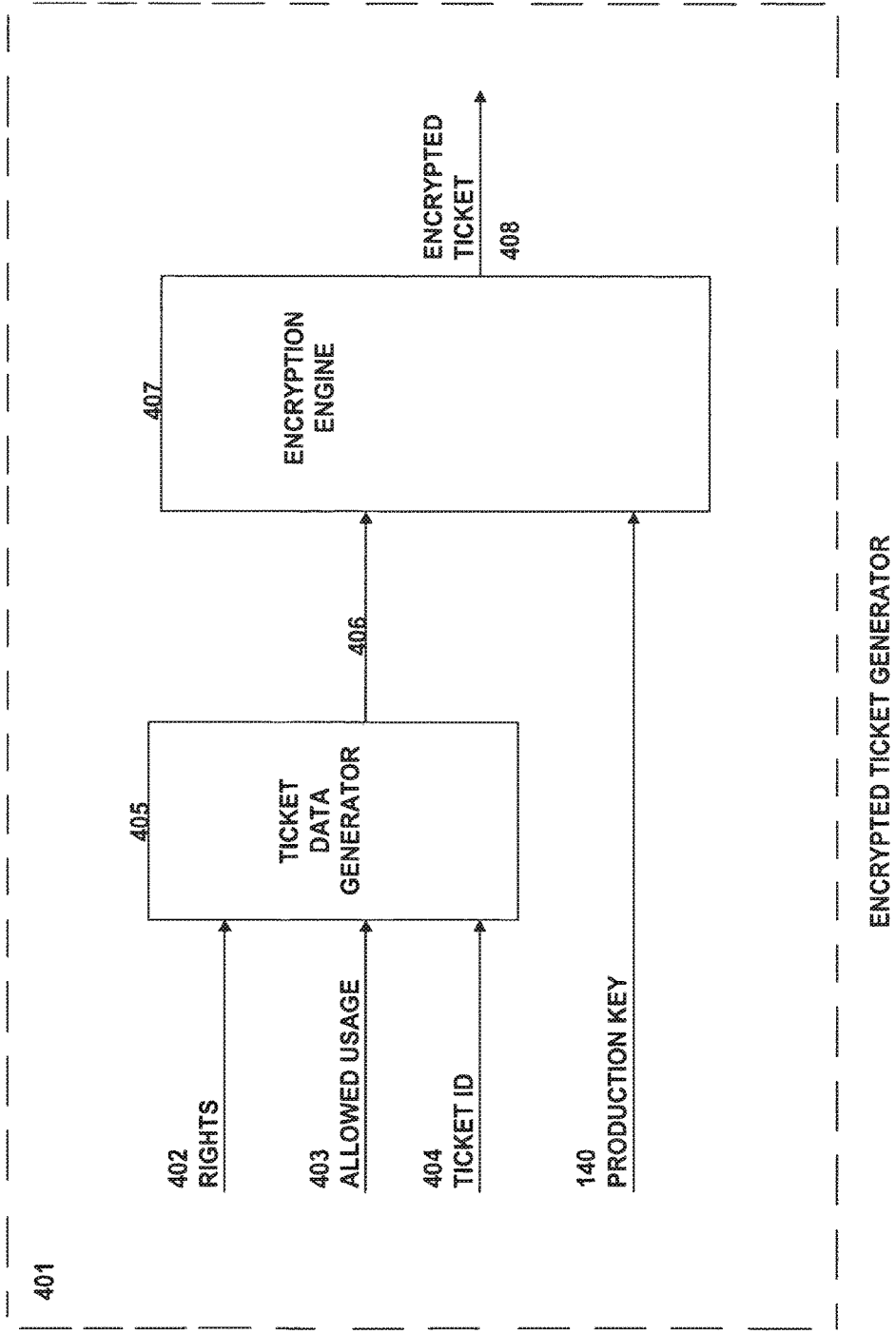
Figure 14:
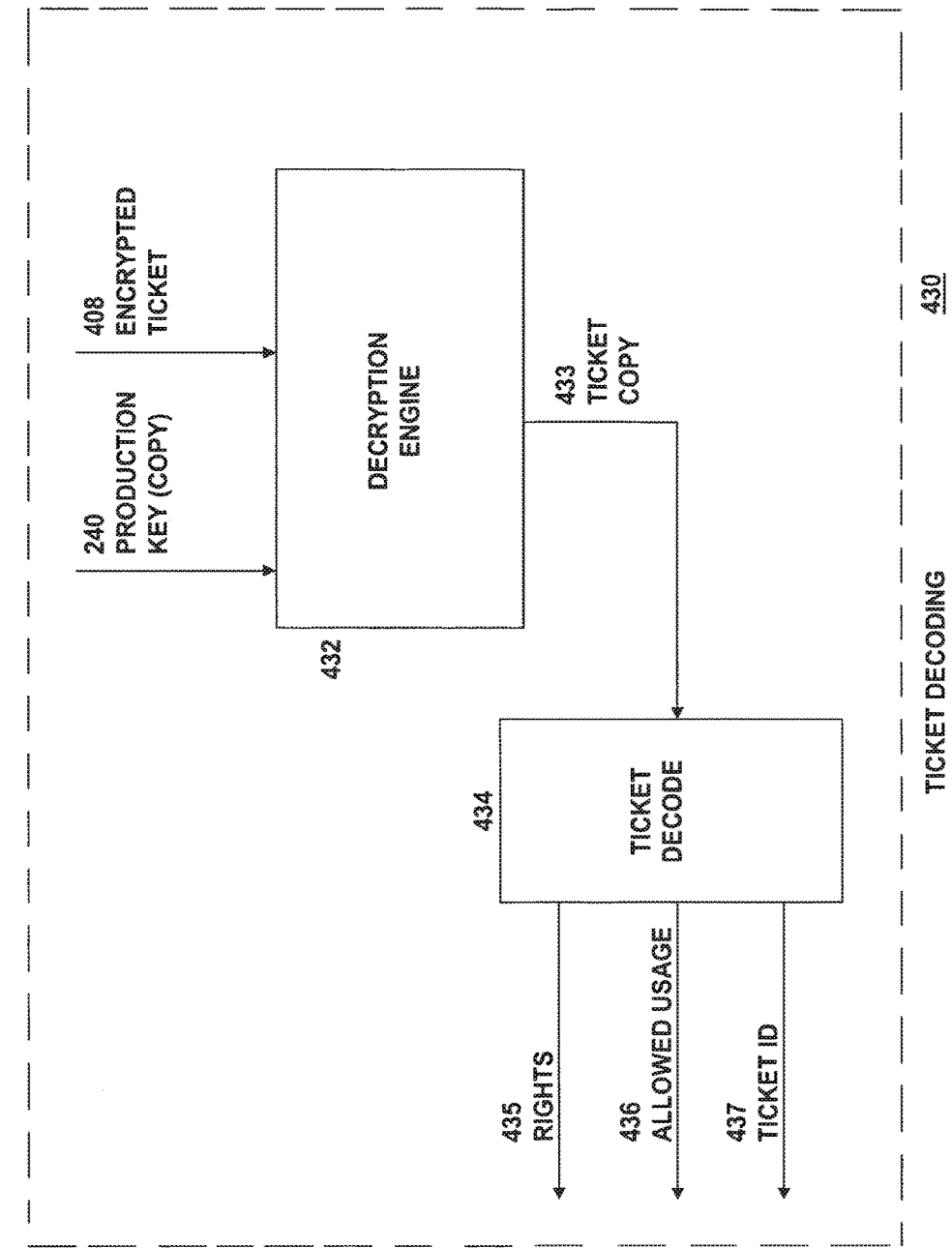
Figure 15:
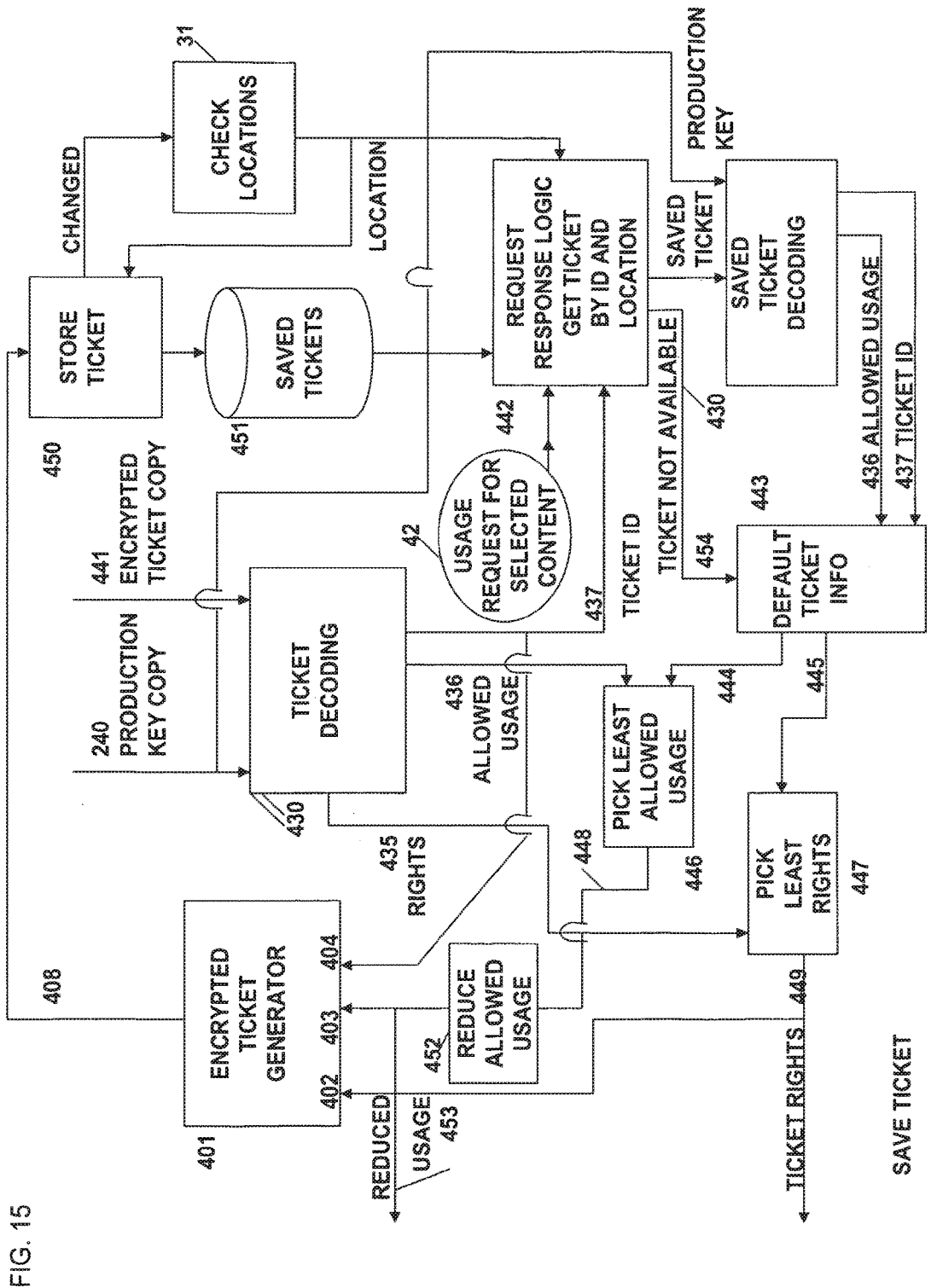

FIGS. 13-15 illustrate various aspects of the generation, encryption, decoding, and utilization of the rights ticket.

FIG. 13 illustrates the encrypted ticket generator (401) (as in FIGS. 3-4) of the production system (104), providing an encrypted ticket output (408), defining and providing for associated defined rights, allowed usages, and Ticket IDs for respective associated protected content. The encrypted ticket output (408) is associated with its respective production key (140) and the respective associated encrypted content. The production system (104) provides defined outputs for permitted rights (402) [defining those features, functions and options that are to be selectively restricted or permitted], allowed usage (403) [defining limits or restrictions on permitted rights, such as how many print copies are to be allowed for respective associated protected content, how many exports of are allowed for a respective associated protected content, etc.], a ticket ID [for uniquely identifying the ticket (such as for use in indexing or mapping of a respective ticket to respective associated protected content or a respective associated production key)], and a respective production key associated with the respective ticket ID (404) and the respective encrypted ticket (408). Ticket data generation logic (405) processes the inputs of rights (402), allowed usage (403) and a ticket ID (404) to generate (according to defined logic) a respective ticket output (406) that is coupled as a data input to ticket encryption logic (407). The respective associated production key (140) is coupled as an encryption key input to the ticket encryption logic (407), which responsive tot he production key (104) encrypts the ticket (406) to generate an encrypted ticket (408) that is provided for output to a specific recipient device (as associated with respective protected content for the specific recipient device. The encryption of the respective production key (140), responsive to the generated Appliance ID of a particular specific appliance recipient device provides for appliance specific mapping of the respective encrypted content encrypted ticket and encrypted production key to be to the respective specific appliance associated with the respective generated Appliance ID. This is because the encrypted production key can then only be decrypted at the particular specific recipient device to generate the decrypted production key (copy) that can then be used to decrypt the respective associated encrypted content and respective associated encrypted ticket at that particular specific recipient device.

FIG. 14 illustrates ticket decoding at the consumer decryption subsystem (204), and the utilization therein of a ticket decoding subsystem (430). The encrypted ticket output (408) of the encrypted ticket generator (401) is coupled to a data input of decryption logic (432). The production key (copy) (240) is coupled to a decryption key input of the decryption logic (432), which responsive thereto, processes the encrypted ticket to decrypt it, to generate a ticket copy (433) which is coupled as an input to ticket decode logic (434) which decodes the ticket copy (433) [according to predefined logic] to determine and provide an output of Rights (435) and Allowed Usages (436) and Ticket ID (437) and its verification. Since (for appliance specific-based protection), the generated Appliance ID is needed to unlock (decrypt) the encrypted production key, this insures that only the specific appliance for the respective Appliance ID can in any way use the encrypted content or encrypted ticket.

FIG. 15 illustrates the saved ticket subsystem (440) (of FIGS. 3-4), showing details of the overall system operation (and data flow and state flow), for the encrypted ticket generator (401), and the resulting ticket decoding (430). The recipient device (204) provides a usage request for specific selected protected content (42) [which initiates the processing of that request by the recipient device (204)] that is coupled as an input to request response logic (442). Ticket decoding logic (430) decrypts the encrypted ticket (copy) (441) responsive to the production key (copy) (240), and provides outputs of a ticket ID (437) [coupled as an input to the request response logic (442)], allowed usage (436) [coupled as an input to anti-tampering logic (446) which resolves conflicting allowed usage information among multiple stored information for said allowed usage by selecting the least usage rights (least allowed usage)], and rights (435) defining permitted rights for the specific selected content [coupled to rights selection logic (447) for resolving conflicting rights information as among multiple stored information for said respective rights]. The request response logic (442), responsive to the usage request (42) and the ticket ID (437), retrieves the respective associated ticket from the saved tickets (451), checking for all locations where multiple stored information exists for said respective ticket, and provides one of a ticket not available output [coupled as an input to saved ticket decoding logic (430), which decrypts the encrypted saved ticket responsive to the production key (copy) (240) to provide decrypted outputs of allowed usage (436) and ticket ID (437) coupled as inputs to default ticket information logic (443) which responsive thereto provides outputs of default allowed usage (444) [provided as an input to anti-tampering logic (446)] and default rights (445) [coupled as an input to rights selection logic (447), which has its other input coupled to the decoded ticket rights output (435)].

The rights selection logic (447) selects the lesser of the permitted rights [default rights (445) versus decoded ticket rights (435)] to provide an output of ticket rights (449), which is coupled within the recipient device for usage in regulating the permitted rights and allowed usage in accordance with the ticket rights (449) for respective associated specific selected content. The ticket rights output (449) is also coupled as an input [at (402)] to encrypted ticket generator logic (401).

The anti-tampering logic (446) is responsive to the inputs of the default allowed usage (444) and the decoded ticket allowed usage (436), to select to lesser of the allowed usages represented thereby so as to provide an output of determined usage rights (448) [which is coupled as an input to usage regulation logic (452) which reduces the determined allowed usage (as per the usage request (42)), such as by subtracting one (1) use (e.g., if the request was to print one copy, and the allowed usage is to print one (1) copy, then the usage reduction logic (452) reduces the allowed usage by the one printout requested, to leave zero (0) copies allowed to be printed]. The reduced allowed usage is output and coupled to both (1) other processes within the recipient device, and (2) as an input (403) to the encrypted ticket generator logic (401). The decoded ticket ID (437) is also coupled as an input to the encrypted ticket generator (401), which responsive to the ticket rights (449) input (402), the decoded ticket ID (437) input (404), and the reduced allowed usage (453) input (403), provides an output of a revised encrypted ticket (408) which is coupled for storage (450) of the revised ticket which is stored among saved tickets (451). Additionally, the store ticket logic (450) provides a changed output coupled as an input to check location logic which provides for storing (and maintaining an index of the storage) the respective ticket (or portions thereof) in one or multiple locations, and provides a location output coupled to both the store ticket logic (450) and the request response logic (442), in both cases, providing for selective storage (or retrieval) of all stored locations for a respective ticket (or portions thereof).

Figure 16A:
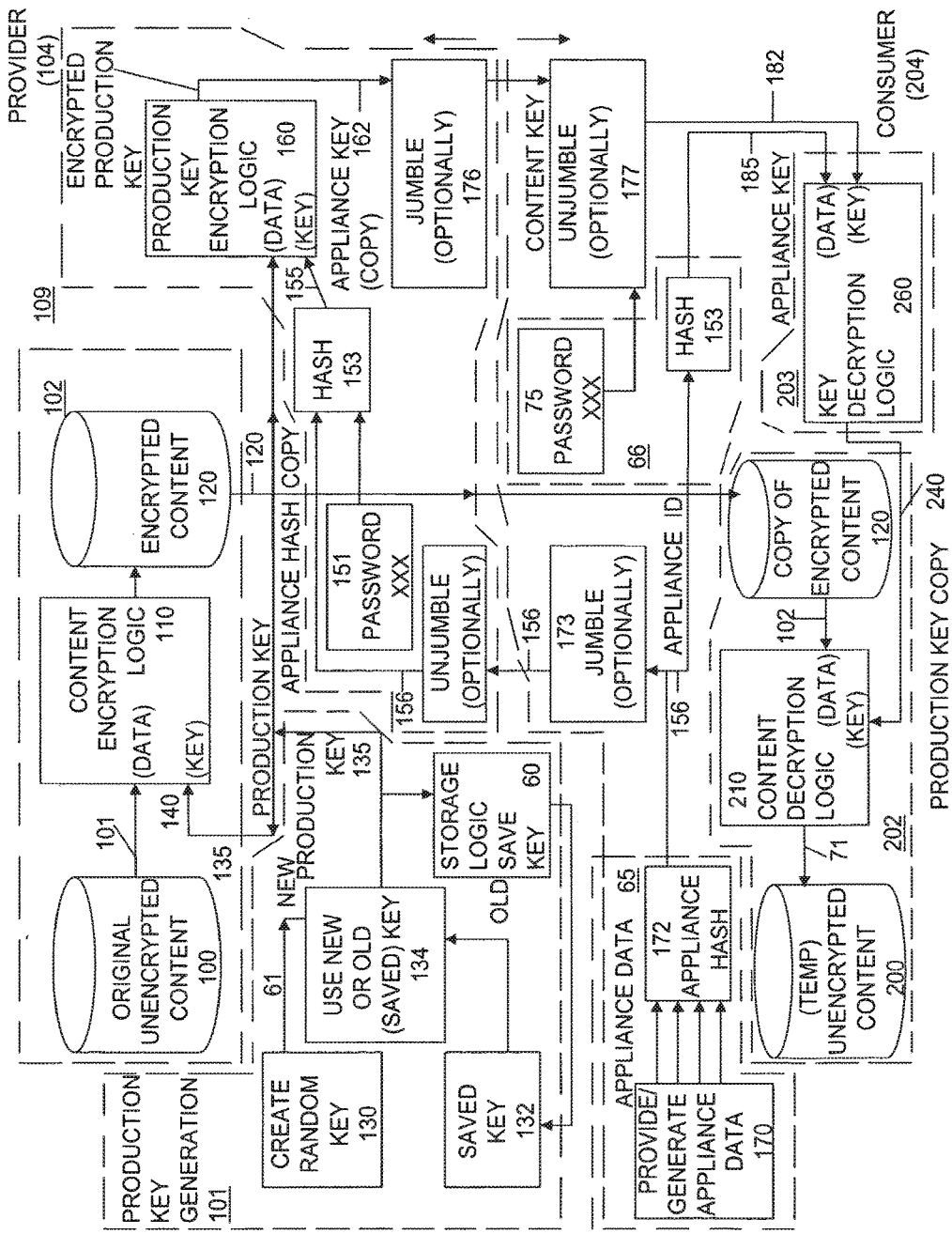
FIG. 16A is a detailed electrical computing system block diagram showing both electronic computing system hardware components, data components, and state flow and data flow for the complete distribution system including the production subsystem and consumer subsystem, with FIG. 16A illustrating the provision of independent non-combined separate outputs of an encrypted production key and associated encrypted content, and where applicable, also an associated encrypted ticket, wherein FIG. 16A provides a detailed system block diagram including data and state flow indications, for FIGS. 1, 3, and 5-15, as well as FIGS. 18-28 and 30-33.

Referring to FIG. 16A, a methodology and system providing for the secured communications of protected content, as well as for the secure viewing and/or printing and/or exporting of the content, is provided. Referring to FIG. 16A, selected original unencrypted content (100) is coupled as an input to the data input of data content encryption engine logic (110), which responsive to a production key (135) coupled as an input to the key input of data content encryption logic (110), provides for encrypting the original content (100) to provide an output of encrypted content (120). The encryption of the selected original content (100) is processed by the encryption subsystem (102) [e.g., the dashed box (102)], as per the state flow is as indicated and discussed with reference to the components within the encryption subsystem (102).

A production encryption key creation subsystem (101) [also referred to as production key or key] and methodology and state flow therefor, are also discussed as illustrated in FIG. 16A. As illustrated, selection logic (134) provides for generation of a production key by either (1) generating a random key (130). This can be done in any convenient way, such as using discrete logic, or a state machine programmed with a variable, or a software routine, or other means to provide a new key (61) output (e.g., random number or polynomial generator, seeded pool, etc.) of a new key output (131); or alternatively, (2) the selection logic (134) accesses from storage a previously saved key (or keys) (132) are provided as an output (133) coupled to the selection logic (134). The selection logic (134), thus, selectively provides one of a new key or a saved key, in accordance with defined rules. In one embodiment, a new key is created periodically, and then utilized as a saved key for a defined period of time. Alternatively, a new key can be used for each file, or for a group of related files. As illustrated in FIG. 16A, the saved key output (133) or new key output key (131) are selected and coupled to the selection logic (134) which provides an output of the respective specific production key (135) which output is coupled to both (1) storage (60) logic for storing the respective specific production key (135) as a saved key in storage (132), which the saved key can later be utilized and retrieved as a previously saved key (132); and (2) the respective specific production key output (135) is also coupled and provided as an input to the encryption key input (140) of content encryption logic (110). Numerous techniques can be utilized to generate or create the random key by the key creation logic (130). Additionally, numerous types of encryption technology can be utilized for the data content encryption logic engine (110).

In a preferred embodiment, a conversion program creates a new random production key on request. It also allows setting of a production key to a previously generated production key. In one embodiment, when converting a group of documents, the first document created gets a new production key and the remaining documents in the group use the same production key as the first. This allows all the documents to be opened with a single document key. These documents can be sold together as a single package (e.g., such as a file or a CD-ROM).

For an extra level of security, a password level of security can be added on top of and in addition to the use of the Appliance ID to decrypt and decrypt the respective production key. The production key (135) is also coupled to a production key encryption subsystem (103). The production key (135) is coupled a Data Input of Production Key Encryption Logic (160). In the illustrated embodiment, a first password 151, is generated, which can be done by numerous means including a shared password content, or a generated password according to defined criteria, or provided as part of a transaction processing, etc. The first password (151) is coupled to appliance hash logic (153) [an equivalent copy to a corresponding hash logic in the respective recipient device generating the Appliance ID (156)], which responsive to an externally provided Appliance ID (156) provides an output of an appliance key (copy) (155) which is provided as an encryption key input to the production key encryption logic engine (160). The production key encryption logic (160) encrypts the production key (135) responsive to the Appliance Key (155) to provide an output of encrypted production key output (162).

The encrypted content (120) and the encrypted production key (162) are both provided as outputs coupled to, and to be utilized by, a respective associated recipient device (the consumer's appliance) to reconstruct a copy of the selected original unencrypted content (100). In order to provide for data rights management, decryption of both the encrypted content (120) and of the encrypted production key (162) are required at the recipient device, because the decrypted production key is needed (and used) to decrypt the encrypted content (120). To provide appliance specific control of decryption, the unique Appliance ID associated with a specific appliance is generated within the respective specific recipient device appliance and coupled to the production system (104), and is used therein to decrypt the respective specific encrypted content (120), and is also utilized in the respective recipient device as a critical element in decrypting the production key necessary to provide the encrypted production key (162) coupled to the specific consumer's recipient device (204) that provided the respective Appliance ID. The encrypted production key (182) can only be used by the specific respective recipient device (204) provided the respective Appliance ID (or passworded Appliance Key) is utilized to encrypt the respective production key.

The recipient device generates the respective Appliance ID (or Appliance Key) (65), which is needed to generate a respective password protected Appliance Key (66), which is coupled to a decryption key input of the key decryption logic (260), which responsive thereto, utilizes the Appliance Key to decrypt the encrypted production key to generate a respective decrypted production key (240) as a decryption key input to content decryption logic (260), which responsive to the decrypted production key, decrypts a (copy) of the encrypted content (102) which provides an output of decrypted content (71).

As illustrated in FIG. 16A, the recipient device appliance at the consumer remote location provides appliance data (170) uniquely generated from within the appliance itself (such as via software running on the recipient device appliance). Examples of types of factors that can be utilized as appliance data include network address card address, MAC address, processor ID, etc. The output from the appliance data generation logic (170) is coupled to appliance hash logic (172) which generates an internally created Appliance ID (156) which is provided (either through a jumble, without jumbling/unjumbling, unjumble logic (174) in the production system (104), or through direct connection), as an Appliance ID output (156) coupled to the product key encryption subsystem (103). Additionally, the internally generated Appliance ID (156) is coupled (within the recipient device) as a Data Input to the Appliance Key hash logic (153)—corresponding to the Appliance Key hash copy logic (153), and responsive to the first password (75) that is provided as an input to the appliance hash key hash logic (153), which provides an output of a generated appliance key (185), corresponding to the appliance key copy (155). The appliance key (185) is provided as a decryption key input to Decryption Logic (260), inversely corresponding to the encryption logic engine (160). The encrypted production key (162) is provided as an input to the Decryption Key input of Decryption Logic (160) of the Production Key Decryption Subsystem (203), either directly jumble logic (176) of the Production Subsystem (104) and unjumble logic (177) of the consumer recipient device subsystem (204). The encrypted production key (182) is coupled to the decryption production key logic (203) as a Data Input to the Production Key Decryption Logic (260) which responsive to the generated Appliance ID (156) provides as an output the production key (copy) (240) corresponding to the production key (140). The production key copy (240) is output from the Production Key Decryption Logic (260) and is coupled to the Decryption Key input of the Data Content Decryption Logic (210) [corresponding to the inverse of the Data Content Encryption Logic (110). The encrypted content (copy) (120) [corresponding directly to the encrypted content (120)] is coupled as an input to the Data Input of the Content Decryption Logic (260) of the Content Decryption Subsystem (202). The Data Content Decryption Logic (210) performs a decryption of the Encrypted Content (copy) (210), [the Decryption Logic inversely corresponding to the encryption of Data Content Encryption Logic (110) of the production subsystem (104)], responsive to the production key input (240), to provide an output of unencrypted content (200). In a preferred embodiment, the unencrypted content (200) is stored in the recipient device on a temporary basis only, preferably in transient memory (e.g., volatile RAM), and pursuant to defined criteria, so as to further maintain maximum protection of the respective protected original content. The temporary nature of the decrypted content (200) is regulated by providing for maintaining the decrypted content in the unencrypted state, defined according to criteria such as only during permitted uses and/or only for a defined time period, and/or only during defined operations, etc.

Figure 16B:
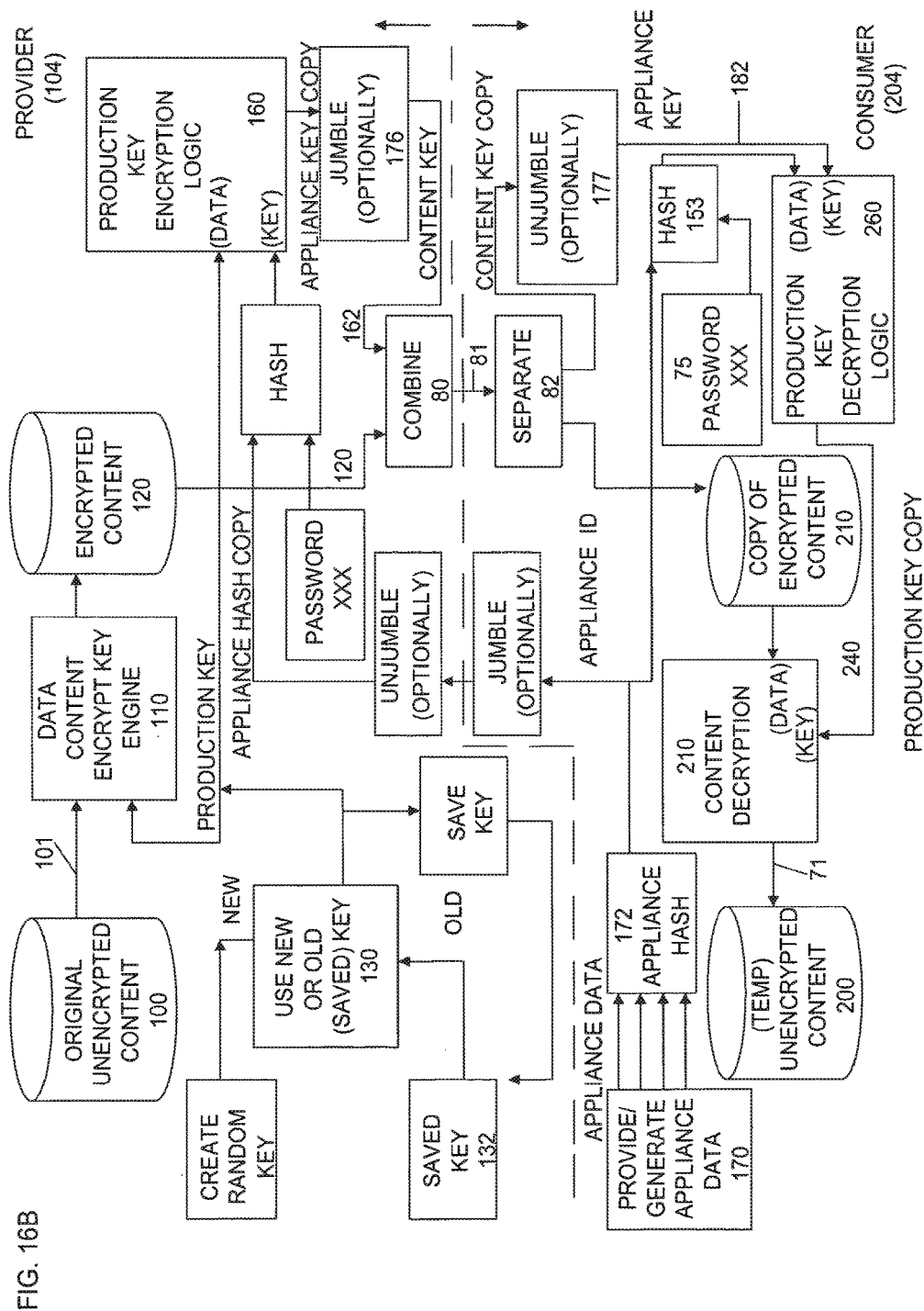
FIG. 16B is a detailed overall system block diagram and state and data flow diagram providing for a complete system illustration of the system as illustrated in FIGS. 2, 9, 10, 11 and 12.

Referring to FIG. 16B, an alternate embodiment of FIG. 16/*a* is illustrated, identical to FIG. 16, except for the addition that the selected encrypted content (120) is combined [via the Combining Logic 980) of the Production Subsystem (104)] with the encrypted production key (162) so as to provide a combined single output to provide to the consumer a respective specific recipient device (204) as a combined single file (81). On the consumer (recipient device) appliance side, the combined single file (81) is separated by Separation Logic (82) [of the respective specific recipient device (204] back into separate outputs of a respective encrypted content (copy) and a respective encrypted production key (copy) (240), which are then processed in the recipient device (204) [of the consumer], as discussed above with reference to FIG. 16A. The Content Decryption Logic (260) decrypts the encrypted production key (182) and then uses the decrypted production key (182) as a Decryption Input to Content Decryption Logic (210) to decrypt the respective encrypted content (copy) (210) so as to provide an output of respective corresponding unencrypted content (200). As illustrated in FIG. 16B, separate communications are not required, and only a single combined communication of one file is needed from the Production Subsystem (104) to the end user at the (consumer) recipient device (204).

In accordance with an additional embodiment, it is often the case that the Appliance ID of the customer is not initially known at the time of encrypting the selected original content, and another initial method of identifying a legitimate purchaser of the product must be provided. In one embodiment, with each product (of encrypted content), a serial number and password are provided. The consumer must supply a valid serial number, password, email and Appliance ID to obtain their authorization, referred to as a Document Key (also referred to as Appliance Key Appliance Authorization). This authorization is preferably sent by email, but can be handled via phone or fax or otherwise, preferably in a validated manner. The serial number and password can be combined, but separating them allows the serial number to be placed on the outside of a product package for tracking purposes, and permits the use of preprinted security labels (such as holograms) for the serial number.

In accordance with one embodiment, the encrypted content provides an encrypted secure format (ESF) file. The ESF file is created once and is not changed. For database management and control, a Document ID is created at the time of creation, which uniquely identifies this document. This allows the document to be referred to by the host (provider subsystem (104)) as well as provided between multiple ones of the consumer recipient devices (appliances) to identify a file uniquely, even if the user-friendly title (e.g., the name of a file) is changed. Because the file is only encrypted once and remains the same, the conversion (time-consuming part) is done only once and the files can be easily distributed on CD-ROM. However, for security, only by having an appropriate specific Document Key associated with a respective specific appliance [e.g., such as only that specific appliance can generate the respective Appliance ID used to create the encrypted Document ID, and only that respective specific appliance (or appliances) will be able to open or use the distributed files on the respective specific appliance(s)].

ESF production does not require knowledge about Encrypted Security Key (ESK), appliance authorization or Appliance IDs. ESF production requires the ESF file (ESF) and the Production Encryption Key, also referred to as a Production Key, or Encrypted Security Key (ESK) or an ESZ file (ESZ). If the Production System (104) is encrypting "singles", that is stand-alone selected original content files, then a new production key can be specified each time.

Regarding encryption for singles there are multiple choices. For example, a custom encryption can be used that requires the user of the recipient device to have an Encrypted Security Key, and uses a generic encryption that allows any appliance running respective application software to open it (no production key is generated). Thus, without a production key, there are no appliance specific restrictions on control usage. However, both types of encryption (with and without Production Key) can provide for restricted control of usage rights, and can for example, regulate and have the print and export options selected, and can further provide that only respective application software (referred to as ESF programs) can read or otherwise use the protected documents. One reason to consider using the generic encryption, at least for some titles (especially public domain based), is that the cost of production (and to the consumer) is less, because there is no need for a Production Key. Obtaining the Production Key (and to a lesser extent the document key) requires more transactions on the purchase, so adds to the cost. Thus, generic encryption lowers the cost of goods sold. However, with generic encryption, the control of which specific recipient device appliance the protected content can run on is lost. However, many products find this acceptable (such as iTunes that live with this). The choice is again one of design tradeoffs.

In a preferred embodiment, for production, at the production subsystem (104), the production key can be specified as "fixed" to a predefined value (or values) when converting the generic option.

Usage rights control usage of respective associated protected content. There are many usage options. Each option can disable or enable (on applications that have this capability) the ability to Use a protected document (and how many times), such as printing, saving, exporting, etc.

The export option limits the types of export allowed. With one export option, a document can be exported, providing all its components use the same production key. For example, this allows someone to save his or her annotations with a respective protected document, but still requires the same document key (or Appliance ID or Appliance Key) to open it. If export is allowed, the document and the annotations can be exported. In an alternate embodiment, the document and annotations can be exported, but are first assigned another production key used to encrypt them. This technique can also be used to combine two or more documents into one.

Document attributes for and associated with selected original content can be set as desired. The title is usually included. More attributes can be specified and they are completely a design choice, and can be arbitrary. Common attributes for sheet music include composer, part, instrument, copyright notice, etc. One can specify as many attributes as wanted. In one embodiment, a fixed predefined number is provided for, such that, for example, any 5 attributes can be specified. And these attributes can be different on each document, although it will in general be desirable to standardize. Alternatively, any number of attributes can be specified.

Bookmarks can be selectively set during the encryption conversion process. For example, an ActiveX component can support this using description/page numbers information in a database. For further examples of Bookmarking, reference is made to U.S. Pat. Nos. 7,074,999 and 7,098,392 (assigned to the same Assignee as the present application), and is incorporated herein by reference.

Basic Production Workflow begins by specifying where on the system the original control file (text, PDF, or other image file program code file, etc.) to be converted is located. The file name of the output (ESF) file and a temporary directory for intermediate files (can be the same as the output ESF directory) must also be specified. There are a number of settings that control the conversion process. These include, for example, selecting production key, single/group, generic/custom, usage rights, etc.

An important setting is usage rights and the production key when set to control the use of the ESF file on particular appliances. The control logic will generate a random new key. The generated production key is also available AFTER the conversion process. If converting several files provided in a collection that is sold as a package, then one can use that same production key for the remaining files in the collection after the key is generated for the first one processed.

Thus, in summary, the basic operations of production side [of the Production Subsystem (102)] for providing encrypted content are:

Select the original content to be protected.
Save the file (original content) on the system or identify where it is stored.
Set the conversion parameters including the production key (or request a new one to be created).
Start the conversion.
Retrieve the production key if you requested a new one.
Move the ESF file (encrypted) to where ever you want to save it.
Move the ESZ file (production key) to wherever you want to save it.
Remove the original file if it isn't in a permanent location.
The conversion generator then cleans up after itself.

ESZ (Production Key) files are only created when the system is using a custom production key. This file is for internal purposes only, should be kept confidential and should not be sent to the customer. Customers only receive encrypted production keys or encrypted document keys (that are in part comprised of a production key).

In summary, the overall Production Workflow operations are:

Obtain the production key file (ESZ) from ESF Workflow,
Run the Encryption program (e.g., eSEncrypt program) on the original content (e.g., text, image, PDF files) to be encrypted (creates encrypted ESE files).
Move the ESE files to wherever you want to save them.
Next, Consumer Key Generation is provided.
The consumer identifies himself (serial number, password, registered email, etc.). This step is optional, but desirable for accounting and other purposes,
The consumer's appliance provides the Appliance ID associated with the consumer (or, if already previously and on the host system, requested, is retrieved from the ESF database). The Appliance ID is generated by application software running (executing) on the specific recipient device appliance from internal appliance data therein.
The Appliance ID and Production Key for the respective selected document are used to create a Document Key (Decryption Key) which is stored in a file. For example, the Appliance ID can be used to encrypt the respective production key (with or without use of a password), to provide the document key.
The Document Key file is sent to the consumer via the (registered) email, or otherwise.
The consumer saves the Document Key file in the appropriate directory where it can be used to validate the document for that appliance. Alternatively, the document key information is manually entered into the application by the consumer. Thereafter, the consumer's specific appliance utilizes the document key to decrypt the encrypted Production Key so as to permit decryption and access and use of the respective encrypted content.

Figure 17:
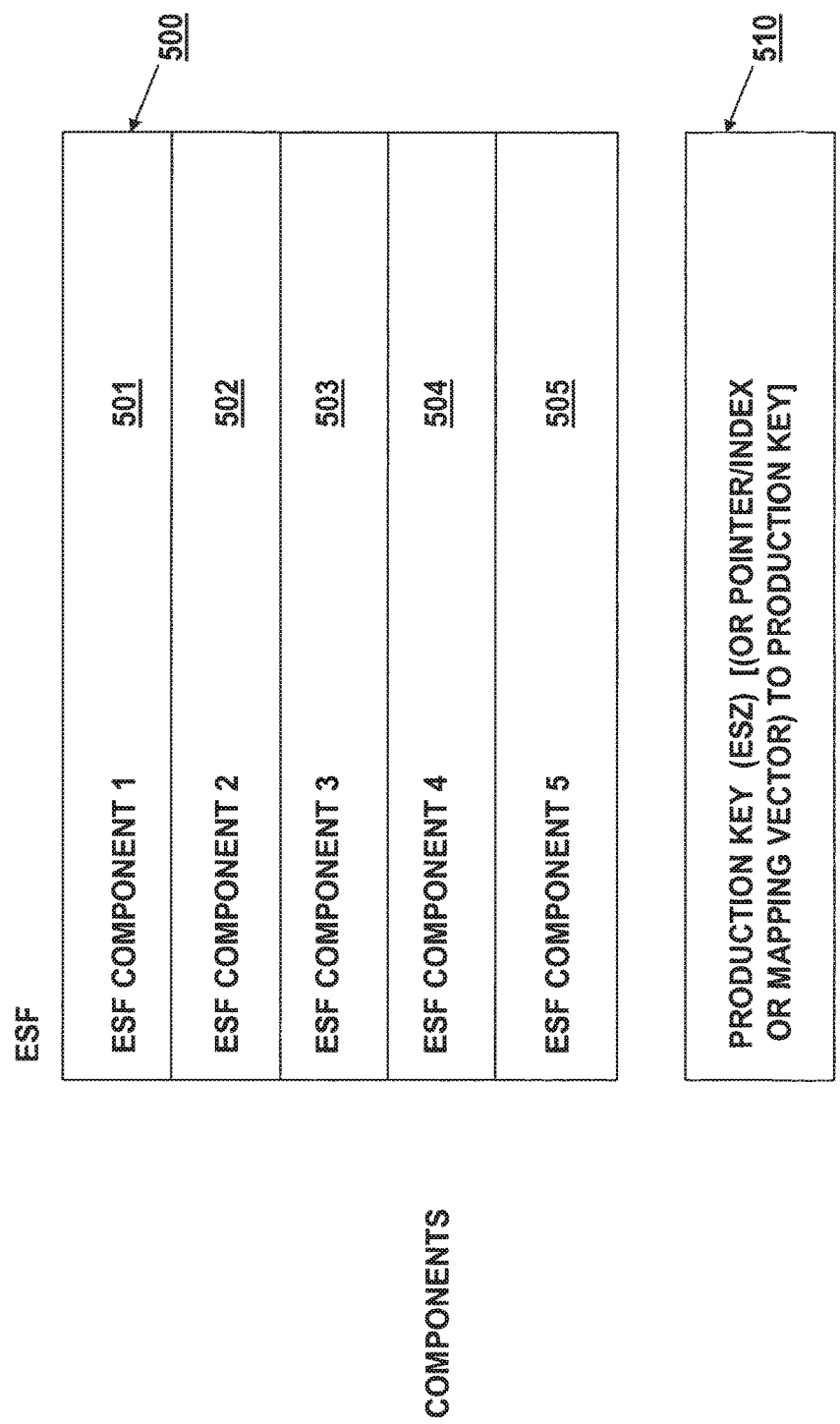
FIG. 17 illustrates the data storage structure and components therein, for the encrypted secure format (ESF) and associated encrypted production key (ESZ) as illustrated and discussed herein.

FIG. 17 illustrates the data storage structure and components therein, for the encrypted secure format (ESF) for protected content and associated encrypted production key (ESZ) as illustrated and discussed elsewhere herein.

FIG. 17 illustrates the data structure and component layering for the ESF protected content data file format (500) and the associated production file structure encryption key (ESZ) (510). The ESF file format (500) is comprised of multiple components (501, 502, 503, 504, 505). The components as illustrated can be interchangeably comprised of multiple individual and mutually exclusive file components, each being separately selectively encrypted and/or compressed independent of the others, and all components together as an ESF file (500) being encrypted with the same respective production key (ESZ) (510). Preferably, as illustrated in FIG. 17, one of the component layers (505 as illustrated), includes an ESF ID (or Document ID), and can also include other data such as a production key ID, other unique ID, time of day, date, user ID, etc. Additionally, one of the component layers preferably includes mapping data information relating to the contents of the ESF data file structure (500), and identifying the individual components within that specific file 500.

The ESF data file structure (500) is comprised of multiple components. On such component is an ENC component representing the encrypted protected content (such as any one or more of an image or other text, application program code, etc.), which can be any content component, such as element (501) of the data word structure (500). The ESF data file structure can also include a component of data file structure for annotations or other overlay information that can be provided as associated with the encrypted content.

In a preferred embodiment, a part of each component is a descriptor of the component for that respective component (i.e., what that component is, whether the component is encrypted or not, whether the respective component is compressed or not, and any other unique IDs or descriptors).

Associated with each ESF file (500) is a respective specific related production encryption key (ESZ), which contains the encrypted production key utilized to encrypt the ESF file (500) components (at least those that are to be encrypted). The production encryption key (510) further optionally contains additional data such as an ESF ID, an ESZ ID, and associated mapping or index data for associating the production key to one or more specific ESF files (500).

This additional data, and/or associated mapping feature can be especially useful where an entire grouping of file components is placed on a single storage medium such as a CD-ROM for mass distribution. Thereafter, the specific associated production encryption key that was utilized for encrypting of content for one or more specific CD-ROMs can be easily located, associated with and ultimately communicated to and utilized by the recipient device user having that CD-ROM. One encrypted (ESF) file (500) can contain multiple components (sub-files) which each have a unique name within this ESF file, wherein each component can be selectively encrypted and/or compressed on an individual basis, mutually exclusive of the other components of the respective ESF file. In a preferred embodiment, one component is selected original content to be protected, and, where present, another component defines usage rights (such as with tickets). These are both examples of types of components that should always be encrypted. Other components can be encrypted or not, depending on intended permitted uses to be allowed at a recipient device (or devices). Generally, if a component is associated with a usage rights ticket or is otherwise to have its usage restricted, then that component must be encrypted. Usage rights tickets can be associated with any type of encrypted content (component), to provide for usage regulation of the respective decrypted content (or any usable feature or function thereof) on respective recipient devices (appliances). In a preferred embodiment, only the trusted provider's production system can create and assign usage rights (tickets). In an alternate embodiment, the user's recipient device is further comprised of a local means for ticket generation and encryption logic to permit encryption of locally stored content. Restricted usage rights are added to at the recipient device to otherwise permitted usages for the respective locally stored content. In another alternate embodiment, the recipient device can add usage restriction to content but only as to permitted usages not already restricted by a usage rights ticket.

In general, when a modification is made to a usage rights (ticket) restriction on usage and is after-added to protected content, that content must already be encrypted with usage restrictions that are more restricted than the to be granted ticket will permit. Thereafter, the production system (trusted provider) (or authorized recipient device, in one embodiment) can provide a ticket that can be used after the fact, [that is, after the encrypted content is already out of control of the trusted provider's production system (e.g., on a recipient device)] to grant additional rights which were originally restricted as part of the respective content original encryption.

In an alternative embodiment, one of the components of the ESF file structure (500) of FIG. 17 is the respective encrypted production key which is itself the data content that is the file content for that component.

Figure 18:
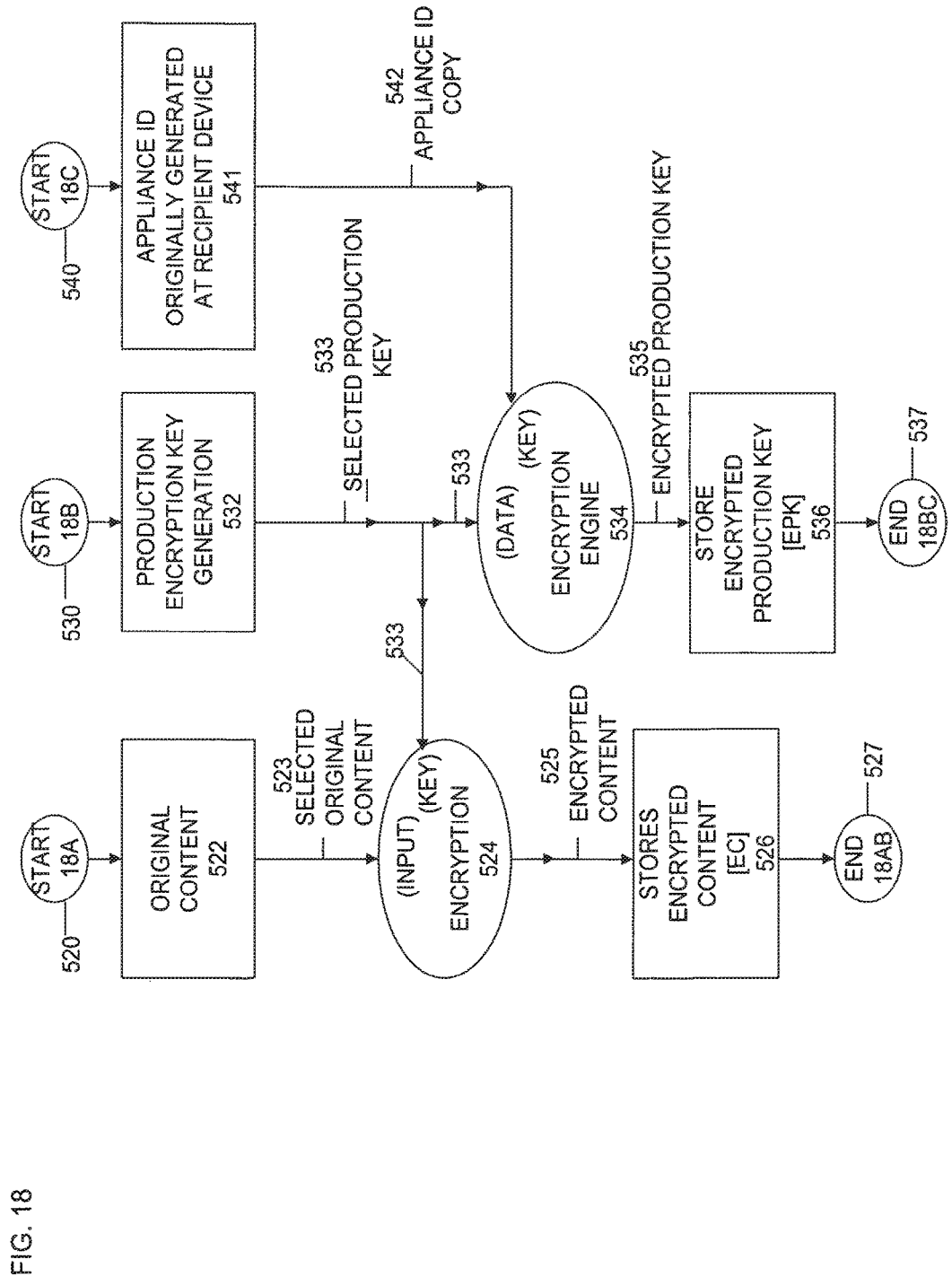
FIG. 18 illustrates a flow chart and state flow diagram for production system encryption of selected content for a specific recipient device.

FIG. 18 illustrates a flow chart and state flow diagram for production system encryption of selected content for a specific recipient device.

As illustrated in FIG. 18, to start (520), specific original content (522) is selected as selected original content (523), from the original content. The selected original content (523) is coupled as a data input to encryption logic (524) (providing an encryption engine) encrypted responsive to a selected generated encrypted production key (533) output from the production encryption key generator subsystem (532). Responsive to a request (from the production subsystem) to have selected original content encrypted (530), the production encryption key generation logic (532) begins (530), to provide a selected production key (533) coupled as a Key Input for encryption logic (524) which responsive thereto provides an output of encrypted content [EC] (525). Furthermore, the production key (533) is coupled as data. Input to encryption logic (534) which provides for encryption of the respective production key (533) responsive to an Appliance ID (542) [coupled from a previously stored Appliance ID as originally received from a recipient device user (or otherwise from storage), or coupled from and related to the respective Appliance ID originally generated at the recipient device (541). The encryption logic (534) provides an output of an encrypted production key [EPK] (535), which is specifically encrypted for decryption by only the respective appliance that originally generated the appliance ID (542). The encrypted content (525) is stored (526) for or within the production system (104), and the production processing of the encrypted content is complete (527). Further, the encrypted production key is stored for or within the production system 104 (536) and the encryption of the production key [EPK] (537) is complete. Thereafter, the encrypted content [EC] and respective encrypted production are provided to a recipient device. To use the encrypted content [EC], the respective recipient device 204 must then locally internally generate the corresponding Appliance ID, and utilizing associated application software running on the recipient device, decrypts the respective encrypted production key [EPK] responsive to the Appliance ID as locally generated within that respective recipient device. The recipient device 204 then utilizes the decrypted encrypted production key to decrypt the encrypted content. The protected encrypted content is thus made appliance specific, without requiring the recipient device to be connected to a server for authentication.

Figure 19:
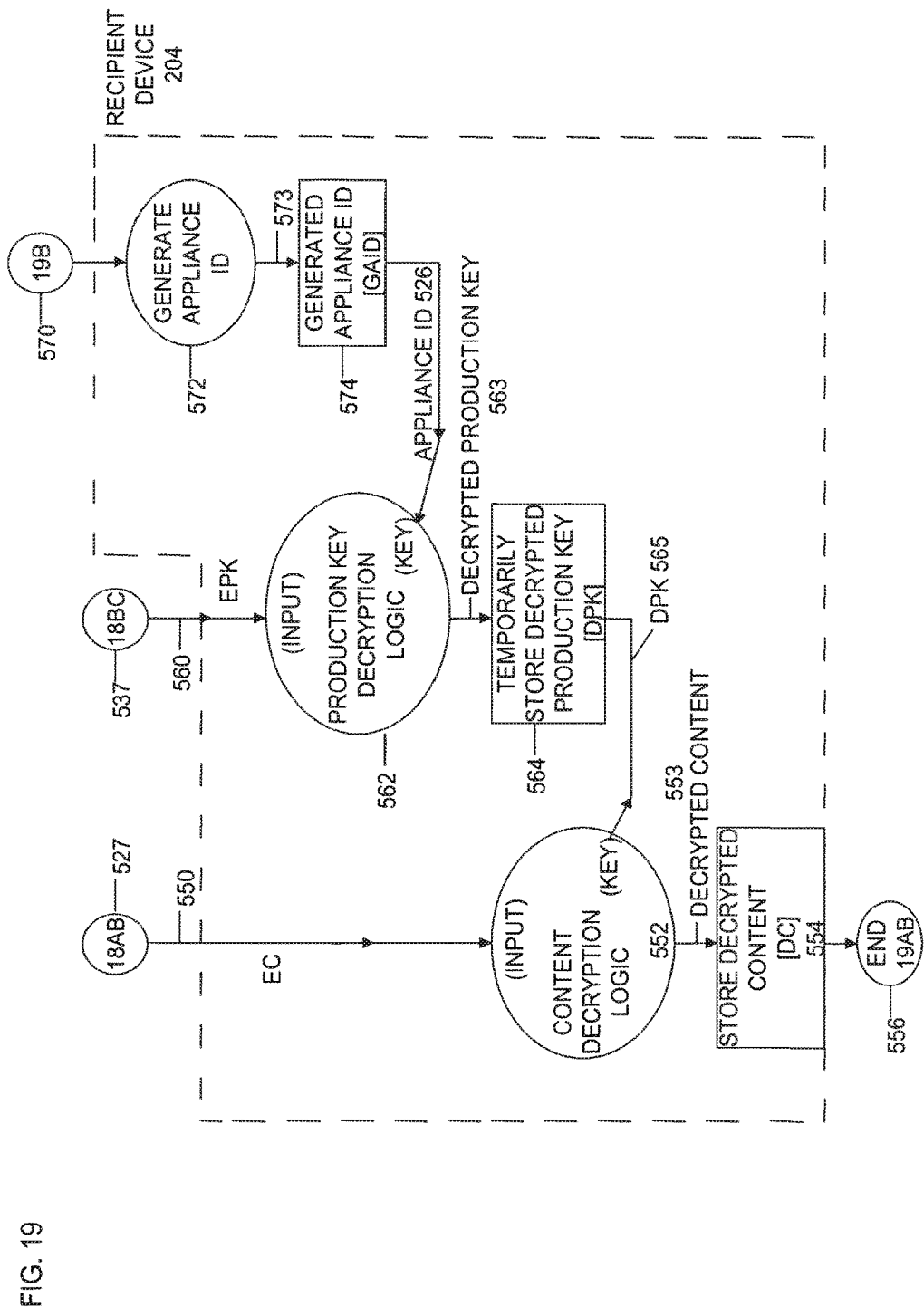
FIG. 19 illustrates a flow chart and state flow diagram illustrating the decryption of the encrypted content and utilizing the encrypted production provided by the production subsystem (as illustrated in FIG. 18) to provide for a decrypted output, and further illustrates an aspect of the invention providing a flow chart and state flow for only temporarily storing decrypted content in a recipient device during actual usage and authorized utilization thereof.

FIG. 19 shows a flow chart and state flow and partial block diagram illustrating the decryption of the encrypted production key utilized to decrypt the encrypted content in the recipient device to provide a decrypted content output.

As illustrated in FIG. 19, the encrypted content [EC] (550) is input to the recipient device (527) to provide the encrypted content input [EC] (550) as a data input to decryption logic (engine) (552) in the recipient device 204. Additionally, the encrypted production key [EPK.] (56) output (537) is provided to the recipient device 204, and as a data input to production key decryption logic (engine) as an input (537) encrypted production content (562) within the recipient device 204. Additionally, (at 570), the recipient device 204 generates (or otherwise provides) appliance data and utilizes the appliance data to uniquely identify the specific particular recipient device 204 via logic (572). That provides for generation of an Appliance ID (573) responsive to the unique identification (574) for the specific recipient device 204, so as to provide an output of a generated appliance ID (573) which is coupled to and stored in a memory (575) of the recipient device 204. The Appliance ID generated by the logic (572) for generating the Appliance ID output (526) is coupled as a Decryption Key Input to decryption logic (engine) (562). The encrypted production key (563) is provided as a decryption key input to production key input to the decryption logic (engine) (562). Responsive to the Appliance ID (526) as a decryption key, the decryption engine (562) decrypts the encrypted production key (560) to provide an output of a decrypted production key (563), which is temporarily stored (564) in the memory of the recipient device 204. The decrypted production key (565) is provided as an output, which is coupled as a Decryption Key input to decryption logic (engine) (552). The encrypted content (550) is coupled as a Data input to the content decryption logic (engine) (552). The protected content decryption engine (552) provides for decryption of the encrypted content [EC] (550) responsive to the decryption key of the decrypted production key [DPK] (565). The decryption content logic (552) provides an output of decrypted content [DC] (553) which is stored as stored decrypted content (554) in the memory of the recipient device 204.

In a preferred embodiment, all the decrypted content [DC] (554), the associated decrypted production key [DPK] 564, and the associated generated Appliance ID, and appliance data utilized therein, are only stored temporarily within the recipient device memory, and only in the transient read-write memory, and preferably not written to a hard drive or non-volatile memory in an unencrypted form. This is to maintain optimal security for the decrypted content that has been decrypted from the encrypted content for the specific appliance's use only of the specific particular recipient device 204 (the one that generated the respective Appliance ID 526). At this point (556), the recipient device 204 utilizing application software, provides for selectively regulated controlled use of the decrypted content [DC] by the recipient device [204] strictly, in accordance with the permitted usage rights allowed in accordance with the usage rights as defined by authorized associated application software of the specific recipient device 204 (and on the associated rights for the respective decrypted content [DK], regulating permitted usage for the encrypted content.

In one embodiment, there is a default set of permitted usage rights which are automatically utilized by the authorized application software, in the absence of any separate associated usage rights ticket. Those default usage rights can be set according to the wishes of the provider 104, (ranging from very restricted, such as view only, or limited to a certain defined number of viewings, or printings). Alternatively, the default set of usage rights can be fully enabled, unrestricted, wide open with all usages permitted, or anywhere in between. Again, it is a matter of design choice. In a preferred embodiment, regulation of usages of protected content are provided at multiple levels and is flexible and able to support distribution of and usage of various different types of content are always more restricted. For maximum protection default usage rights on highly protected content are restricted in accordance with an associated ticket (associated with the decrypted content [DC]). In a regulated selected respective embodiment, default usage rights are superceded and, as discussed elsewhere herein.

Figure 20:
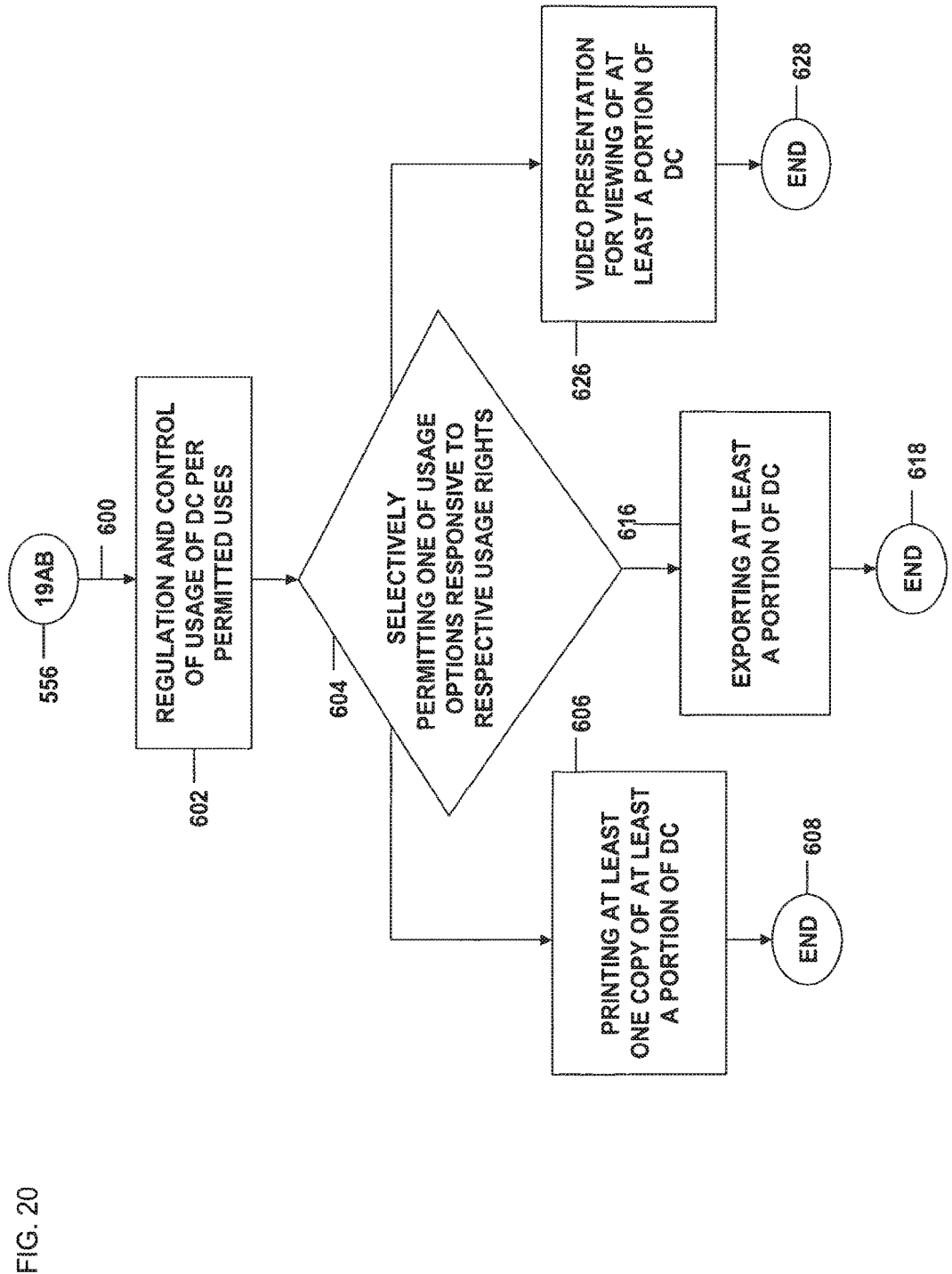
FIG. 20 is a flow chart and state flow diagram illustrating the selection of authorized utilization, for selectively providing for one of printing, exporting, or viewing, or executing as an application program, of at least a portion of the decrypted content, either in accordance with predetermined default usage rights, or hi accordance with a permission usage rights ticket as discussed herein.

FIG. 20 is a flow chart and state flow and block diagram illustrating the responses within the specific authorized recipient device 204, to a request for usage of protected content, and the termination of what rights are authorized, and the selective authorized utilization of respective decrypted content [DC], for selectively providing for one (or more) regulated uses of printing (606), exporting (616), or viewing (626), or otherwise usage of at least a portion of the decrypted content [DC], in accordance with selectively regulated usage rights (604), or in accordance with a permission usage rights ticket associated with respective specific decrypted content [DC], or in accordance with embedded usage rights in the encrypted content, or in accordance with predefined default usage rights defined by the associated application software on the recipient device (as per selected design standards and where applicable, user selection of preferences). Again, the selections are available, and are a design choice.

Referring to FIG. 20, the output of the decrypted content [DC] (600) (as shown in FIG. 19) are provided as an input (5566) to the recipient device 204 and is coupled to control logic (602), providing for control of use of the respective decrypted content [DC]. Responsive to the usage rights permissions for the respective decrypted content [DC] (600), the control logic (602) selectively provides regulated usage for one of a plurality of options (604), responsive to the associated usage rights for the respective decrypted content [DC] (600). As illustrated in FIG. 20, each of a plurality of options can be selectively regulated for a defined number of uses (e.g., zero, one to unlimited usage), for any one or more of a plurality of options, such as printing of at least one copy of at least a portion of the decrypted content (606), exporting of at least a portion of the decrypted content (616), and/or providing for a video presentation of at least a portion of the decrypted content on a local video display (626) of the recipient device 204. The associated usage rights can be set up for a restricted number of allowed usages, (such as for printing or exporting or running of an application, or number of times of viewing of an application), or for a limited defined time, or limited permission, or enablement of feature set or version of a product (e.g., Lite, Medium, Deluxe, Professional) or otherwise. These usage rights can be provided for by storage of additional information such as an associated encrypted ticket or as embedded usage rights within encrypted content, or otherwise, etc.). As discussed herein, these usage rights are related to permitted usage rights (such as a permitted number of copies allowed, or to be printed or viewed, or applications to be run and executed, [See also discussion with respect to FIG. 23 and FIG. 26 (and elsewhere herein).]

Figure 21:
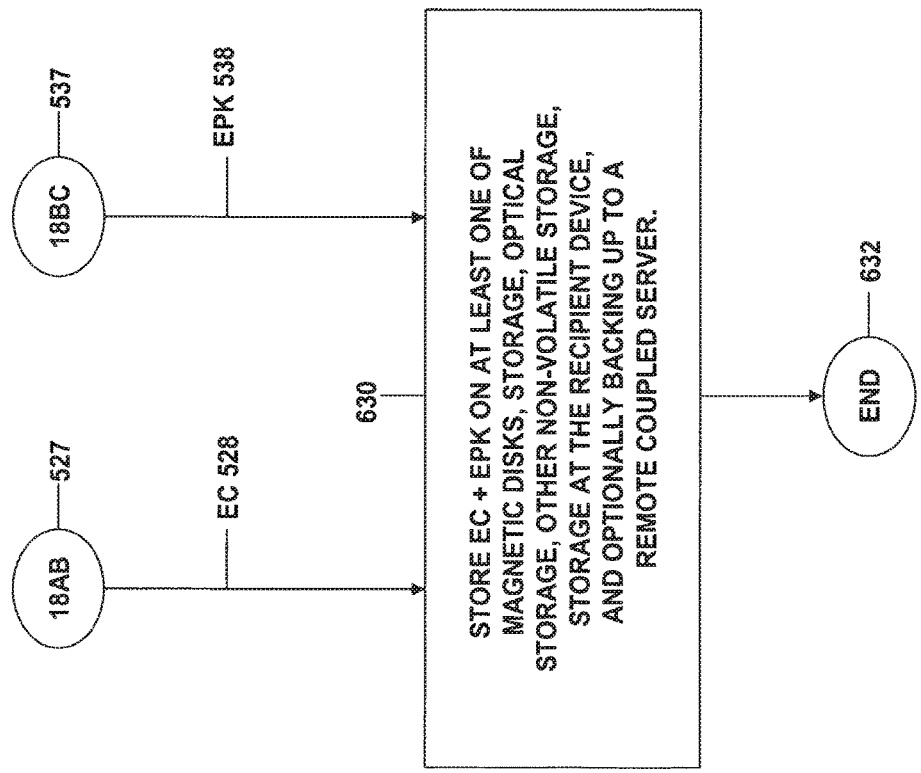
FIG. 21 illustrates the reception and storing of the encrypted content and encrypted production output from the production system of FIG. 18 for storage at the recipient device and optionally, at a remotely coupled server.

Referring to FIG. 21, encrypted content [EC] is output (527) (such as from FIG. 18), providing an input of encrypted content (528) provided to the recipient device 204 which provides for selectively storing (630) the encrypted content [EC] (528) within the recipient device 204. An encrypted production key [EPK] is coupled (537) as an input to the recipient device 204, and is also stored (630) within the recipient device 204. The encrypted content [EC] (528) and associated encrypted production key [EPK] (538) are stored (630) in the recipient device (204) on non-volatile storage within the recipient device 204 (such as on magnetic hard disk, optical storage such as CD-ROM and DVD, FLASHRAM, EPROM, or other non-volatile storage), internal to or coupled to the recipient device 204. Alternatively, the coupling provided from the production subsystem (537) (of FIG. 18), provides the necessary encrypted content and the associated encrypted production key, either separately or combined as appropriate, such as via one or more of CD-ROM, on-line download, or otherwise to a specific recipient device 204.

There are many alternatives for distribution to choose from. For example, the encrypted content could be provided on a CD-ROM, and the recipient device (user) receives the password via email. Alternatively, the encrypted content [EC] and associated encrypted production key [EPK] can be downloaded in one transaction on-line to the recipient device 204 (or other computer), and even encrypted to be appliance specific. In a preferred embodiment, the encrypted content [EC] and the encrypted production key [EPK] are additionally stored at a backup device as well (such as at a server of the trusted provider production system), to provide for accounting verification as well as for backup and to provide services such as lost file replacement services. The backup encrypted content and backup encrypted production key as relate to materials provided (via. CD-ROM or otherwise, such as via on-line download from a production subsystem or system) to the specific recipient device (204) can be backed up for a defined time (from forever, to only a defined limited time only, such as 30 or 60 days, to prevent from clogging the storage of the server).

Figure 22:
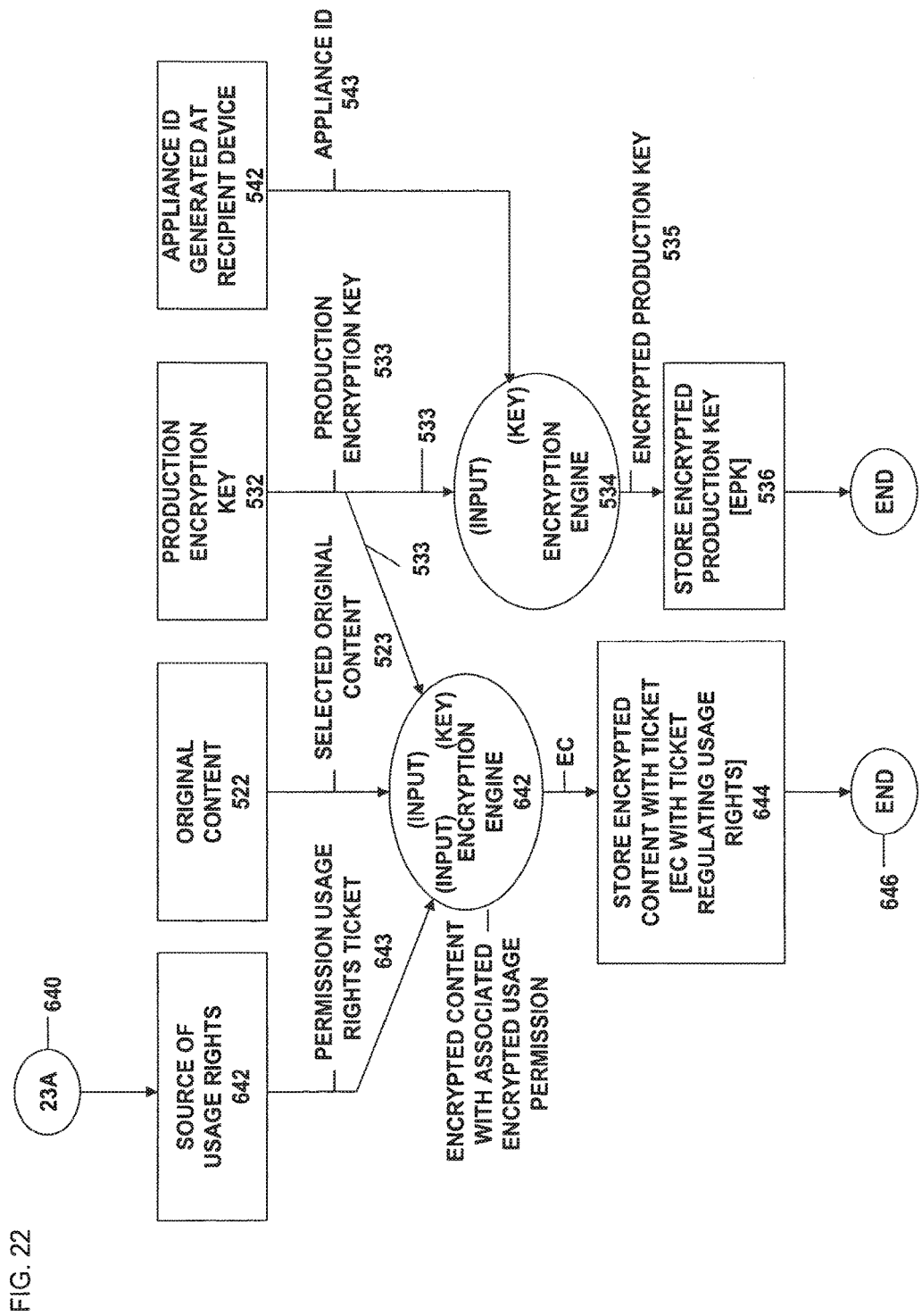
FIG. 22 is a flow chart and state flow diagram, illustrating the production system ticket generation subsystem, providing a source of usage rights, selected original content, and an associated production encryption key used to generate an output of encrypted content with an associated encrypted ticket, either embedded or separate, regulating usage rights for the respective encrypted content. The production system further provides for encryption of the production encryption key. In a preferred embodiment, this encryption is responsive to an Appliance ID generated at a specific recipient device, in order to provide an encrypted production key which can only be utilized only at the specific recipient device that is associated with (and can regenerate) the generated Appliance ID.

FIG. 22 is a flow chart and state flow diagram, illustrating the production system ticket generation subsystem (640), providing a source of usage rights (642), selected original content (523) from stored original content (522), and an associated production encryption key (533) provided by the production system (532), and coupled as an encryption key input to content encryption logic (engine) (642), which uses the production encryption key (533) to generate an output of encrypted content [EC] with an associated encrypted ticket [ET], either embedded or separate, for regulating usage rights. The production system further provides for encryption (534) of the production encryption key (533). In a preferred embodiment, this encryption is responsive to an Appliance ID (543) generated at a respective specific recipient device, in order to provide an encrypted production key [EPK] (535) which can only be utilized only at the specific recipient device that is associated with (and can regenerate) the generated appliance TD.

FIG. 22 illustrates the methodology and state flow and block diagram for the provision (such as to a recipient device) of encrypted content with an associated encrypted ticket defining usage rights permissions. The production system provides for an output of a permission usage rights ticket (643) defining permitted usage rights (642). A specific definition is provided of permitted usage rights for a ticket associated with specific encrypted content (643). The usage rights ticket is provided as an input to encryption logic (engine) (642). Application software provides control logic in the production system (104), and provides for selection from the source of usage rights (642) of permitted usage rights permissions associated with a respective specific file or files of selected original content to be protected, and is provided as respective selected content (523) output from original content storage (522) which contains original content from which selected content to be protected is selected and output responsive to the control logic. The selected original content (523) is provided as an additional input to be encrypted to the encryption logic (engine) (642). In an alternative embodiment, a second encryption engine (642B) (analogous to and operating in parallel with the encryption engine (642), separately provides for independent processing and separately outputting the permitted usage rights ticket (643).

The (generated or otherwise produced) production encryption key (533) (see, for example, FIG. 18) is provided or otherwise selected (532) to provide a production encryption key output (533), which is coupled as an encryption key input to the encryption logic (engine) (642). The encryption logic (engine) (642) provides for encryption of selected original content (523) along with the respective associated usage rights ticket (643), to provide an output of a file of an encrypted content with associated encrypted usage rights (643), which is thereafter stored in the production system (104) as encrypted content with an associated ticket for regulating usage rights (644).

Alternatively, a separate, but related processing is required next for securely delivering a production encryption key that was used for a specific associated encrypted content to a separate recipient device appliance. In a preferred embodiment, an encrypted production encryption key is delivered to a designated particular recipient device to enable that designated particular recipient device, and only that particular recipient device, to utilize the respective encrypted production encryption key to decrypt the encrypted content and associated encrypted usage rights ticket at the specific particular local recipient device. As illustrated in FIG. 22, ((540), analogous to FIG. 18) the production system 104 at the trusted provider, receives (or already has stored) (542) an Appliance ID (543) originally generated at a particular specific recipient device. This generated Appliance ID is uniquely associated with that specific particular recipient device, and can be used both initially and thereafter) to uniquely encrypt any respective production encryption key for selected content. The production system utilizes the specific Appliance ID (543) for appliance specific transactions relating to specific associated selected content, for encrypting specific production encryption key(s) associated with encryption of respective specific associated designated selected original content, to be provided for the respective associated specific particular recipient device. The production system 104 can encrypt the production encryption key, either at the time of encrypting the selected original content or at a later time subsequent to completion (646) of encrypting of the content and associated ticket. The production system 104 provides for generation (535) and storage (536) of the encrypted production key.

Figure 23:
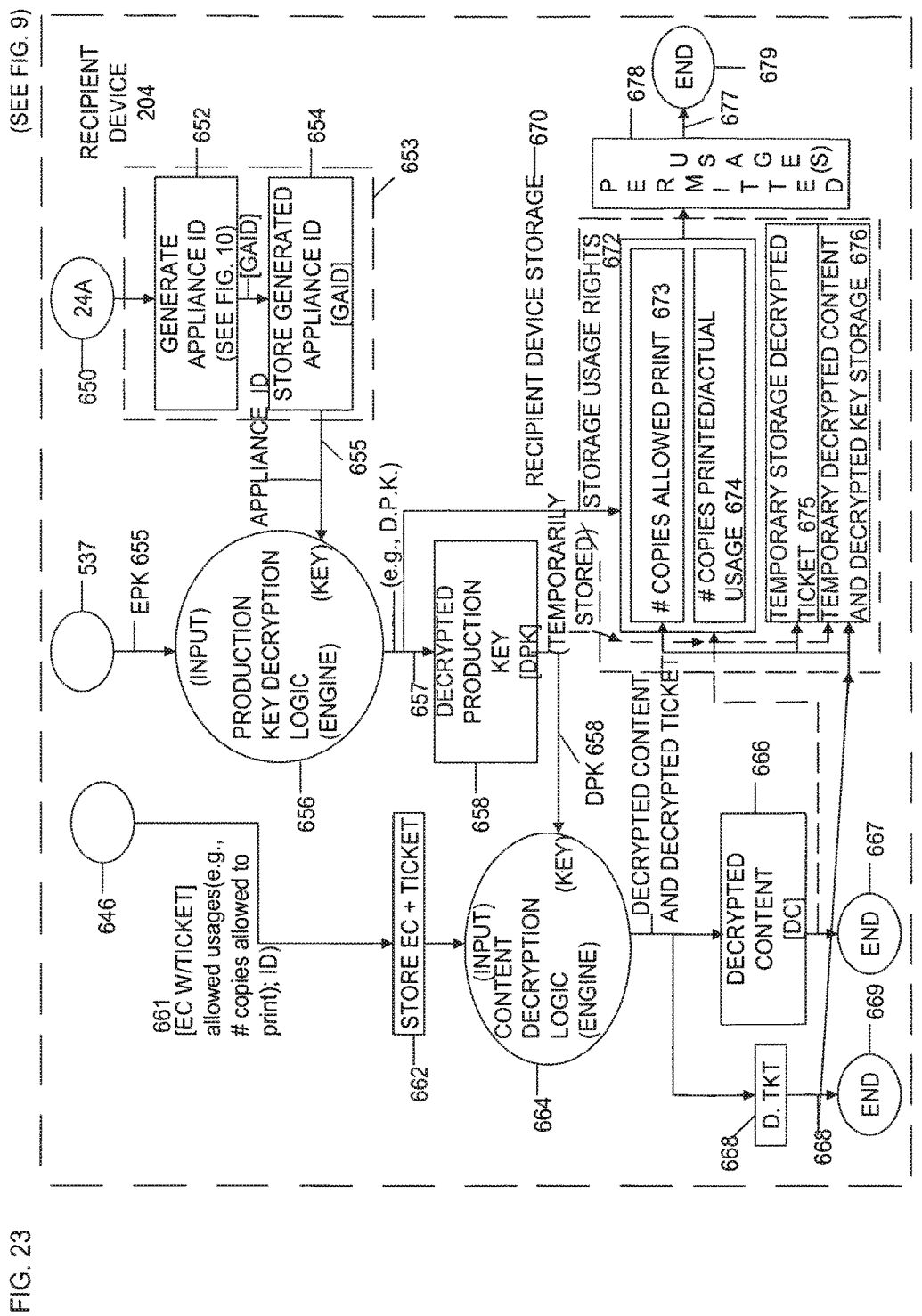
FIG. 23 is a detailed system block diagram combined with a flow chart and state flow diagram, illustrating the utilization at the recipient device 204 of encrypted content with an associated ticket and of an associated encrypted production key, to provide for generation of decrypted content and a decrypted ticket, utilizing a decrypted production key generated internally within the recipient device. The encrypted production encryption key is decrypted utilizing the associated Appliance ID also generated within the respective recipient device. The recipient device provides for recipient device storage of data usage rights within a local memory. Usage rights regulate the number of copies allowed to be used (e.g., printed) and track and store a number of copies already used (e.g., printed)=actual usage, etc., and provides for storage of usage rights data (within the recipient device storage) in an encrypted format. It provides for only temporary storage (of decrypted protected content and/or usage rights tickets) during utilization of the respective decrypted content and the respective decrypted key storage, providing an output controlling permitted usages of the respective content on the recipient device.

The Appliance ID generated at the recipient device (542) is provided as an appliance ID signal (543) coupled to the encryption logic (engine) (534) as an Encryption Key input. The Production Encryption Key (533) is coupled to the input of the encryption logic (engine) (534). Responsive to the Appliance ID as an Encryption Key, the encryption logic (engine) (534) encrypts the Production Encryption Key (533) and provides for an output of an Encrypted Production Key [EPK] (535). The Encrypted Production Key [EPK] (535) is stored (536) and the generation and storage of the specific particular appliance related encrypted production key is completed (537). Thereafter, the production system 104 provides the Encrypted Production Key [EPK] (535) to the user of the recipient device (e.g., via email, mail, phone call, or otherwise), or directly to the specific particular recipient device 204. Thereafter, as illustrated in FIG. 23, the specific particular recipient device 204 decrypts the Encrypted Production Key [EPK] (655) responsive to regeneration of the Appliance ID internally within the particular recipient device 204, which is then utilized as a decryption key input to production key decryption logic to decrypt the Encrypted Production Key [EPK] to provide a Decrypted Production Encryption Key [DPK]. The Decrypted Production Encryption Key [DPK] (658) is utilized by content decryption logic (engine) (664) to decrypt the encrypted content (662) and to decrypt the associated encrypted ticket to define usage rights. The recipient device thereafter utilizes the decrypted content specifically regulated in accordance with the usage rights.

FIG. 23 is a detailed system block diagram combined with a flow chart and state flow and block diagram, illustrating the utilization at the recipient device 204 of encrypted content [EC] (661) with an associated ticket [TICKET] and of an associated encrypted production key [EPK] (655), to provide decrypted content [DC] (666) and a decrypted ticket [DTKT] (668), utilizing a decrypted production key [DPK] (658) generated internally within the respective recipient device 204. The encrypted production encryption key [EPK] (655) is decrypted by the production key decryption logic (656) utilizing the associated Appliance ID (655) generated (652) and stored (654) and provided to be utilized within the respective recipient device 204. Additionally, usage rights are stored within a local memory of the respective recipient device. Usage rights can be defined by the authorized application software on the recipient device, as per default values, or to the extent present, which are superseded by usage rights regulated by the associated ticket for respective content. Usage rights regulate usage of associated content, such as the number of copies allowed to be used (e.g., printed) and provide for tracking and storing a number of copies already used (that is actual usage), and provides for storage of usage rights data (within the respective recipient device storage) in an encrypted format. However, the storage is regulated to provide for temporary storage [only during utilization] of decrypted content and decrypted key (676) [and decrypted ticket (675)], providing an output of permitted usages for the recipient device as to the respective content.

As illustrated in FIG. 23, the encrypted content [EC] with ticket [TICKET] (e.g., such as in FIG. 22) is provided as an input (646) to the recipient device 204, of the encrypted content [EC] with associated ticket [TICKET] (661), which is stored (662) in the recipient device 204. The encrypted content [EC] with ticket [TICKET] is provided as an input (either one input (where the encrypted content and associated encrypted ticket are combined as one) or as independent separate inputs) to content decryption logic (engine) (664). A specific respective encrypted production key is provided from the production system (see for example (537) of FIG. 18). This specific encrypted production key [EPK] is provided as an input (650) to the recipient device 204 which provides the encrypted production key signal (655) as an input to the production key decryption logic (656). The recipient device 204 provides an internally generated Appliance ID (655) which (1) is provided to the production system 104 to provide appliance specific encryption; and (2) is utilized within the recipient device 204, such as decrypting of a respective production encryption key (655) [associated with respective selected encrypted content] to decrypt the encrypted production key [EPK] (655). Appliance ID generation logic (653) (such as via authorized (licensed/validated) application software (653) (running on a computing system within the recipient device 204), provides for generation (652) of an Appliance ID (see, for example, FIG. 10 (652)). The generated Appliance IT) [GAID] is stored (654) within memory (preferably temporarily as described elsewhere herein) in the recipient device 204. The Appliance ID (655) is coupled as a Decryption Key input to production key decryption logic (656). The production key decryption logic (656) provides for decryption of the encrypted production key (655) [coupled as a Data Input to the production key decryption logic (656)], responsive to the Appliance ID (653) [at the decryption key input], to provide for generation of a decrypted production key [DPK] (657) which is temporarily stored (670) in local memory of the recipient device 204 and is also provided (658) as a Decryption Key Input of content decryption logic (engine) (664). The content decryption logic (664) provides for decrypting the encrypted content [EC] and the associated encrypted ticket [TICKET] (661), responsive to the decrypted production key output [DPK] (658) and (670) provided from the temporary storage (670). Responsive to the decrypted production key [DPK] (658), the content decryption logic (664) decrypts the encrypted content [EC] and provides for temporary storage of the decrypted content [DC] (666) and further provides for decrypting of the encrypted ticket to provide an associated decrypted ticket [DTKT], and storage (preferably, temporarily) of the associated decrypted ticket (668). [Both the decrypted ticket and associated decrypted content are preferably stored only temporarily, and only in transient memory (RAM), so as to maximize security of the system, and eliminate access to any decrypted secure components.] This provides an additional level of protection, implemented in order to provide for selective restricted control of usage and management of respective protected encrypted content, by the recipient device.

As illustrated in FIG. 23, the decrypted ticket (668) and decrypted content (666) provide for outputs coupling to a non-volatile area and volatile area of recipient device storage (670). Certain file parts are stored only encrypted, and if stored at all decrypted, are only temporarily stored and only in non-permanent (e.g., RAM) memory. As illustrated in FIG. 23, the temporary decrypted content, decrypted production key and decrypted ticket are temporarily stored in storage of (676) of the recipient device 204. Additional storage of usage rights (672) is also provided such as storing the number of copies allowed to be printed or number of uses allowed of execution or viewing, or other number of allowed uses (673), and additionally, storage actual number of usages or copies printed, viewed, saved, exported, etc. (674). Additionally, temporary storage is provided for the decrypted ticket and usage rights permissions, for defining logic to be utilized in granting permitted usages (678). Responsive to the temporary decrypted ticket (675), and the defined number of copies allowed to be printed [(673) and (674)], and responsive to the temporary decrypted content (676), the application software (running on the computing system of the recipient device 204) utilizes the stored usage rights (672) content [(673), (674), and optionally (675)] to (1) provide for control and regulation of permitted usages of respective associated temporary decrypted content (676) and (2) provides a permitted usage rights output (677) controlling permitted usages for regulating usage of the respective associated decrypted content (676), as well as (3) providing the decrypted content (676) as needed with the recipient device 204 so to permit to provide for the permitted usage. Responsive thereto, the application software of the recipient device 204 permits and provides for the pen lifted usages of the associated content on the respective recipient device 204.

Figure 24:
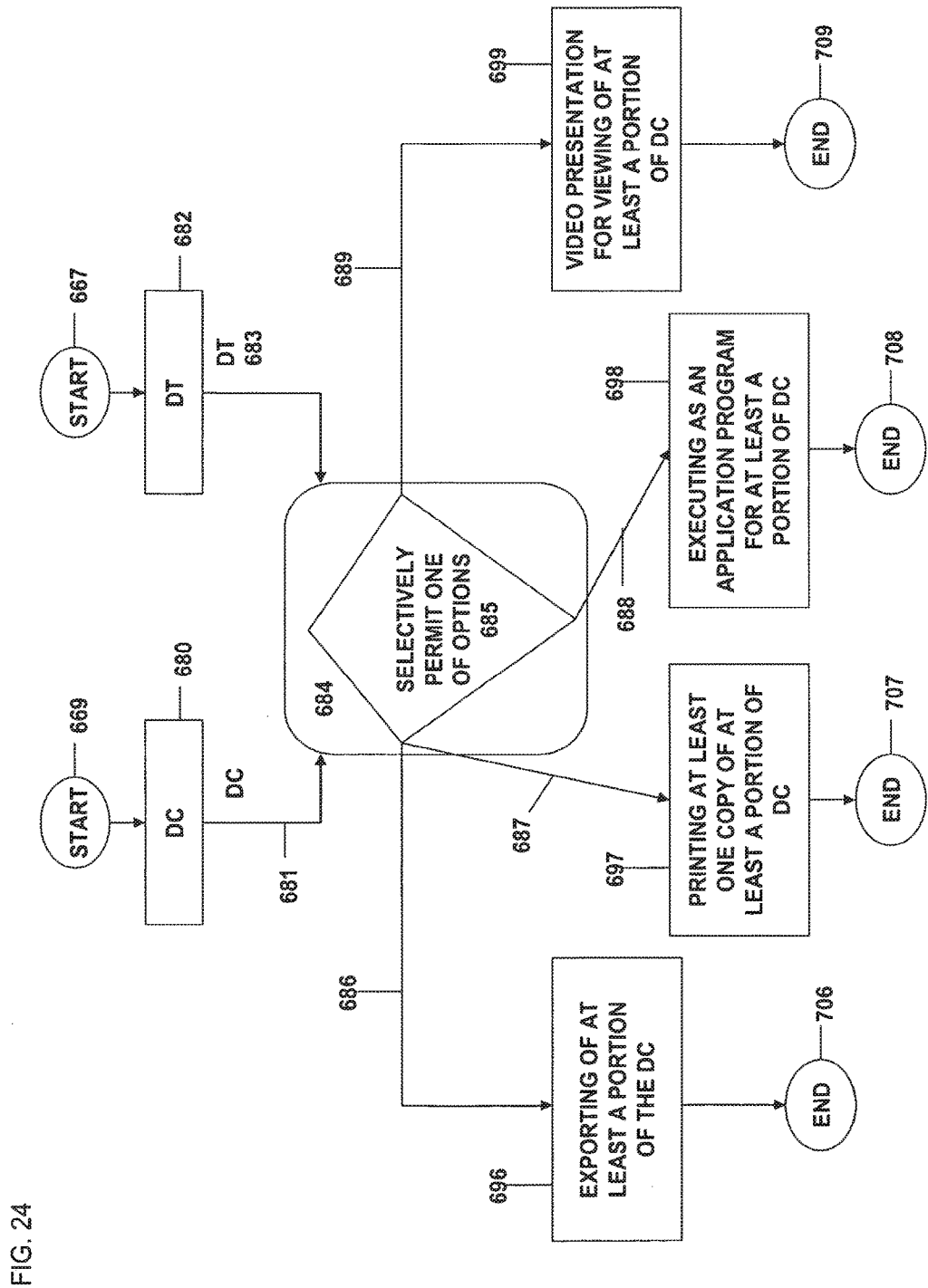
FIG. 24 is a flow chart and state flow diagram illustrating the control of selective usage within the recipient device of decrypted content responsive to a decrypted ticket as provided from within the recipient device, (see, for example, FIG. 23), to selectively provide for one of regulated usage of exporting, printing, executing of a file as an application program, or of viewing of a video presentation, for at least a portion of (or all of) the decrypted content and optionally for a defined number of usages, responsive to the usage rights permitted by the decrypted ticket, and also illustrates the process of storing control data with the encrypted ticket in the recipient device, for setting a defined number of usages permitted (e.g., to be printed or copied or exported or an application program executed)

FIG. 24 is a flow chart and state flow and block diagram illustrating the control for of decrypted content [DC] (680) within a respective recipient device, responsive to a decrypted ticket [DC] (682) as provided from within the respective recipient device 204 (see, for example, [DC] and [DTKT] of FIG. 23), to selectively provide for regulated usage of one of exporting (696), printing (697), executing of a file as an application program (698), or viewing of a video presentation (699), for at least a portion of (or all of) the decrypted content [DC] (680) responsive to the usage rights permitted by the decrypted ticket [DT] (682).

As illustrated in FIG. 24, to begin the regulated usage, responsive to a request in the recipient device 204 for usage, the recipient device 204 must retrieve (667) the selected decrypted content [DC] (681) output [such as output in FIG. 23 (669)]. The decrypted content is locally stored (680) in the recipient device. The usage of the decrypted content [DC] (681) is regulated by the recipient device 204, in accordance with the respective associated stored usage rights [DI] (682) in memory [DTKT] (668) (as illustrated in FIG. 23), and provides logic (684) [such as in the application software of the recipient device 204], responsive to the decrypted ticket output (663) as stored temporarily locally (682) in the respective recipient device 204. The decrypted ticket output [DT] (683) is decoded by decision and regulation logic (684). Responsive to the decrypted ticket [DT] (683), the decision logic (684) selectively provides for one of a plurality of defined options (685) for utilization of the decrypted content (681). Responsive to a user request or selection, or other authorized usage of the recipient device (such as automatically providing for viewing of certain content, or in accordance with permissions set during initial setup, or otherwise), the recipient device provides logic selectively providing for one of a plurality of options (685) such as for selecting of exporting (696) of at least a portion of the decrypted content (681) from the recipient device. Alternatively, the selection of a usage option (685) can provide for selection providing for printing (687) of at least one copy of at least a portion of the decrypted content (697). Alternatively, the selection of options (685) can provide for selection of executing as an application program (698) for at least a portion of the decrypted content (681). Alternatively, the selection logic (685) can provide for selective viewing (699) of a video presentation for the decrypted content [DC] (681) (or for a portion of the decrypted content). The examples of the five options are illustrated, and are not meant to he limiting. Many other options, including a smaller or larger set, or different set of options can be provided.

Figure 25:
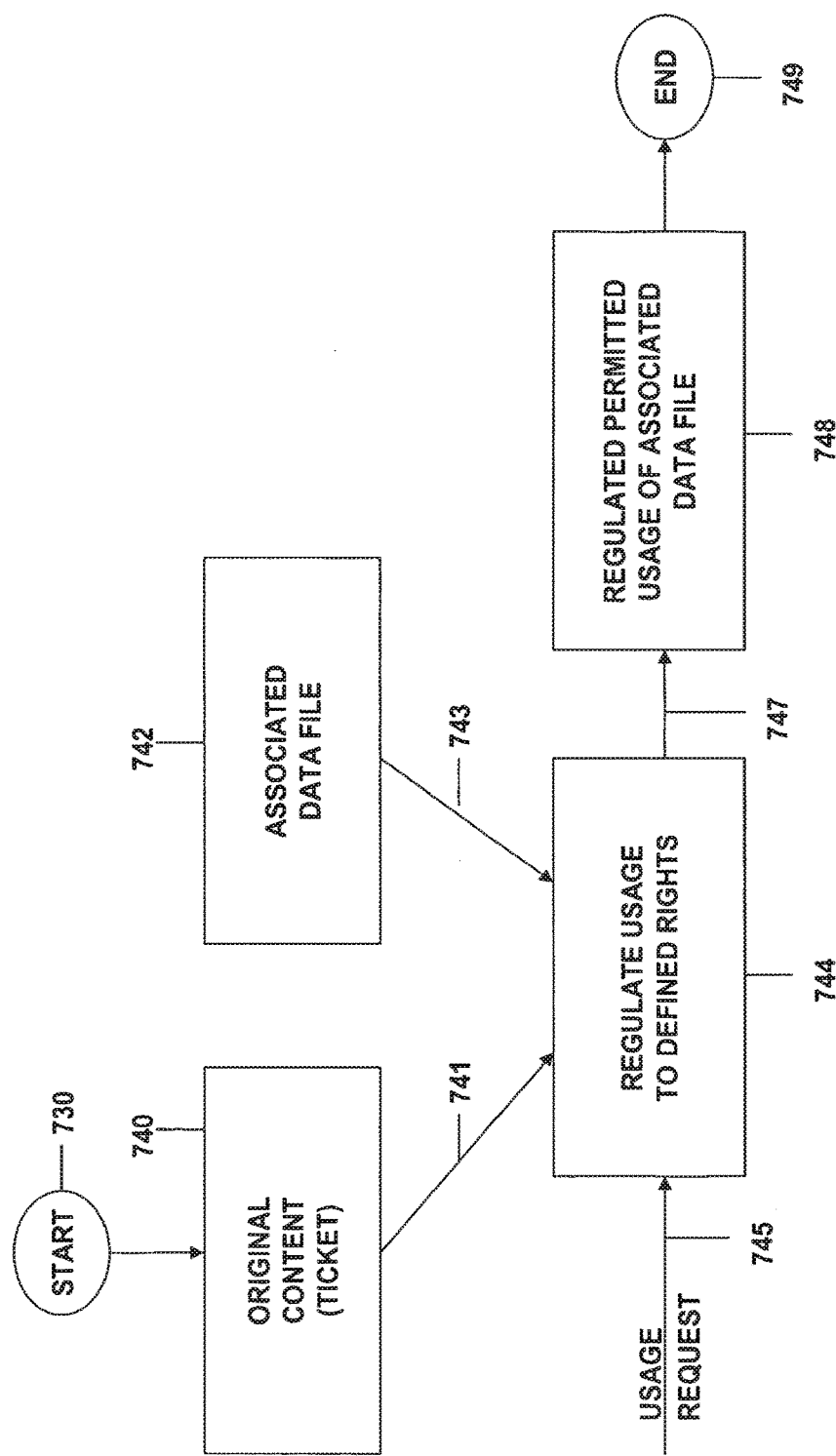
FIG. 25 shows an alternate embodiment, showing a flow chart, state flow, and data flow diagrams, illustrating processing in the recipient device of decrypted original content which original content is itself representative of a ticket defining usage rights for an associated data file, where the recipient device is responsive to a usage request for use of the respective associated data file, and regulates the usage on the recipient device of the associated data file as restricted to the defined usage rights for permitted usage as is granted by the permissions of the ticket of the original content, to provide for regulated permitted usage of the associated data file by the recipient device, such as printing, viewing, exporting, saving, or execution of an application program, represented by the associated data file.

FIG. 25 illustrates an alternate embodiment, showing a flow chart, block diagram, and state flow and data flow, for processing in the recipient device 204 of decrypted original content (741) which itself is representative of a ticket defining usage rights for an associated data file (743). The recipient device 204 is responsive to a usage request for use of the associated data (743), and regulates the usage of the associated data file (743) to the respective defined rights for usage as granted by the permission of the ticket (747) (the original content), to provide for regulated permitted usage within the respective recipient device of the associated data file (743), such as printing, viewing, exporting, saving, or execution of an application program, represented by the associated data file (743).

As illustrated in FIG. 25, (730), the original content (740) is a usage rights permission ticket, which is provided as an input to usage logic (744). An associated data file (742) is provided (743) to usage regulation logic (744). Responsive to a usage request (745), such as by the user of a recipient device (or by the recipient device via application software initial request), the logic (744) regulates usage rights of the associated date file (743) in accordance with the respective defined usage rights of the original content (ticket) (741) to provide a usage regulation output (747) for regulating permitted usage of the associated data file (743). The regulated permitted usage of the associated data file is provided for in the recipient device responsive to the application software executing the logic (744) [and responsive to the ticket (741)] to regulate usage of the respective associated data file (743) [in accordance with the usage rights of the ticket (741)].

The original content [(740), (741)], in another embodiment, can be any one or more of textual data, image data, audio-wave form data, video data, MIDI data, game data, business data, other data content, and application program code. Any of these types of original content can further have a respective associated ticket for regulating usage rights defining permitted uses for the respective type of associated original content.

As illustrated in FIG. 25, the original content is itself a ticket for regulating usage rights defining permitted uses for an associated respective data file. The associated respective data file can be (but does not need to be) provided with the respective original content, and can either be provided with it, or separately and at a separate time. As discussed elsewhere herein, protected original content is encrypted by the production system 104 and selectively decrypted by the recipient device system 204. The associated data file is also encrypted by the production system 104 and selectively decrypted by the recipient device system 204. Once decrypted within the recipient device system 204, the decrypted original content output (741) and the decrypted associated data file output (743) are utilized within the recipient device 204 by logic (744), to provide for selective regulation of usage of the respective associated data file (743) to provide only the permitted usage of the associated data file (743), such as in accordance with the usage request (745) [from the user, or responsive to operation of the recipient device system 204, itself]. When, as illustrated in FIG. 25, the original content (741) is a ticket for regulating usage rights defining permitted uses for an associated respective data file (743), then the associated respective data file (743) can be comprised of one or more of textual data, image data, audio-wave form data, MIDI data, video data, game data, business data, other data content, and application program code (for which the usage rights define allowed uses, and/or permitted conditions of use (e.g., number of times, time of day, number of elapsed days, etc.), and/or permitted features to be used).

Figure 26:
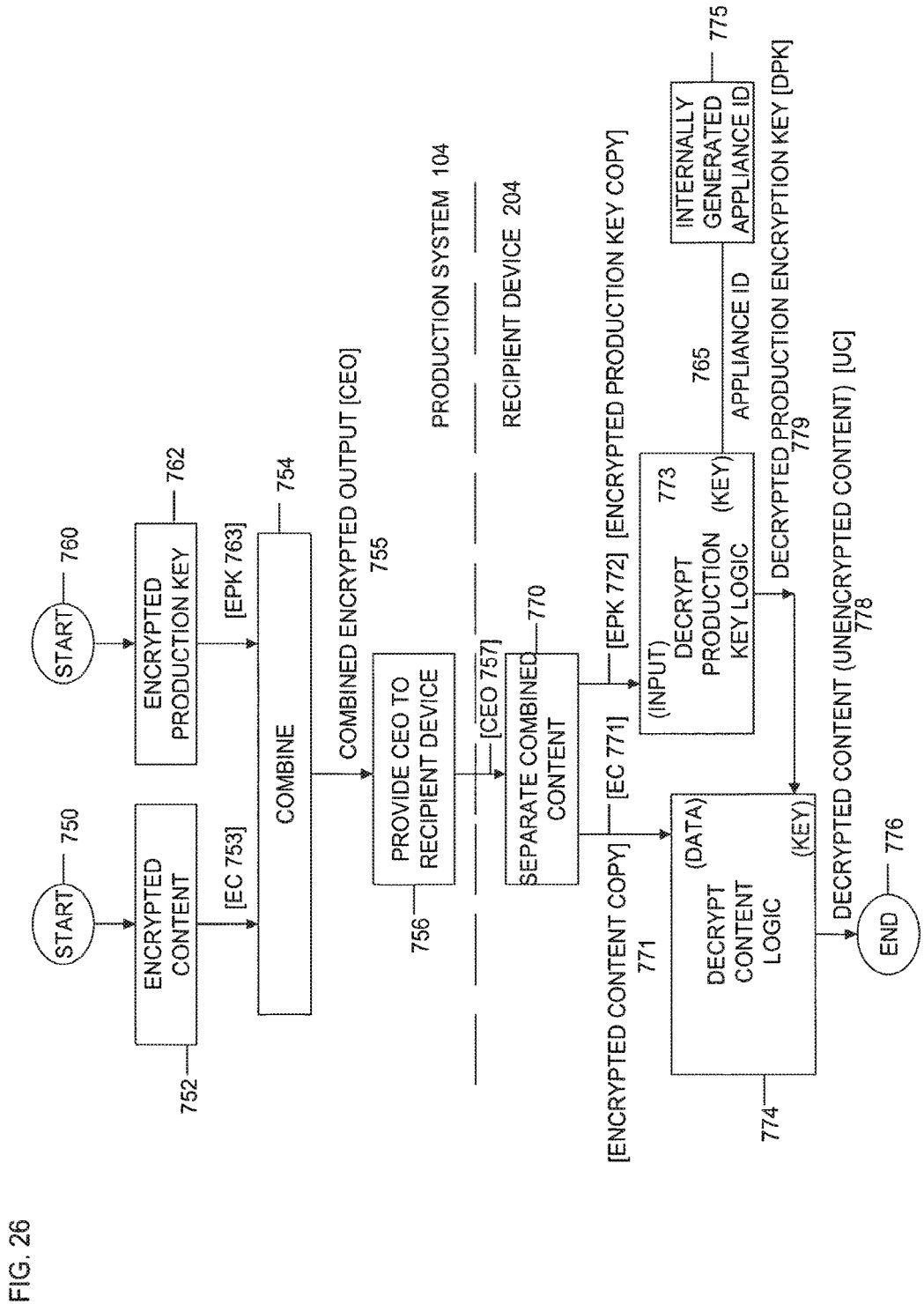
FIG. 26 illustrates a flow chart and state flow diagram corresponding to the combined output systems of FIGS. 2 and 4, herein, wherein encrypted content and an encrypted production key are combined to provide a combined encrypted output which is provided as a combined output to a recipient device, wherein the recipient device receives the combined encrypted output, and separates the combined content into separate files, an encrypted content copy file and an encrypted production key copy file, which are then separately decrypted in the recipient device to provide a decrypted encrypted production key which is utilized to decrypt the encrypted content to provide an output of decrypted content (the unencrypted content).

FIG. 26 illustrates a flow chart and state flow and block diagram corresponding in part to the combined output systems of FIGS. 2 and 4, wherein encrypted content [EC] (753) and an encrypted production key (EPK] (763) are combined (754) to provide a combined encrypted output [CEO] (755) which is provided as a combined output (756) to a recipient device 204, wherein the recipient device 204 receives the combined encrypted output (757), and separates (770) the combined content into separate ones of an encrypted content copy file [ECC] (771) and an encrypted production key copy file [EPKC] (772), which are then separately decrypted [(774), (773), respectively] in the recipient device 204 to provide via decryption logic (773) a decrypted encrypted production key [DEPK (779)] which is then utilized to decrypt via decryption logic (774) the encrypted content (771) to provide decrypted content (778) (the unencrypted content).

FIG. 26 illustrates the state flow, data flow, block diagram, and system element interaction for the combined system output (analogous to as illustrated in FIGS. 2 and 4). The production system 104 provides (750) for the providing of encrypted content (752) (as described elsewhere herein), to provide an encrypted content output (753). The production system provides (760) for generating (or otherwise providing) an encrypted production key (762), (in any of the manners as discussed elsewhere herein), providing for output of an encrypted production key output (763). The encrypted content output [EC] (753) and encrypted production key [EPK] (763) are combined by combing logic (754) to provide a combined output [CO] (755) which is provided (756) by the production system 104 as a combined encrypted output (CEO) (755) to the recipient device 204. This combined encrypted output [CEO] (756) can be provided to the respective recipient device 204 in a number of ways, as discussed elsewhere herein, ranging from an email, regular mail, on a CD-ROM, or distributed in any other manner. The recipient device 204 provides means for receiving (757) the combined encrypted output (756) received from the production system 104 (via any means), and provides separation logic (770) for separating the combined content [CO] to provide for separating the encrypted content from the encrypted production key to provide an output of an encrypted content copy (771) to storage within the recipient device 204. The encrypted content (771) is provided as an input to decryption logic (744). The separation logic (770) provides the encrypted production key [EPK] (772) to decryption logic (engine) (773) to provide for decryption of the encrypted production key [EPK] responsive to the internally generated (775) Appliance ID (765) from within the recipient device 204 to provide the generated Appliance ID (765) as a Decryption Key Input to the production key decryption logic (engine) (773). The decryption logic engine (773) provides for decryption of the encrypted production key copy [EPK] (772) provided as an input to the production key decryption logic (773). Responsive to the generated Appliance ID (773) as a Decryption Key Input, the production decryption logic (773) provides for an output of a decrypted production key [DPK] (779), which is coupled as a Decryption Key Input to content decryption logic (774). The content decryption logic (engine) (774) provides for decrypting of the encrypted content (771) (as coupled to the Data Input of the content decryption logic (774) to provide for an output of decrypted content (unencrypted content) (UC) (778) [which is preferably only temporarily stored, as discussed elsewhere herein]. The production system 104 provides for combining the encrypted content [EC] (153) and the encrypted production key [EPK] (763) to generate a single combined encrypted output [CEO] (755). The production system 104 then provides the combined encrypted output [CEO] (755) which coupled (756) from the production system 104 to the recipient device. The recipient device 204 provides for separating (770) the received combined encrypted output [CEO] (757) (at the recipient device) into an encrypted content copy (771) and encrypted production key copy (772). The recipient device then provides for decrypting the encrypted production key copy [EPKC] (772) with the production key decryption logic (774) within the recipient device, to provide a decrypted production key [DPK] (779). In a preferred embodiment, the decryption of the encrypted production key [EPK] (772) is explicitly appliance specific [only usable on a particular specific recipient device 204] by initially encrypting the respective encryption production key at the production system, responsive to an Appliance ID [coupled to the production system 104] internally generated from the particular recipient device specific appliance.

In an alternate preferred embodiment, a separate unique ID [not an Appliance ID generated from a recipient device] is provided to the production system and is utilized as an encryption key utilized for encrypting of respective associated content, and to create a respective associated encrypted production key, and the internally generating an Appliance ID (775) and (765) is not required in this alternative preferred embodiment.

In all of these embodiments, the encrypted production key [EPK] is decrypted at the recipient device to provide the decrypted production key [DPK], and utilizes the decrypted production key [DPK], to decrypt the encrypted content [EC] at the recipient device (responsive to the decrypted production key) to provide for unencrypted content [UC] corresponding to the original encrypted content for usage in accordance with permitted usages rights at a respective recipient device.

Figure 27:
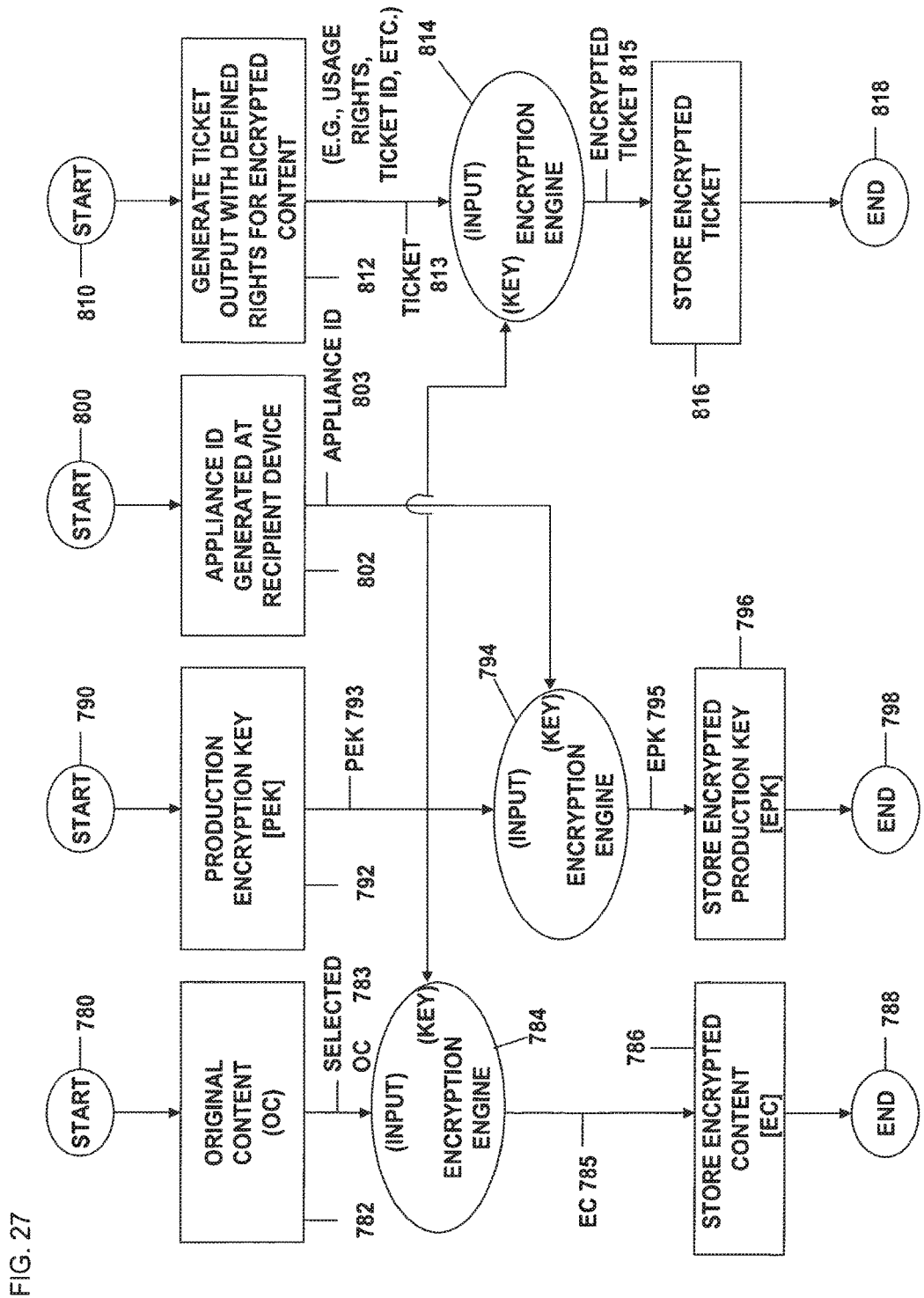
FIG. 27 illustrates a flow chart and state flow diagram for a production system providing (1) for the encryption of selected original content with a production encryption key; (2) for the encryption of encryption of the respective production encryption key with the same production key; and (3) encryption of the production encryption key to make the distributed protected content appliance specific, by encrypting the production key responsive to an Appliance ID generated at a recipient device to create the encrypted production key, and further provides for encryption, utilizing the same production encryption key, of a usage rights permission ticket output (generated by a ticket logic subsystem to provide a ticket output with defined rights for the associated encrypted content, and encrypts the generated ticket using the same production key as was utilize to encrypt the respective associated selected original content, so as to provide an encrypted ticket output which defines the usage rights, ticket ID, etc., for a ticket specifically associated with the respective encrypted content and encrypted production key, which made appliance specific via the encrypted production key, and are ultimately to be provided to a specific recipient device.

FIG. 27 illustrates a flow chart and state flow diagram and block diagram for a production system providing not only for the encryption of selected original content (783) with a production encryption key (793) but also encryption of the respective production encryption key (793) responsive to an Appliance ID (803) from a specific recipient device appliance, to make it appliance specific (by encrypting responsive to an Appliance ID generated at the respective specific recipient device and utilized as an encryption key input so as to create a respective production key). Further, utilizing the same respective production key as an encryption key input, a usage rights permission ticket output (813) is also encrypted (814) to create a respective encrypted ticket (815). The usage rights ticket (813) is generated by ticket logic subsystem (812) to provide a ticket output (813) with defined rights for usage of the associated encrypted content [EC] (785). The generated ticket (813) is encrypted (814) (responsive to the same production encryption key [PEK] (793) utilized to encrypt the respective associated selected original content), to provide an encrypted ticket output [ET] (815) which defines the usage rights (usage rights permissions, ticket ID, etc.) for the respective ticket associated with the respective encrypted content and respective encrypted production key, which are ultimately provided to a respective recipient device.

Referring to FIG. 27, there is illustrated the logic elements, system components, state flow and data flow, relating to the production system's generation of encrypted content, an associated encrypted production key, and further an associated encrypted ticket defining usage rights for the respective encrypted content. Original content is provided (780), either from storage of the production system trusted provider, or via coupling of content to the misted provider by the content owner. In any event, selected original content (783) is provided (782) by the trusted provider production system to provide an output of selected original content (783). This can be done in accordance with a number of criteria, including responsive to manufacturing and marketing suggested guidelines of a company, to responding to a specific user's on-line transaction such as ordering content, to anything in between, or otherwise. In any event, selected original content (783) is provided as an output, coupled as an input to content encryption logic (engine) (784). The production system 104 provides (790) a production encryption key [PEK] (792), in any of the manners as discussed herein. An output of a production encryption key [PEK] (793) is provided, and coupled as an Encryption Key Input to the content encryption logic (784). The content encryption logic (784) then provides for encryption of the selected original content (783), responsive to the associated production encryption key [PEK] (793) [generated to be associated with and used for encryption of (and decryption of) the respective selected original content (783), (or otherwise selected to be associated)]. The content encryption logic (784) provides an output of encrypted content (785) to be stored at the production system (786). Additionally, the production encryption key (793) is coupled as a Data Input to production key encryption logic (794). Additionally (800), the production system 104 provides an Appliance ID (803) (that was generated (802) at a recipient device, or any other unique ID that can be used to activate a recipient device) and provides an output of an Appliance ID (803) coupled as an input, to the encryption Key Input of the production key encryption logic (794). The production key encryption logic (794) provides for encryption of the production encryption key [PEK] (793) responsive to the Encryption Key Input of the Appliance ID (803), to provide an output of an encrypted production key [EPK] (795). The encrypted production key [EPK] (795) is stored (796) in the production system 104 as an encrypted production key [EPK] and is associated with the stored respective encrypted content (786). Additionally (810), the production system 104 generates (812) a ticket output (813) with defined usage rights for the respective associated encrypted content [EC] (785). The ticket (813) defines usage rights, and optionally has a ticket identification, a document identification, a production key identification, associated date, time, etc. The ticket (813) can be structured for usage of the respective associated content in accordance with default usage rights, or according to specific defined usage rights of the specific ticket as specifically provided by the production system for specific explicit regulation of the associated specific encrypted content. The ticket output (813) is coupled as an input to ticket encryption logic (814). The ticket encryption logic (814) has the Appliance ID (803) coupled as an input to an Encryption Key Input of the ticket encryption logic (814). The ticket encryption logic (814) provides for encryption of the ticket (813), responsive to the Appliance ID (803), to provide an output of an encrypted ticket (815). The encrypted ticket (815) is stored (816) in the production system (104) as an encrypted ticket [ET] and is associated with the respective encrypted content [EC] and the respective associated encrypted production key [EPK].

Thus, the system and process provide for generating a ticket output associated with the respective encrypted content, where the ticket output provides for defining usage rights for regulating the usage of the respective encrypted content. The respective ticket output is then encrypted, responsive to the associated respective production encryption key [that is, the same production key used to generate the respective associated encrypted content, to provide an encrypted ticket output. The ticket output, as discussed herein, can be comprised of usage rights, ticket ID, and optionally or alternatively other components.

As illustrated and discussed with reference to FIG. 28, and elsewhere herein, the system and methodology of the present invention provide for validating the encrypted ticket output (which is provided to the recipient device), along with the encrypted production key and respective associated encrypted content. The recipient device 204 decrypts the encrypted ticket (provided from the production system 104), and provides for validating the decrypted ticket output on the recipient device 204, responsive to the ticket ID portion of the decrypted ticket output. Then, after validating the ticket output, the recipient device system 204 responds to the usage rights defined by the ticket output, for regulating the usage [on the recipient device 204] of the decrypted content (which is preferably only stored temporarily on the recipient device during its usage), to provide for selective and restricted usage (of the respective decrypted content) in accordance with the defined usage rights and the validating. Thus, there is provided, regulating of usage of one (or more) of viewing, saving, exporting, printing, and executing of application code of the decrypted content, on the recipient device 204, responsive to the defined usage rights and the validating.

Figure 28:
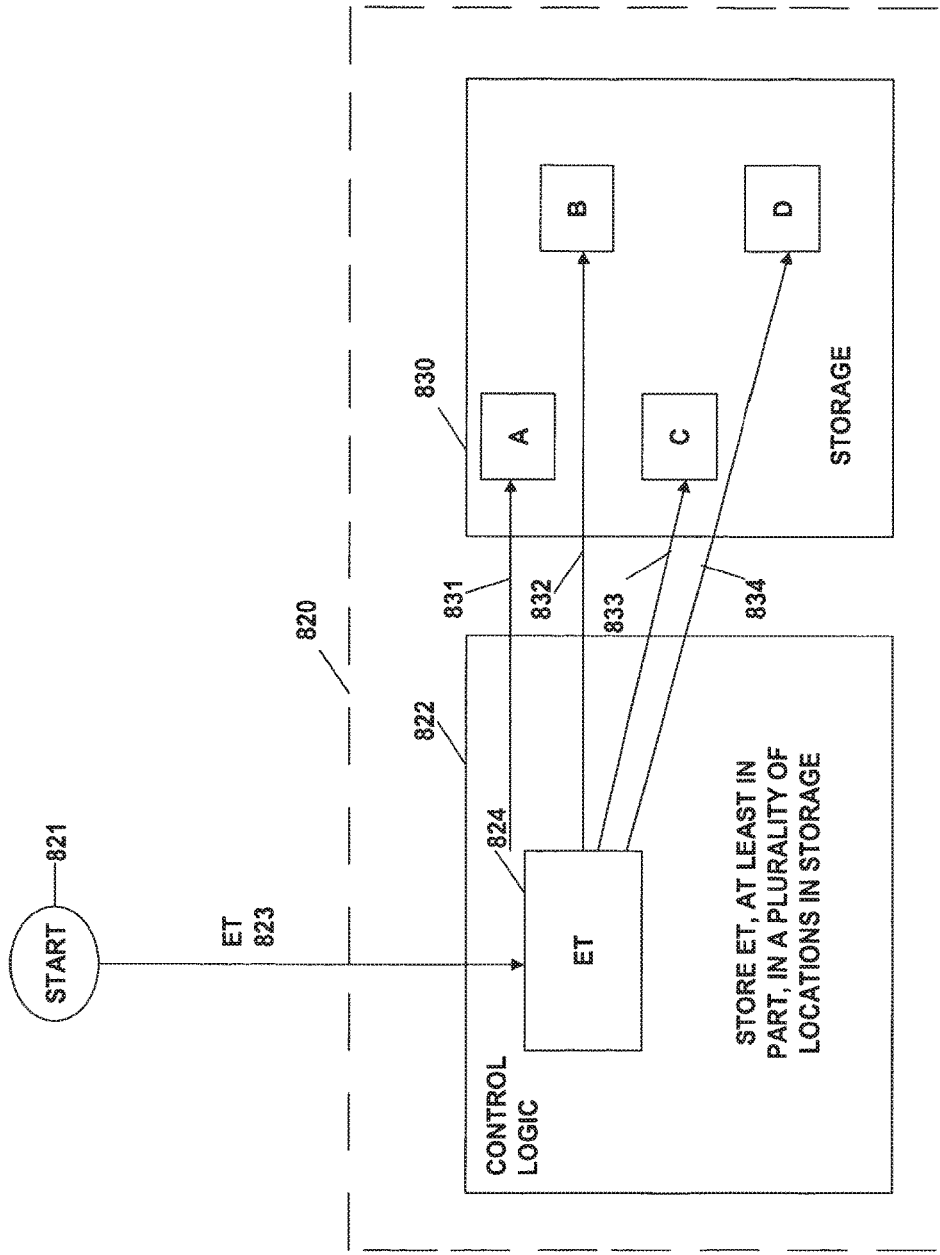
FIG. 28 illustrates a flow chart and state flow diagram for implementing additional security within the recipient device, by storing the decrypted ticket at least in part, in a plurality of locations within storage of the recipient device, to provide for multi-level security verification capability and to increase the level of security.

FIG. 28 illustrates a flow chart, state flow and block diagram providing for additional security within the recipient device 204, by storing the decrypted ticket, at least in part, in a plurality of locations within local storage of the recipient device 204, to provide for multi-level verification capability and to increase security levels.

As illustrated in FIG. 28, for improved security, the decrypted ticket (823) is stored in a plurality of locations [A (831), B (832), C (833), D (834)] within the local storage (830) of the recipient device 204, and is then utilized by the recipient device 204 to ensure that no tampering has occurred to the decrypted ticket [DT] (823). As illustrated in FIG. 28, an encrypted ticket (823) is provided as an input to the recipient device 204, and is stored (820) within the recipient device 204. Control logic (822), within the recipient device, provides for additional storage of the encrypted ticket (824) into a plurality of separated memory locations in the storage (830) of the recipient device 204. All, or at least a part, of each of the multiple copies of the encrypted ticket is stored in each of a plurality of different locations A B C and D in the storage memory (830) of the recipient device. The storage memory (830) is preferably the non-volatile storage, such as a magnetic hard disk drive, optical storage (e.g., CD, DVD, other), or otherwise. The control logic (822) provides for the maintenance of the multiple copies of the respective encrypted ticket [ET] for usage rights, in the selected plurality of locations in the storage. This provides an additional level of protection against tampering. The control logic (824) provides a first output (831) to store at memory location A, an output 832 to store at memory location B, an output 833 to store at memory location C, and an output 834 to store at memory location D. More or less locations can be chosen as a design election choice. Thereafter, during validation of the ticket output, and regulation of usage responsive to the usage rights defined by the ticket, the control logic utilizes the multiple stored tickets. The respective stored ticket at each of the plurality of locations is examined, and responsive thereto, usage rights for the associated selected content are limited in accordance with results of the polling of the respective tickets at the multiple stored locations, and analysis of the respective stored tickets at the plurality of locations. In a preferred embodiment, after the polling, only the most restrictive usage rights of the polled tickets are observed [that is, the least permissive of the usage rights of the plurality of respective stored tickets], as a precaution against tampering by someone with any of the stored usage rights. However, if there is no tampering, all locations will confirm a same usage right.

Figure 29:
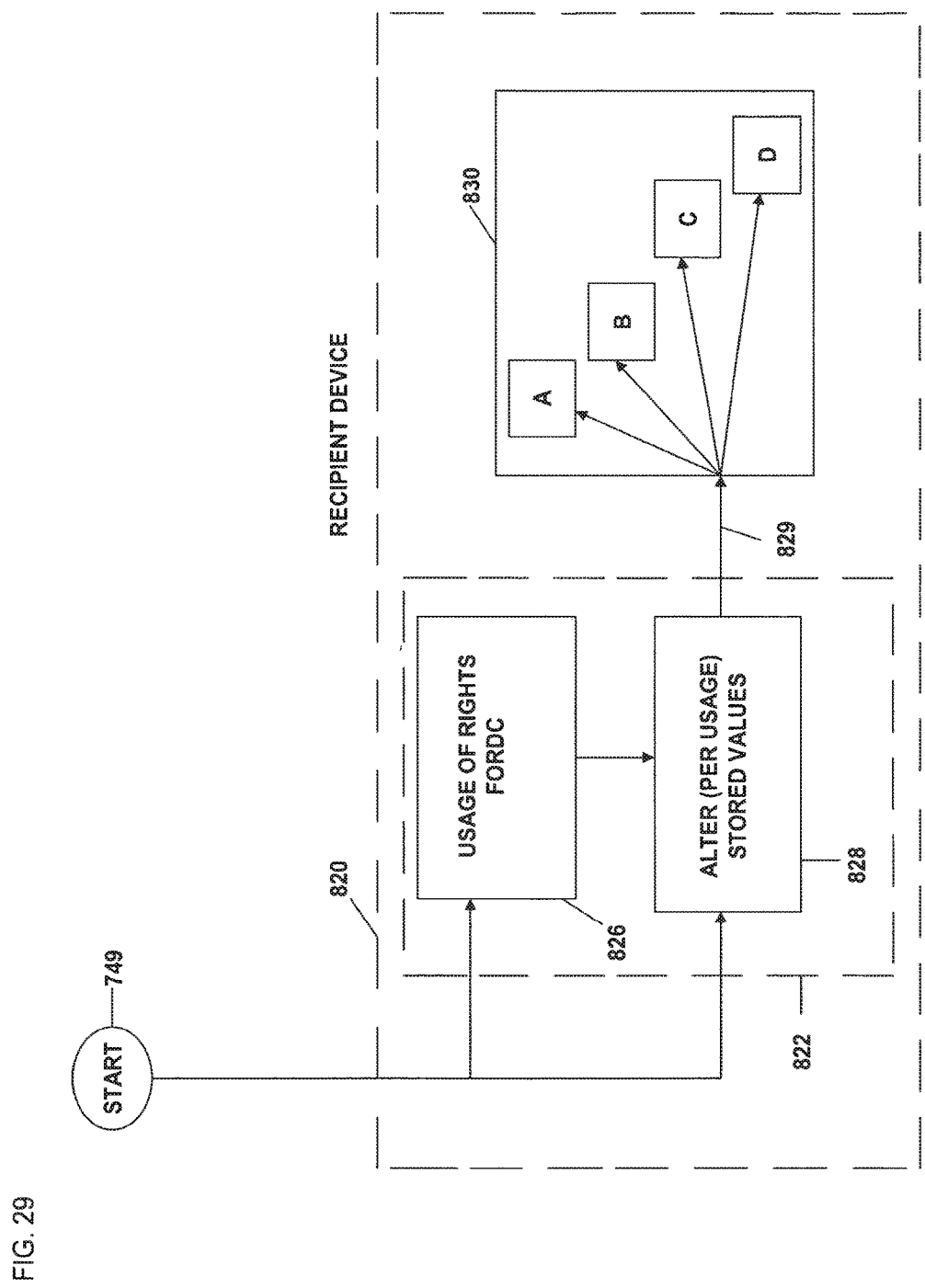
FIG. 29 illustrates a flow chart and state flow diagram illustrating, within the recipient device, the altering of the multiple stored values for usage rights of decrypted content in the respective multiple locations of the storage device storage of the recipient device 1400 analogous to the storage and locations of FIG. 28.

FIG. 29 illustrates a flow chart, state flow and block diagram, illustrating within the recipient device 204, the altering (828) of the multiple stored values [A, B, C, D] for usage rights (of respective decrypted content) in the respective multiple locations of the storage (830) of the recipient device 204 [analogous to the storage as in FIG. 28]. The same locations can be re-utilized for the altered values, or new locations can be used.

The original content can have an associated ticket or be a ticket itself for an associated data file. In the illustrated embodiment of FIG. 29, an output of permitted usage rights (749) are provided to the recipient device 204, (see also as illustrated in FIG. 28), coupled to control logic (820) (within the recipient device 204) which provides (1) control for permitted usage of rights for the respective decrypted content [DC], and (2) monitors usage of rights of the respective content as per actual usage in accordance with the respective permitted usage rights. The actual usage of regulated usage rights (749) is provided as an input to the control logic (826) [responsive to the usage of respective associated rights of respective associated decrypted content], which provides logic for altering (828) of stored usage values [A, B, C, D], responsive to the regulated permitted actual usage for the protected content (such as the associated data file). The recipient device control logic (820) determines and maintains records of usage rights allowed and actual usage, (e.g., as discussed with reference to FIG. 28). In FIG. 29, the altered usage stored values (829) are updated to the locations [A, B, C, D] of the storage (830) [of the recipient device 204], to provide for modification of the values stored for both usage rights used, and for usage rights still left available, for the respective associated decrypted content. The modified usage rights are encrypted and stored as encrypted ticket usage rights, so as to maintain the integrity of the multi-location anti-tampering structure.

Many alternate options exist for selecting the multiple locations, including generating a pool of values, storing location values (encrypted) with the respective ticket and mapping to them, randomly generating location values, defining a table of locations to be utilized and mapped to, providing a defined set of locations, and updating and re-mapping locations on an adaptive basis over time, and/or any structure or methodology for securely assigning and mapping and keeping track of multiple ticket locations, [and (where utilized) any encryption keys or data needed]. Thus, after having stored the encrypted ticket at least in part in a plurality of locations within storage of the recipient device 204, the actual usage of rights of the decrypted content within the recipient device 204 results in the storing of altered values (as to actual usage) for the respective usage rights actually used in the respective plurality of locations.

Figure 30:
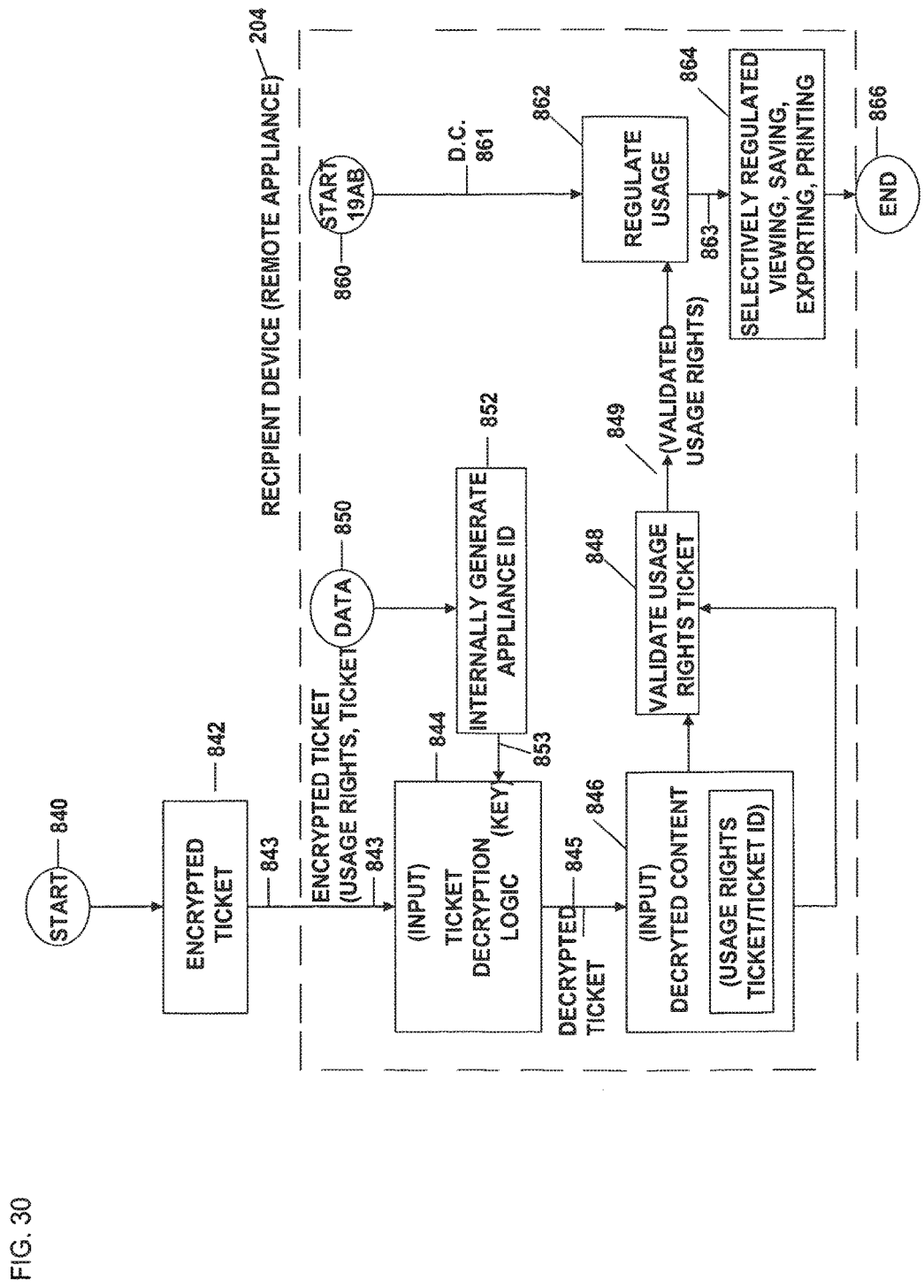
FIG. 30 illustrates a flow chart and state flow diagram illustrating the operation, within the recipient device, to process and utilize an encrypted ticket, to provide for decrypting of the encrypting content on an appliance specific basis (in a preferred embodiment), to provide decryption of the ticket and ticket ID and other data for usage rights, and provides for validation of usage rights ticket (such as based on actual usage or verifying multiple stored tickets to validate usage rights) providing a validated usage rights signal to regulation logic which regulates the usage of decrypted content as output from FIG. 19, for example, to provide for selectively regulated usage such as viewing, saving, exporting, running as an application program or printing.

FIG. 30 illustrates a flow chart, state flow and block diagram, illustrating the operation within the recipient device 204 to process and utilize an encrypted ticket (842), to provide for decrypting (844) of the encrypted ticket (843) [as illustrated elsewhere herein on an appliance specific basis], to provide decrypted ticket content (845) of the ticket and ticket ID [and as appropriate, other data for usage rights]. The recipient device 204 further provides for validation (848) of the decrypted usage rights ticket (846) (such as based on actual usage or verifying multiple respective stored tickets to validate usage rights), providing a validated usage rights signal (849) to provide an input to regulation logic (862) (such as executing authorized validated associated application software in the recipient device system), providing for regulated usage of the protected content. The recipient device, which regulates (862) the usage of the respective decrypted content [DC] (861), and provides for selectively regulated usage (864) (such as viewing, saving, exporting or printing), responsive to the validated (permitted) usage rights (849).

FIG. 30 further illustrates the provision of an additional associated encrypted ticket output (843) associated with respective encrypted content [EC] and a respective encrypted production key [EPK], (consistent with the discussion of figures provided herein). As illustrated in FIG. 30, (840), an encrypted ticket output (843) is provided (842) [such as the encrypted ticket output 816 provided from the production system (as illustrated in FIG. 27)]. The encrypted ticket output (843) is coupled from the production system 104 to the recipient device 204, and is stored in memory of the recipient device 204. The encrypted ticket (843) is coupled as a Data Input to ticket decryption logic (844), which provides for decryption of the encrypted ticket (843), responsive to an internally generated appliance ID (at 853) coupled as a Decryption Key Input (KEY) to the ticket decryption logic (844). The recipient device 204 internally generates (852) an Appliance ID (853) based on unique identifying data (850) [in any manner as discussed elsewhere herein], to provide the Appliance ID output (853) [that is coupled as an encryption key to the decryption logic (844)]. The ticket decryption logic (844) provides for decryption of the encrypted ticket (843) to provide an output of a decrypted ticket (845). The decrypted ticket is provided as an input to usage control logic (846) of the recipient device [such as responsive to application software (validated and authorized by a trusted provider) running on a computer system of the recipient device]. The recipient device 204 is responsive to the decrypted ticket (845) and provides for determining of usage rights (and regulation of usage responsive thereto) and validating of ticket ID [and/or other functions as desired and implemented]. The decrypted content (861) provided within the recipient device 204 (as discussed herein), is temporarily stored in the recipient device, and provided to the control logic (846), and the usage rights ticket is validated (848) for the respective content [such as based on ticket ID and other information as appropriate) (846), and the validated usage rights are provided as an output (849) coupled to usage regulation and control logic (862) as an input thereto. The decrypted content (861) (such as illustrated output from FIG. 19) is coupled to the control logic (862) as well as, to be validated. The logic provides for regulating usage (862) of the decrypted content (861) in accordance with the validated usage rights (849) to provide for an output (863) which is utilized by the recipient device 204, to provide for selectively regulated usage at the recipient device of the decrypted content [DC], such as viewing, saving, exporting, printing, or other permitted usage as permitted by the validated usage rights for the respective decrypted content.

The system and methodology as in illustrated FIG. 30 provide for validating the ticket output within the recipient device, and then regulating the usage of the decrypted content on the recipient device responsive to the determined usage rights and the validating. This can provide for one or more of viewing, saving, exporting, printing, and executing of application represented by the decrypted content, responsive to the usage rights and the validating.

The system and methodology of the present invention as to Data. Rights Management and secure distribution and regulation of protected content, is applicable to distribution via on-line (Internet or Intranet, wired or wireless), via CD-ROM, email, on memory cards, or otherwise.

It is applicable to business, education, government, on-line research [such as LexisNexis, Westlaw, Google], on-line transactional (e.g., eBay, Amazon.com), video gaming, gambling, wagering, betting (especially server-based or wireless or wired, real-time or delayed), and any on-line commerce.

The present invention also eliminates the time loss and delays of server-based authentication of appliances, data and transactions, by providing (in some embodiments), appliance specific regulating of usage rights, without (ongoing) server authentication.

The systems and methodology of the present invention are also valuable in a large number of applications, from any transaction processing system, such as for businesses or consumers, and in specific regulated industries, such as banking, financial markets, military, and [gambling, gaming, wagering and betting, both on-line and in-casino-based and wireless and wired], as well as to server-based gaming and gambling.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A computing system for securely utilizing content, the computing system comprising:
    at least one memory;
    at least one computer processor;
    a component configured to encrypt original content using a production key;
    a component configured to receive, from a recipient device:
    a computer appliance identifier created from a first identifier indicating at least one hardware feature of the recipient device and a second identifier indicating at least one software application installed at the recipient device, computer appliance key hash logic used to generate hash values, and a password provided as input to the computer appliance key hash logic;

a component configured to encrypt the production key, using the computer appliance identifier received from the recipient device, to produce encrypted content, wherein a decryption engine used to decrypt the production key is created using at least a part of the first identifier used to create the computer appliance identifier;

a component configured to send, to the recipient device, the encrypted production key for decryption using the generated computer appliance identifier; and a component configured to send, to the recipient device, the encrypted content at the recipient device for decryption using the decrypted production key, wherein each of the components comprises computer-executable instructions stored in the at least one memory for execution by the at least one computer processor.

2. The computing system of claim 1, wherein the recipient device comprises:

a component configured to generate the computer appliance identifier based at least in part on the first identifier indicating at least one hardware feature of the recipient device and the second identifier indicating at least one software application installed at the recipient device; and a component configured to decrypt the encrypted production key device using the generated computer appliance identifier.

3. The computing system of claim 1, wherein the original content has an associated video presentation and the recipient device further comprises:

a component configured to, in response to decrypting the encrypted content at the recipient device, selectively provide a video presentation for a) viewing, b) selectively printing out a portion of the video presentation, and c) exporting at least one copy of at least a portion of the video presentation.

4. The computing system of claim 1, wherein the original content comprises at least one of:

textual data;
image data;
audio waveform data;
Musical Instrument Digital Interface data;
video data;
game data;
business data; and
application program code.

5. The computing system of claim 1, wherein the original content comprises a ticket for regulating usage rights defining permitted uses for an associated data file.

6. The computing system of claim 1, further comprising:

a component configured to generate a ticket output associated with the encrypted content, the ticket output comprising usage rights for regulating use of the encrypted content; and a component configured to encrypt the ticket output using the production key.

7. The computing system of claim 1, further comprising:

a component configured to combine the encrypted content and the encrypted production key as a combined encrypted output.

8. A method, performed by a computing system having a memory and a processor, for securely utilizing content, the method comprising:

encrypting, by the computing system having the memory and the processor, original content using a production key;

receiving, by the computing system having the memory and the processor, from a recipient device:

a computer appliance identifier created from a first identifier indicating at least one hardware feature of the recipient device and a second identifier indicating at least one software application installed at the recipient device, computer appliance key hash logic used to generate hash values, and a password provided as input to the computer appliance key hash logic;

encrypting, by the computing system having the memory and the processor, the production key, using the computer appliance identifier received from the recipient device, to produce encrypted content, wherein a decryption engine used to decrypt the production key is created using at least a part of the first identifier used to create the computer appliance identifier;

sending, by the computing system having the memory and the processor, to the recipient device, the encrypted production key for decryption using the generated computer appliance identifier; and sending, by the computing system having the memory and the processor, to the recipient device, the encrypted content at the recipient device for decryption using the decrypted production key.

9. The method of claim 8, wherein the original content comprises at least one of:

textual data having a respective associated ticket for regulating usage rights defining permitted uses for respective textual data;

image data having a respective associated ticket for regulating usage rights defining permitted uses for respective image data;

audio waveform data having a respective associated ticket for regulating usage rights defining permitted uses for respective audio waveform data; and video data having a respective associated ticket for regulating usage rights defining permitted uses for respective video data.

10. The method of claim 8, further comprising:

in response to providing the encrypted content to the recipient device, storing, by the computing system having the memory and the processor, an associated serial number and associated password in connection with the recipient device;

receiving, by the computing system having the memory and the processor, from the recipient device, a generated computer appliance identifier, the associated serial number, and the associated password;

encrypting, by the computing system having the memory and the processor, the production key using the generated computer appliance identifier received from the recipient device; and communicating, by the computing system having the memory and the processor, to the recipient device, the production key encrypted using the generated computer appliance identifier received from the recipient device.

11. The method of claim 8, further comprising:

in response to receiving a request to execute a plug-in configured to extend a program with new functions, checking, by the computing system having the memory and the processor, a ticket associated with the plug-in to determine whether the plug-in should be allowed to run.

12. The method of claim 8, wherein the computer appliance identifier is further created from a CPU identifier and a network address.

13. A computer-readable medium, that is not a transitory, propagating signal, storing instructions that, if executed by a computing system having a memory and a processor, cause the computing system to perform a method comprising:
  encrypting original content using a production key;
  receiving, from a recipient device:
    a computer appliance identifier created from a first identifier indicating at least one hardware feature of the recipient device and a second identifier indicating at least one software application installed at the recipient device,
    computer appliance key hash logic used to generate hash values, and
    a password provided as input to the computer appliance key hash logic;
  encrypting the production key, using the computer appliance identifier received from the recipient device, to produce encrypted content, wherein a decryption engine used to decrypt the production key is created using at least a part of the first identifier used to create the computer appliance identifier;
  sending, to the recipient device, the encrypted production key for decryption using the generated computer appliance identifier; and
  sending, to the recipient device, the encrypted content at the recipient device for decryption using the decrypted production key.

14. The computer-readable medium, that is not a transitory, propagating signal, of claim 13, the method further comprising:
  receiving, from the recipient device, the computer appliance identifier created using the first identifier indicating at least one hardware feature of the recipient device and a second identifier indicating at least one software application installed at the recipient device.

15. The computer-readable medium, that is not a transitory, propagating signal, of claim 13, the method further comprising:
  in response to receiving a request to execute code of a function, checking a ticket associated with the function to determine whether the code for the function should be permitted to execute.

16. The computer-readable medium, that is not a transitory, propagating signal, of claim 13, wherein the original content comprises at least one of:
  Musical Instrument Digital Interface data having a respective associated ticket for regulating usage rights defining permitted uses for respective Musical Instrument Digital Interface data;
  game data having a respective associated ticket for regulating usage rights defining permitted uses for respective game data;
  business data having a respective associated ticket for regulating usage rights defining permitted uses for respective business data; and
  application program code having a respective associated ticket for regulating usage rights defining permitted uses for respective application program code.

17. The computer-readable medium, that is not a transitory, propagating signal, of claim 13, wherein the computer appliance identifier is further created from data collected from a biometric reader.

18. The computer-readable medium, that is not a transitory, propagating signal, of claim 17, wherein the data collected from the biometric reader comprises fingerprint data and retinal data.

* * * * *